US005268528A

United States Patent [19]

Iwase

[11] Patent Number: 5,268,528

[45] Date of Patent: * Dec. 7, 1993

[54] MUSICAL SOUND WAVEFORM GENERATOR AND A METHOD FOR GENERATING A MUSICAL SOUND WAVEFORM ELECTRONIC MUSICAL INSTRUMENT WITH IMPROVED CAPABILITY FOR SIMULATING AN ACTUAL MUSICAL INSTRUMENT

[75] Inventor: Hiroshi Iwase, Hamuramachi, Japan

[73] Assignee: Casio Computer Co., Ltd., Tokyo, Japan

[ * ] Notice: The portion of the term of this patent subsequent to Nov. 17, 2009 has been disclaimed.

[21] Appl. No.: 936,741

[22] Filed: Aug. 27, 1992

Related U.S. Application Data

[62] Division of Ser. No. 457,512, Dec. 27, 1989, Pat. No. 5,164,530.

[30] Foreign Application Priority Data

| | | | |
|---|---|---|---|
| Dec. 29, 1988 | [JP] | Japan | 63-330847 |
| Dec. 29, 1988 | [JP] | Japan | 63-330848 |
| Dec. 29, 1988 | [JP] | Japan | 63-330849 |
| Dec. 29, 1988 | [JP] | Japan | 63-330850 |
| Jan. 27, 1989 | [JP] | Japan | 1-18148 |

[51] Int. Cl.[5] .................... G09B 15/04; G10H 1/057; G10H 1/14

[52] U.S. Cl. .................... 84/660; 84/663; 84/694; 84/477 R; 84/DIG. 27

[58] Field of Search .................... 84/615, 622-627, 84/633, 658-661, 663, 665, 687-690, 629-700, 702, 703, 711, 477 R, 478, DIG. 1, DIG. 10, DIG. 27

[56] References Cited

U.S. PATENT DOCUMENTS 4,018,121 4/1977 Chowning .
4,144,790 3/1979 Suchoff .
4,249,447 2/1981 Tomisawa .
4,297,933 11/1981 Nishimoto .
4,329,902 5/1982 Love .
4,554,857 11/1985 Nishimoto .
4,643,066 2/1987 Oya .
4,748,888 6/1988 Oya .
4,924,744 5/1990 Yamamura .

FOREIGN PATENT DOCUMENTS 36-12279 4/1961 Japan .
56-86977 12/1982 Japan .
57-199399 12/1982 Japan .
62-30639 7/1987 Japan .

*Primary Examiner*—Stanley J. Witkowski
*Attorney, Agent, or Firm*—Frishauf, Holtz, Goodman & Woodward

[57] ABSTRACT

A musical sound waveform generator includes a carrier signal generating unit, a modulation signal generating unit, a mixing controlling unit and a waveform outputting unit. The characteristics of the carrier signal from the carrier signal generating unit are determined such that the musical sound waveform generated by the waveform outputting unit is a sine wave or a cosine wave with a single frequency, where the mixing ratio of the modulation signal is made O by the mixing controlling unit. Therefore, the mixing controlling unit presets the mixing ratio of the modulation signal to be O, making it possible to generate a musical sound waveform which is only a sine wave or a cosine wave of a single frequency. During the performance, the mixing ratio can, for example, be determined at a high value immediately after the start of sound generation and thereafter reduced to near O with time. Thereby, the frequency characteristics of the musical sound waveform can be controlled such that the musical sound waveform is changed from one having a lot of higher harmonics to one having only a single sine wave component or a single cosine wave component.

37 Claims, 54 Drawing Sheets

ωc:ωm=1:0.5

ωc:ωm=1:16

FIG. 12(a) $\omega ct0 \sim \omega ct9$

FIG. 12(b) $\omega ct10$

FIG. 14(a) $\omega ct0 \sim \omega ct8$
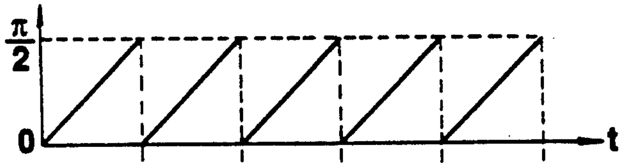
FIG. 14(b) $\omega ct9$
FIG. 14(c) $\omega ct10$
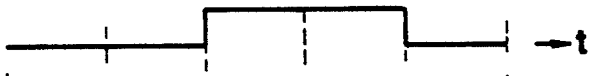
FIG. 14(d) A0~A8
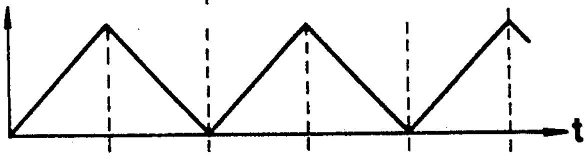
FIG. 14(e) D0~D8
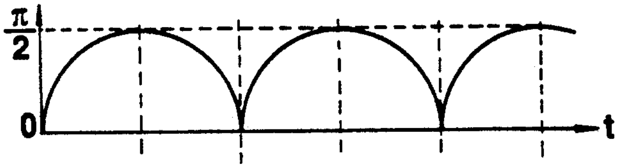
FIG. 14(f) Wc0~Wc8
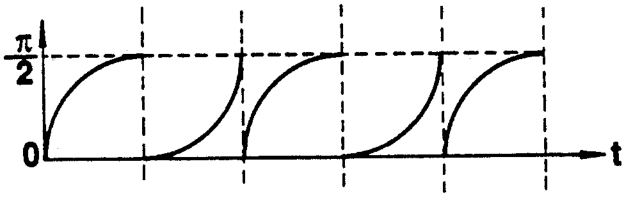
FIG. 14(g) Wc0~Wc10
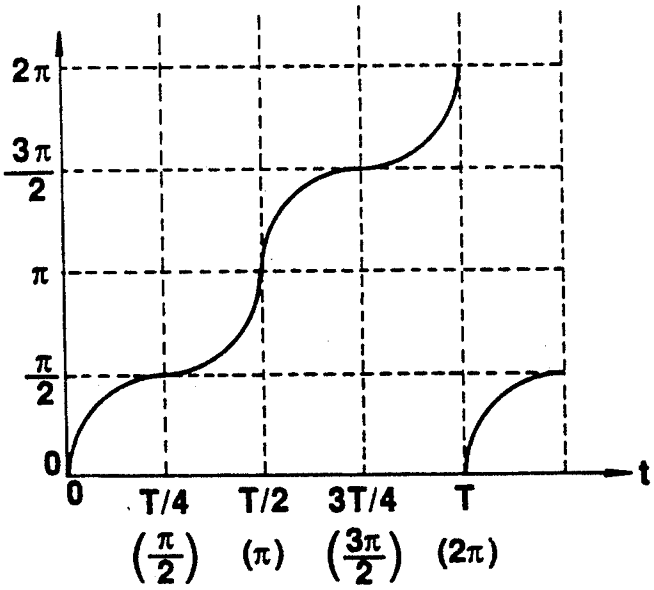

| A(HEX) | | D | |
|---|---|---|---|
| 0 | ch1 | ENVELOPE | ON |
| 1 | | ENVELOPE | OFF |
| 2 | | ATTACK TIME | AT |
| 3 | | INITIAL LEVEL | IL |
| 4 | | DECAY TIME | DT |
| 5 | | SUSTAIN LEVEL | SL |
| 6 | | RELEASE TIME | RT |
| 7 | ch2 | ENVELOPE | ON |
| 8 | | ENVELOPE | OFF |
| 9 | | ATTACK TIME | AT |
| A | | INITIAL LEVEL | IL |
| B | | DECAY TIME | DT |
| C | | SUSTAIN LEVEL | SL |
| D | | RELEASE TIME | RT |

| DETUNE OF MODULATION WAVE FOR CARRIER WAVE | | DTUNE |
|---|---|---|
| ch1 | ATTACK TIME | MAT |
| | INITIAL LEVEL | MIL |
| | DECAY TIME | MDT |
| | SUSTAIN LEVEL | MSL |
| | RELEASE TIME | MRT |
| ch2 | ATTACK TIME | CAT |
| | INITIAL LEVEL | CIL |
| | DECAY TIME | CDT |
| | SUSTAIN LEVEL | CSL |
| | RELEASE TIME | CRT |

MUSICAL SOUND WAVEFORM GENERATOR AND A METHOD FOR GENERATING A MUSICAL SOUND WAVEFORM ELECTRONIC MUSICAL INSTRUMENT WITH IMPROVED CAPABILITY FOR SIMULATING AN ACTUAL MUSICAL INSTRUMENT

This is a division of application Ser. No. 07/457,512 filed Dec. 27, 1989, now U.S. Pat. No. 5,164,530.

BACKGROUND OF THE INVENTION

1. Field of the Invention

The present invention relates to a musical sound waveform generator in an electronic musical instrument and more particularly to a musical sound waveform generator for generating a musical sound waveform including a lot of higher harmonics components, such sound being produced by performing a modulation, and also to a method for generating such musical sound waveform.

The present invention further relates to a musical sound waveform generator and a method for generating a musical sound waveform for controlling a characteristic of a musical sound waveform based on the manner in which the instrument is played.

The present invention further relates to a musical sound waveform generator for producing a musical waveform by generating a modulated waveform signal with a multi-stage process and using a discretional combination of connections of these processes, and to a method for producing the musical waveform.

The present invention further relates to a musical waveform generator for producing a stereo musical waveform containing a lot of higher harmonics components and subjected to a modulation.

2. Description of the Prior Art

As a first prior art of an electronic musical instrument capable of digitally producing a musical waveform containing various kinds of complex characteristics, an electronic musical instrument using an FM method recited in, for example, Japanese Patent Publication Sho 54-33525 or Japanese Patent Early Disclosure Sho 50-126406 is cited.

As a musical sound waveform, this method basically uses a waveform output e obtained by the following operation equation.

$$e = A \cdot \sin\{\omega ct + I(t) \sin \omega mt\} \quad (1)$$

A carrier frequency $\omega_c$ and a modulation waveform frequency $\omega_m$ for modulating the carrier frequency $\omega_c$ are selected in an appropriate ratio. In addition, a modulation depth function I(t) and an amplitude coefficient A, both of which vary with time, are provided. This enables composition of a musical sound with complex and time-variable harmonics characteristics similar to that of an actual musical instrument, and also of a highly individual composite musical sound.

As a second prior art system obtained by improving the FM method, an electronic musical instrument disclosed in Japanese Patent Publication Sho 61-12279 is provided. This method uses a triangular wave arithmetic operation in place of the sine arithmetic operation shown in equation (1). The musical waveform output e is obtained from the following equation.

$$e = A \cdot T\{\alpha + I(t)\, T(\theta)\} \quad (2)$$

$T(\theta)$ is a triangular wave function produced by a modulation wave phase angle $\theta$. A carrier wave phase angle $\alpha$ and a modulation wave phase angle $\theta$ are advanced at an appropriate proceeding speed ratio. A modulation depth function I(t) and an amplitude coefficient A are provided in a manner similar to that in the first prior art example, thereby composing a musical sound waveform.

The musical sound of an actual musical instrument such as a piano contains in addition to a fundamental wave component based on a pitch frequency, harmonics components having a plurality of frequencies of an integer times the fundamental wave component and a fairly higher harmonics component. Further, a harmonics component comprising a non-integer times the fundamental wave is sometimes included. These harmonics components give a musical sound a rich quality. The musical sound of an actual musical instrument gradually fades after initial production. The amplitude of the harmonics components decrease first starting with the higher harmonic components, until finally only a single sine wave component corresponding to the pitch frequency remains. Musical sounds which originally include only a single sine wave component also exist.

In the first prior art mentioned above, a modulation by a sine wave is treated as a basic approach. Therefore, the value of the modulation depth function I(t) in equation (1) reduces to near 0 with time, thereby realizing a process in which a musical sound is attenuated so that it comprises only a single sine wave component or a musical sound comprising only a sine wave component is generated, as is similar to an actual musical sound. However, the musical sound generated in accordance with equation (1) has a frequency component concentrated in a lower harmonics component (i.e. a lower frequency component). By making a value of a modulation depth function I(t) large, a deep modulation is applied but a suitable higher harmonic component (i.e. a higher frequency component) is not produced. Therefore, the above first prior art has the problem that it cannot produce a musical sound with a rich quality similar to that of an actual musical instrument, and that the quality of a musical sound which it can generate is limited.

By contrast, in the second prior art based on equation (2), a modulation by a triangular wave originally containing various harmonics is used as the fundamental approach. Therefore, the second prior art can easily produce a musical sound in which a higher harmonics component clearly exists as a frequency component. However, equation (2) does not contain a single sine wave component term. Therefore, it has the problem that it cannot realize a process in which a musical sound is attenuated to have only a single sine wave component or a musical sound comprising only a single sine wave component is generated, as is similar to an actual musical sound.

An acoustic musical instrument such as a piano can produce a musical sound containing many higher harmonics components, thus providing a hard feeling, if a key is depressed at high speed. Conversely, it can produce a musical sound containing only a single sine wave component, thus providing a soft feeling, if a key is depressed extremely slowly.

However, if a keyboard-type musical instrument with the above effect is intended to be realized by using the first prior art, a higher harmonics component does not normally appear in a musical sound produced by equation (1) recited above. As a result, even if the value of the modulation depth function I(t) is controlled to be large upon a quick key depression, the level of the higher harmonics components produced are limited Therefore, there is the problem that a musical sound containing many higher harmonics corresponding to a performance operation cannot be produced.

In contrast, when a keyboard having the above effect is intended to be realized by the second prior art, a musical tone comprising only a single sine wave component cannot be produced as stated above. As a result, there is a problem that, even if a modulation depth function I(t) is controlled to be small, for example 0, upon an extremely weak key depression, a control for producing only a single sine wave component, and thus a musical sound with a soft feeling, is impossible.

Further, in the first and second prior art, sometimes a waveform of a sufficient frequency characteristic cannot be obtained by merely providing a waveform output e through a single arithmetic operation as shown by equations (1) and (2). Therefore, these operations can be executed by performing a plurality of predetermined connections and combinations. A waveform output can be obtained by an arithmetic operation in the previous stage and inputted in place of I(t)sin $\omega$t or I(t)T($\theta$) of equations (1) or (2). Such a prior art, in which a sound waveform of a more complex harmonics structure can be composited, is disclosed in Japanese Patent Disclosure Sho 58-211789.

However, where the first prior art is applied to the prior art in which a waveform outputting operation based on a modulation is executed a plurality of times by performing a predetermined connection and combination, a complex connection and combination is necessary to obtain sufficient harmonics components. This is because it is difficult to produce a higher harmonics component with the first prior art. Therefore, when the first prior art is applied to a low-priced musical instrument in which the above connection and combination is limited, a musical sound with a rich sound quality like an actual musical sound cannot be produced and the sound quality of the generated musical sound is limited.

Where the second prior art is applied to the prior art in which a plurality of waveform outputting operations based on a modulation are executed by a predetermined connection and combination, there is an advantage that sufficient harmonics components can be obtained by a relatively simple connection and combination. Conversely, however, there is a problem that a waveform output of a single sine waveform component or a sine wave composite signal such as the musical sound of a hammond organ obtained by parallelly mixing a plurality of single sine wave outputs with different frequencies cannot be obtained and that the sound quality of the musical sound which is able to be produced is limited.

As stated above, in the prior art in which a plurality of waveform output operations based on a modulation is executed by a predetermined connection and combination, a modulation method is not particularly limited. As a result it is easy to perform a musical sound composition comprising a single sine wave component, but it is difficult to obtain a sufficient harmonics component by a simple connection and combination if merely the first musical sound waveform generating method is used. But, when only the second musical sound waveform generating system is used, sufficient harmonic components can be obtained by a simple connection and combination, but a musical sound such as a single sine wave component is difficult to compose. The prior art has mutually contradicting problems.

As a result, when a musical sound generation is conducted based on a combination technology without limiting the modulation method, a musical sound waveform containing many harmonics components immediately after initial production, which gradually fade with time so that only a sine wave component remains, cannot be obtained by simple connection and combination. Therefore, there is a problem that a good musical sound quality cannot be produced in an inexpensive electronic musical instrument.

The frequency structure of respective higher harmonics often differs depending on the kind of musical instrument. Therefore, it is desirable to generate a musical sound with various harmonics structures. However, in the first prior art, a sine wave is driven by a sine wave. Therefore, only a musical sound with a harmonics characteristics produced by a combination of sine waves can be generated. Further, as stated above, it is difficult to produce higher harmonics. Therefore, the tone of the musical sound which can be produced is limited. On the other hand, in the second prior art, a triangular wave is driven by a triangular wave. Therefore, only a musical sound with a harmonics characteristics produced by a combination of the triangular waves can be generated. Therefore, the kind of a musical sound which can be generated is limited.

In addition to the various problems stated above, in order to produce a stereo effect in a musical sound waveform generator of the modulation type as stated above, a musical sound signal is conventionally delayed by a delay element such as a BBD or a RAM. The delay period is independently controlled by respective left and right stereo channels, thereby producing a stereo musical sound signal to provide a stereo effect.

However, the above prior art has a problem that it needs a delay apparatus in addition to an ordinary musical sound generator to obtain a stereo effect, thereby increasing the cost of the entire apparatus.

SUMMARY OF THE INVENTION

An object of the present invention is to generate a musical sound containing components up to a high harmonics and to composite various musical sounds comprising only a single sine wave component or a single cosine wave component.

Another object of the present invention is to control the characteristics of the musical sound based on performance information generated in accordance with a performance operation.

A further object of the present invention is to simply compose a musical sound ranging from a musical sound including up to a higher harmonics component to a musical sound including a single sine wave component or a single cosine wave component only or including a mixture of a plurality of sine wave components or cosine wave components which differ in frequency from each other, through a simple connection combination, where a musical sound waveform is generated by carrying out a waveform outputting operation with a plurality of predetermined connection combinations based on modulations.

A still further object of the present invention is to obtain a stereo effect in composing a musical sound based on a modulation.

According to a first embodiment of the present invention, a musical sound waveform generator for generating a musical sound waveform according to a mixed signal obtained by mixing a modulation signal with a carrier signal is provided with the following structure.

The musical sound waveform generator has a carrier signal generating unit for generating a carrier signal. For example, the carrier signal generating unit receives a carrier wave phase angle signal which repeats an operation in which a phase angle sequentially and linearly increases with time within one period, converts the carrier wave phase angle signal in accordance with a predetermined function to be outputted as a carrier signal, and is constructed by a ROM which receives the carrier wave phase angle signal as an address input. The characteristics of the outputted carrier signal will be explained later.

Next, a modulation signal generating unit for generating a modulation signal is provided. For example, this unit receives a modulation wave phase angle signal which repeats an operation in which a phase angle sequentially and linearly increases with time within one period and converts the modulation wave phase angle signal in accordance with a predetermined function to be outputted as a modulation signal which may be a sine wave, a square wave or a saw-tooth wave and is constructed by a ROM which receives the modulation wave phase angle signal as an address input.

A mixing controlling unit is provided for outputting a mixed signal obtained by mixing said modulation signal with the carrier signal generated by said carrier signal generating unit and for controlling the mixing ratio of said modulation signal to said carrier signal from 0 to a discretional mixing ratio. For example, the mixing controlling unit comprising a multiplier for multiplying the modulation signal outputted from the modulation signal generating unit with a modulation depth value which varies from 0 to 1 in accordance with a predetermined modulation depth function, and an adder for adding the output signal from the multiplier and the carrier signal generated by the carrier signal generating unit thereby outputting a mixed signal. A mixing ratio controlling unit may be provided for varying the mixing ratio with time after the start of sound generation. In this case, the modulation depth value is obtained at every passing time after the start of generation of the musical sound waveform by using the predetermined modulation depth function and is multiplied in the multiplier.

Further, a waveform outputting unit, having a predetermined function relationship between input and output thereof, for outputting a musical sound waveform according to the mixed signal outputted by the mixing controlling unit as an input signal is provided. The waveform outputting unit comprises a decoder for converting a mixed signal in accordance with a predetermined function relationship, to be outputted as a musical sound waveform, or comprises a ROM for receiving a mixed signal as an address input.

The above structure provides a signal in which the predetermined function relationship in the waveform outputting unit is neither a sine function nor a cosine function and the carrier signal generated by the carrier signal generating unit is determined such that the musical sound waveform generated by the waveform outputting unit is a sine wave or a cosine wave with a single frequency, where the mixing ratio of the modulation signal to the carrier signal is made 0 by the mixing controlling unit.

More concretely, the carrier signal generating unit receives a carrier wave phase angle $\omega_{ct}$ [rad], which increases at a constant angular speed and outputs a carrier signal $W_C$[rad], given by the following equations, $$W_c = (\pi/2)\sin\omega_{ct} \ldots (0 \leqq \omega_{ct} \leqq \pi/2)$$

$$W_c = \pi - (\pi/2)\sin\omega_{ct} \ldots (\pi/2 \leqq \omega_{ct} \leqq 3\pi/2)$$

$$W_c = 2\pi + (\pi/2)\sin\omega_{ct}$$

where $\pi$ designates a circle's circumference to its diameter and sin designates a sine wave arithmetic operation. In this case, the waveform outputting unit outputs a musical sound waveform D when receiving the mixed signal x as an input, the waveform D being based on the following equations $$D = (2/\pi)x \ldots (0 \leqq x \leqq \pi/2)$$

$$D = -1 + (2/\pi)(3\pi/2 - x) \ldots (\pi/2 \leqq x \leqq 3\pi/2)$$

$$D = -1 + (2/\pi)(x - 3\pi/2) \ldots (3\pi/2 \leqq x \leqq 2\pi)$$

In the above discussed first embodiment, the musical sound waveform generator can comprise an amplitude envelope controlling unit for changing with time the amplitude envelope characteristics of the musical sound waveform outputted from the waveform outputting unit. For example, the amplitude envelope controlling unit comprises a multiplier for multiplying a musical waveform outputted from the waveform outputting unit with an amplitude coefficient which varies with time from 0 to 1 in accordance with a predetermined amplitude envelope function.

The carrier signal generating unit, the modulation signal generating unit, the mixing controlling unit and the waveform outputting unit perform a time divisional process on a plurality of sound generating channels and polyphonically output a plurality of musical sound waveforms assigned to corresponding sound generating channels.

In accordance with the above discussed first embodiment, the musical sound waveform outputted from the waveform outputting unit has basically a characteristic obtained by converting a carrier signal outputted from the carrier signal generating unit in accordance with a predetermined function relationship. Furthermore, the mixing controlling unit mixes a modulation signal with a carrier signal and a characteristic obtained by modulating the musical sound waveform by the modulation signal is added to the characteristic of the musical sound waveform.

Harmonics components can thereby be added as a frequency characteristic of a musical waveform and a musical sound which is near a musical sound of an actual musical instrument can be composed, thereby providing an individualistic composite sound.

In particular, by predetermining a function relationship other than a sine function or a cosine function in a waveform outputting unit, more and higher harmonics components can be included in the outputted musical waveform.

Further, a mixing controlling unit can generate a musical sound waveform having various frequency characteristics by discretionally changing and determining a mixing ratio of the modulation signal to the carrier signal.

In this case, not only by determining the mixing ratio before the performance starts, but also by varying the mixing ratio with time after the start of sound generation, it becomes possible to gradually change the frequency characteristics of the musical sound waveform after the start of sound generation.

More particularly, in the present invention, the characteristics of the carrier signal from the carrier signal generating unit are determined such that the musical sound waveform generated by the waveform outputting unit is a sine wave or a cosine wave with a single frequency, where the mixing ratio of the modulation signal is made 0 by the mixing controlling unit. Therefore, the mixing controlling unit presets the mixing ratio of the modulation signal to be 0, making it possible to generate a musical sound waveform comprising only a sine wave or a cosine wave of a single frequency.

During the performance, the mixing ratio can, for example, be determined at a high value immediately after the start of sound generation and thereafter reduced to near 0 with time. Thereby, the frequency characteristics of the musical sound waveform can be controlled such that the musical sound waveform is changed from one comprising a lot of higher harmonics to one comprising only a single sine wave component or a single cosine wave component. Therefore, as observed in the musical sound of an actual musical instrument, a process in which the amplitude of a higher harmonic component is gradually decreased, finally leaving only a single sine wave component, can be realized.

An amplitude envelope characteristic of a musical sound waveform outputted from the waveform outputting unit is controlled by the amplitude envelope controlling unit so that it is reduced with time. After the start of sound generation, a process in which the musical sound waveform is gradually reduced can thereby be realized as observed in the musical sound of the real musical instrument.

As described above, in the first embodiment of the present invention, both a state in which many higher harmonics are included and a state in which only a single sine wave component or a single cosine wave component is included are easily generated. A structure for realizing the states can be formed by combining only an ordinary ROM, a decoder, an adder, and a multiplier, thus enabling a complex musical sound waveform to be realized in a simple circuit structure. As a result, a high-quality electronic musical instrument can be provided at a low cost.

Now, the predetermined function relationship in the waveform outputting unit can be determined such that one of a sine wave and a cosine wave with a single frequency is outputted from the waveform outputting unit when the mixing ratio is a predetermined value, and wave shapes of the carrier signal and the modulation signal are specified ones.

The second embodiment of the present invention will now be explained. The second embodiment is of the same modulation type as the first embodiment and provides a musical sound waveform generator in which the characteristic of the musical sound waveform is controlled based on the performance information generated in accordance with a performance operation. Performance information in this case comprises pitch information representing which key is depressed, velocity information representing the speed at which the key is depressed, after-touch information representing a pressure with which the key is depressed, or key region information representing which a key region is selected in which key is to be depressed, when a keyboard instrument is applied to the present invention.

The carrier signal generating unit and the modulation signal generating unit are the same as those in the first embodiment. These generating units generate a carrier signal or a modulation signal in accordance with respective performance information. In this case, for example, the period of the carrier wave phase angle signal is determined to correspond to pitch information and the period of the modulation wave phase angle signal is determined to provide a predetermined ratio of the period of the modulation wave phase angle signal to that of the carrier wave phase angle signal generated based on the pitch information.

The mixing controlling unit is the same as that in the first embodiment and, in this case, the mixing ratio is made to change in accordance with a mixing characteristic corresponding to performance information. In this case, the modulation depth value of the modulation depth function as in the first mode and the rate of variation with time are controlled in accordance with the above performance information.

Further, the waveform outputting unit is provided, as in the first embodiment.

The amplitude envelope controlling unit in the second embodiment is the same as that in the first embodiment. Thus, the same amplitude coefficient as in the first embodiment and its variation rate are controlled in accordance with the performance information. The second embodiment is also constructed so that the musical sound waveform can be polyphonically outputted in the same manner as in the first embodiment.

In the second embodiment, adding to the advantage in the first embodiment, the mixing characteristic in the mixing controlling unit is determined before the start of a performance and is changed in accordance with velocity information or key region information, i.e., performance information. Thus, the frequency characteristics of the musical sound waveform are changed in accordance with performance operation. In particular, by controlling the mixing characteristic, it becomes possible to control respective amplitude values of the harmonics components determined by the carrier signal and modulation signal.

Therefore, during a performance, when a key is strongly depressed, the mixing ratio becomes high. Conversely, when a key is weakly depressed, the mixing ratio is made close to 0. If constructed as recited above, a state in which many higher harmonics are included and a state in which only a single sine wave component or a single cosine wave component is included can be selectively generated in accordance with the performance operation. By varying the mixing ratio with time, the frequency characteristics of the musical waveform can be made to change with time, and the rate of variation with time of the mixing ratio is controlled in accordance with the performance information. Thus, the frequency characteristic of the musical waveform can be changed with time in accordance with a performance operation.

As recited above, in the second embodiment of the present invention, both a state in which many higher harmonics are included and a state in which only a single sine wave component or a single cosine wave component is included are easily generated, and these states can be selectively changed in accordance with a performance operation.

Next, the third embodiment of the present invention will be explained.

This embodiment is a musical sound waveform generator of the modulation type, similar to the first embodiment.

This embodiment includes at least one basic process unit as a basic structure. Each basic process unit comprises a carrier signal generating unit for generating a carrier signal, a mixed signal outputting unit for outputting a mixed signal by mixing the modulation signal with the carrier signal, a waveform outputting unit, having a predetermined function relationship between input and output thereof, for outputting a waveform signal according to the mixed signal outputted by the mixing signal outputting unit as an input signal, and an amplitude envelope characteristics controlling unit for controlling the amplitude envelope time characteristics of the waveform signal outputted from the waveform outputting unit.

The carrier signal generating unit and the modulation signal generating unit are the same as in the first embodiment and the carrier signal and the predetermined function relationship where no modulation signal is inputted to the mixing signal outputting unit (namely, where the value is 0) is the same as where the mixing ratio in the mixing controlling unit is made 0 in the first embodiment. Accordingly, the single basic process unit can easily generate a musical sound waveform varying from one comprising only a sine wave or a cosine wave of a single frequency to one which includes a lot of higher harmonics components.

Based on the basic process unit, this embodiment further comprises a waveform input and output controlling unit for outputting a waveform signal outputted from the last stage as a musical waveform, by combining a first connection for inputting the modulation signal, which has a value of 0 or near 0, to a basic process unit, a second connection for inputting another waveform signal as a new modulation signal input to a basic process unit, or a third connection for obtaining a new waveform signal by mixing a waveform signal obtained by one basic process unit with respective waveform signals obtained by at least one of other basic process unit, based on a previously determined connection combination, thereby connecting the basic process unit.

Therefore, if the first connection is carried out, a waveform signal comprising a single sine wave or a cosine wave is generated. If the second connection is carried out, the modulated waveform signal is further used as the next modulation waveform, an extremely deeply modulated waveform signal can be generated.

Further, if the third connection is carried out, a waveform signal in which a waveform signal comprising different harmonics components is mixed is formed. By combining these connections, a final musical sound waveform having an extremely complex characteristic can be generated.

In particular, the present invention can easily provide sufficient harmonics components even if a simple connection combination is applied, and can easily provide a musical sound waveform comprising only a single sine wave component or a single cosine wave component.

This embodiment may be constructed such that a single basic process unit is operated in a time divisional manner, instead of connecting a plurality of basic process units.

In this case, instead of the above waveform input and output controlling unit, the present invention provides a waveform input and output controlling unit for executing a first, a second or a third arithmetic operation. The first arithmetic operation is for obtaining the waveform signal by operating the basic process unit by making the modulation signal input 0 or near 0 at respective process timings within respective arithmetic operation periods, each period comprising a plurality of process timings. The second arithmetic operation is for obtaining a new waveform signal by operating the basic process unit using a waveform signal obtained by a process timing prior to the present process timing as a new modulation signal input. The third arithmetic operation is for mixing respective waveform signals obtained in at least one process timing preceding the present process timing with a waveform signal obtained from the first or second arithmetic operation, based on a predetermined connection combination. Thus, the waveform signal obtained at the last process timing is generated within the arithmetic operation period as the musical sound waveform of the arithmetic operation period. The waveform input and output controlling unit comprises, for example, a first and second accumulating unit, a first and second switching unit, a multi-stage operation controlling unit and a musical waveform outputting unit. The first switching unit inputs a waveform signal selectively outputted from the basic process unit to the first or second accumulating unit. The second switching unit selectively inputs a value 0 or near 0 or an output from the second accumulating unit as a modulation signal to the basic processing unit. The multi-stage operation controlling unit controls an accumulation operations in the first and second accumulating unit and selection operations in the first and second switching unit at respective process timings within respective arithmetic operation periods each comprising a plurality of timings, based on a predetermined connection combination, thereby operating the basic process unit at units of respective process timings at multi-stages. And the musical waveform outputting unit outputs the output of the first accumulating unit as the musical sound waveform of the operation period at every completion of respective arithmetic operation period.

The operation period, for example, corresponds to a sampling period.

In accordance with the above structure, the same effect as recited above can be obtained by using a single basic process unit. Thus, the circuit scale can be reduced and a structure having a high degree of freedom to perform connection combination can be realized.

Next, the fourth embodiment of the present invention will be explained.

The basic structure of this embodiment is the same as that of the third embodiment.

The fourth embodiment has a setting unit for enabling a user to set the connection combination. For example, the setting unit enables a user to set an input and output relation in the basic process unit between respective process timings in the third embodiment as a symbolized arithmetic operation equation, thereby setting the connection combination.

Next, the fourth embodiment has a displaying unit for displaying the connection combination determined by the setting unit. As an example, the displaying unit displays the connection combination determined by the setting unit by using a symbolized arithmetic operation equation as is similar to the above setting unit. The displaying unit, as another example, treats the basic process unit as one unit at every process timing and displays connection combination determined by the setting unit by diagramatically displaying connection relationships between units.

In accordance with the fourth embodiment, a user (a player) can effectively determine a connection combination in the musical sound waveform generator in the third embodiment and can display it in an easily understood format. Thus, it can realize a musical sound waveform generator with an extremely high operational capability.

Next, the fifth embodiment of the present invention will explained. The basic structure of this embodiment is similar to that of the third embodiment but the waveform input and output controlling unit performs a slightly different function.

The waveform input and output controlling unit generates a musical sound waveform by enabling the first, second or third arithmetic operation to be carried out based on a predetermined connection combination in which the combination varies with time after starting generation of respective musical sound waveforms, thereby generating the musical waveform.

This embodiment can automatically changed from a connection combination in which a musical sound waveform including extremely higher harmonics components can be generated to a connection combination in which a musical sound waveform including only a single sine wave or a single cosine wave can be generated and therefore, can perform the operation of the sound generation in an extremely large range.

The sixth embodiment of the present invention is explained. The basic structure of this mode is the same as that of the third embodiment.

In this embodiment, the waveform input and output controlling units perform a process on a plurality of sound generating channels in a time divisional manner and polyphonically outputs a plurality of musical sound waveforms assigned corresponding to respective sound generating channels.

This embodiment can realize the operation based on the third mode in a polyphonic manner.

Next, the seventh embodiment of the present invention will be explained. This embodiment provides the same musical sound waveform generator of the modulation type as in the first embodiment.

This embodiment has a basic process unit which is similar to that of the third mode as a basic structure. This unit comprises a carrier signal generating unit for generating a carrier signal, a mixing controlling unit for outputting a mixed signal obtained by mixing a modulation signal with the carrier signal and for controlling the mixing ratio of the modulation signal to the carrier signal from 0 to a selected mixing ratio, and a waveform outputting unit, having a predetermined function relationship between input and output thereof, for outputting a waveform signal according to the mixed signal outputted by the mixing controlling unit as an input signal. Thus, a plurality of these processing units is provided.

The carrier signal generating unit and the modulation signal generating unit are the same as those in the first mode and the carrier signal and the predetermined function relationship, where the mixing ratio of the modulation signal in the mixing controlling unit is 0, is the same as in the first mode. Therefore, the basic process unit can easily generate a musical sound waveform from one comprising a sine wave or a cosine wave of a single frequency to one comprising a musical sound waveform including a lot of harmonics components, as in the first embodiment.

The seventh embodiment includes a waveform input and output controlling unit for outputting a waveform signal outputted from the last stage as a musical waveform, by combining first to fourth connections based on a previously determined connection combination, thereby connecting the basic process unit. The first connection is for inputting the modulation signal, which has a value of 0 or near 0, to a basic process unit. The second connection is for inputting another waveform signal as a new modulation signal input to a basic process unit. The third connection is for obtaining a new waveform signal by mixing a waveform signal obtained by one basic process unit with respective waveform signals obtained by at least one of other basic process units. And the fourth connection is for forming a modulation signal input to a basic process unit by the signal which is the waveform signal fed back by the basic process unit to itself.

The seventh embodiment is different from the above recited third embodiment in that it includes the fourth connection for forming a modulation signal input to a basic process unit by the signal which is the waveform signal fed back by the basic process unit to itself. As such connection is included, the amplitude envelope characteristic of the harmonic component of the musical sound waveform can be made special, thereby generating a characteristic musical sound waveform. It is constructed, in accordance with the present invention, such that, on the one hand, a sufficient harmonic component can be obtained even with a simple connection combination and, on the other hand, a musical sound waveform comprising only a single sine wave component or a single cosine wave component can be easily obtained, thereby providing a great result.

Next, the eighth embodiment of the present invention will be explained. The mode includes a plurality of the same basic process unit as in the seventh embodiment.

The eighth embodiment includes the above basic process unit as a basis, and a waveform input and output controlling unit for continuously combining a connection for inputting a waveform signal provided by the preceding basic process unit to the present basic process unit as a new modulation signal input at a plurality of stages, for outputting the waveform signal obtained by the basic process unit at the last stage as a musical sound waveform. The waveform input and output controlling unit feeds back the waveform signal to the basic process unit at a first stage as a modulation signal input.

The eighth embodiment is different from the seventh embodiment in that the basic process unit feeding back the waveform signal to the modulation signal is one which is one of the previous basic process units instead of being a basic process unit feeding back the waveform signal to itself. By including such a connection, the amplitude envelope characteristic of a harmonic component of the musical waveform can be made different from one in the seventh mode, thereby generating a characteristic musical sound waveform.

Next, the ninth embodiment of the present invention will be explained. This embodiment provides a musical sound waveform generator of the same modulation type as in the first embodiment.

First, it has the same carrier signal generating unit in the first embodiment.

Sequentially, it includes a modulation signal generating unit for selectively generating plural kinds of modulation signals. This is different from the first mode in that it can generate plural kinds of the modulation signals. The modulation signal generating unit comprises a storing unit, a selecting unit and an outputting unit. The storing unit is such as a ROM, and stores plural kinds of modulation functions beforehand. The selecting unit selects one of plural kinds of modulation functions stored in the storing unit. The outputting unit generates a modulation wave corrected phase angle signal by converting the inputted modulation wave phase angle signal by a modulation function selected by said selecting unit, and converts the modulation wave corrected phase angle signal based on a triangular waveform function and, thus, generates the modulation signal such as a sine wave, a rectangular wave or a saw-tooth wave.

Next, this embodiment has a mixing controlling unit for outputting a mixed signal obtained by mixing the modulation signal selectively generated with the carrier signal generated by the carrier signal generating unit and for controlling the mixing ratio of the modulation signal to the carrier signal from 0 to a selected mixing ratio. This structure is the same as in the first mode.

Thereby this embodiment has the same waveform outputting unit as in the first mode.

The ninth embodiment can be constructed to have the amplitude envelope controlling unit as in the first embodiment and is constructed to polyphonically generate the musical sound waveform as in the first mode.

In the ninth embodiment, the modulation signal generating unit selectively generates plural kinds of modulation signals and it becomes possible for the mixing controlling unit to change a characteristic of a modulation signal mixed with the carrier signal. As a result, it becomes possible for the waveform outputting unit to generate a plural kinds of musical sound waveforms having various harmonics characteristics.

Next, the tenth embodiment of the present invention will be explained. This embodiment is the modulation type as shown in the first mode and provides the musical sound waveform generator for generating the musical sound waveform in a stereo manner.

It includes the carrier signal generator and modulation signal gnerator as is similar to the first mode. For example, it comprises a mixing unit for outputting a mixed signal obtained by mixing a modulation signal with a carrier signal generated by the carrier signal generating unit, and mixing ratio controlling unit for varying the mixing ratio of the modulation signal to the carrier signal in the mixing unit from 0 to a discretional mixing ratio with time. The combination of this mixing unit with the mixing ratio controlling unit is the same as the mixing controlling unit in the first mode. Further, as is similar to the first mode, it has a waveform outputting unit.

In addition to the above structrue, the tenth embodiment has a time divisional controlling unit for performing a time divisional control of the carrier signal generating unit, the modulation signal generating unit and the mixing ratio controlling unit so that at least one of them generates values which are different between respective stereo channels, and inputting mixed signals of respective stereo channels from the mixing units at respective time divisional timings based on the time divisional control to the waveform outputting unit, thereby outputting respective musical sound waveforms modulated independently for respective stereo channels.

The tenth embodiment can be constructed to have the amplitude envelope controlling unit as in the first embodiment. In this case, it is controlled to vary with time the amplitude envelope characteristics of respective musical sound waveforms independently outputted from the waveform outputting unit for respective stereo channels so that the respective amplitude envelope characteristics are different between respective stereo channels.

The carrier signal generating unit, the modulation signal generating unit, the mixing unit, the mixing ratio controlling unit, the waveform outputting unit and the time divisional controlling unit perform a time divisional process by dividing the respective stereo channels further into a plurality of sound generating channels and stereophonically and polyphonically output a plurality of musical sound waveforms assigned to corresponding sound generating channels.

In a musical sound waveform generator of converting a signal obtained by mixing a modulation signal with a carrier signal in a predetermined function relationship to provide a musical sound waveform can obtain musical sound waveform of different characteristics by varying a modulation state. Particularly, the modulation signal is made to a form of a sine wave having low frequency of several Hz to several tens of Hz to be mixed with a carrier signal. A function conversion can thereby be carried out based on the mixing signal obtained as described above, to be able to add a chorus effect to the musical sound waveform. If the mixing ratio at this time is respectively made different to provide a plurality of mixing signals, a stereo effect can be obtained by simultaneously generating a plurality of musical sound waveforms based on these mixing signals which are different from each other.

The modulation signals and the mixing ratios of respective stereo channels are independently controlled to be different depending on respective stereo channels and the carrier signal is commonly used. Then, the mixing signals are generated for respective stereo channels and the modulation can be carried out based on the mixing signal generated independently, thereby easily generating the musical sound waveform for respective stereo channels. Previously or with time, a mixing ratio of a modulation signal to a carrier signal in the mixing ratio controlling unit can be selectively detemined to be between 0 to a value other than 0, and it is possible to freely control and generate a state from one in which a lot of higher harmonics are included to one in which only a single sine wave component or a single cosine wave component is included. Thereby, a musical sound close to a real musical instrument or an individualistic composite sound can be obtained in a stereo manner.

Next, an eleventh embodiment of the present invention will be explained. The present mode provides a musical sound waveform generator of the same modulation type as in the first mode in which a characteristic of the musical sound waveform is controlled based on the performance information generated in accordance with a performance operation.

In addition to the first embodiment, the eleventh embodiment includes a random controlling unit for performing a control so that at least one of the carrier signals generated by the carrier signal generating unit, and the modulation signal generated by the modulation signal generating unit or the mixing ratio controlled by the mixing controlling unit includes a component which varies randomly.

In this case, it provides a great effect if it is controlled so that the musical sound waveform includes a component which varies randomly within a predetermined time period after the start of generation of the musical sound. The predetermined time period is one of the attack period, decay period, sustain period or release period in the amplitude envelope characteristics of the musical sound waveform.

The eleventh embodiment may be constructed such that it comprises an amplitude envelope random controlling unit for performing a control such that the amplitude envelope characteristics of the musical sound waveform outputted from the waveform outputting unit includes a component which varies randomly within a predetermined time period after the start of generation of the musical sound waveform.

The eleventh embodiment can continuously generate a musical sound waveform from a musical sound waveform comprising only a single sine wave or a cosine wave to one including a lot of harmonics components. It can also add simultaneously a natural feeling of pitch, timbre and volume of the generated musical sound. Therefore, characteristics similar to those of a natural musical instrument can be realized.

Finally, the twelfth embodiment of the present invention will be explained.

This embodiment provides a modulation type musical sound waveform generator for controlling a characteristic of a musical sound waveform based on performance information generated in accordance with the performance operation in the same manner as in the second mode.

This embodiment has the same carrier signal generating unit, modulation signal generating unit, mixing controlling unit and waveform outputting unit as the first or second embodiment. However, it differs from the second embodiment in that a mixing ratio in the mixing controlling unit is not controlled based on the performance information but that a frequency ratio controlling unit controls the frequency ratio of the modulation signal to the carrier signal. The frequency ratio controlling unit controls the frequency ratio, for example, by using the timbre of the generated musical sound waveform. Where the performance operation is the depression of a key on a keyboard, the frequency ratio controlling unit controls the frequency ratio in accordance with at least one of key depression speed or a key region of the depressed key.

According to the twelfth embodiment, it is possible to change a frequency characteristic of the musical waveform in accordance with a predetermined timbre, depressed key operation or a key region of a depressed key, as in the second embodiment. In particular, it becomes possible to control the frequency structure of the harmonics components by controlling the frequency ratio of the modulation signal to the carrier signal. As a result, the twelfth mode can provide a special characteristic, different from the second mode, to the musical sound waveform.

BRIEF DESCRIPTION OF THE DRAWINGS

Other objects and features of the present invention will be easily understood by a person skilled in the art based on a recitation of the preferred embodiment of the present invention, together with the attached drawings.

DESCRIPTION OF THE PREFERRED EMBODIMENTS

Figure 1:
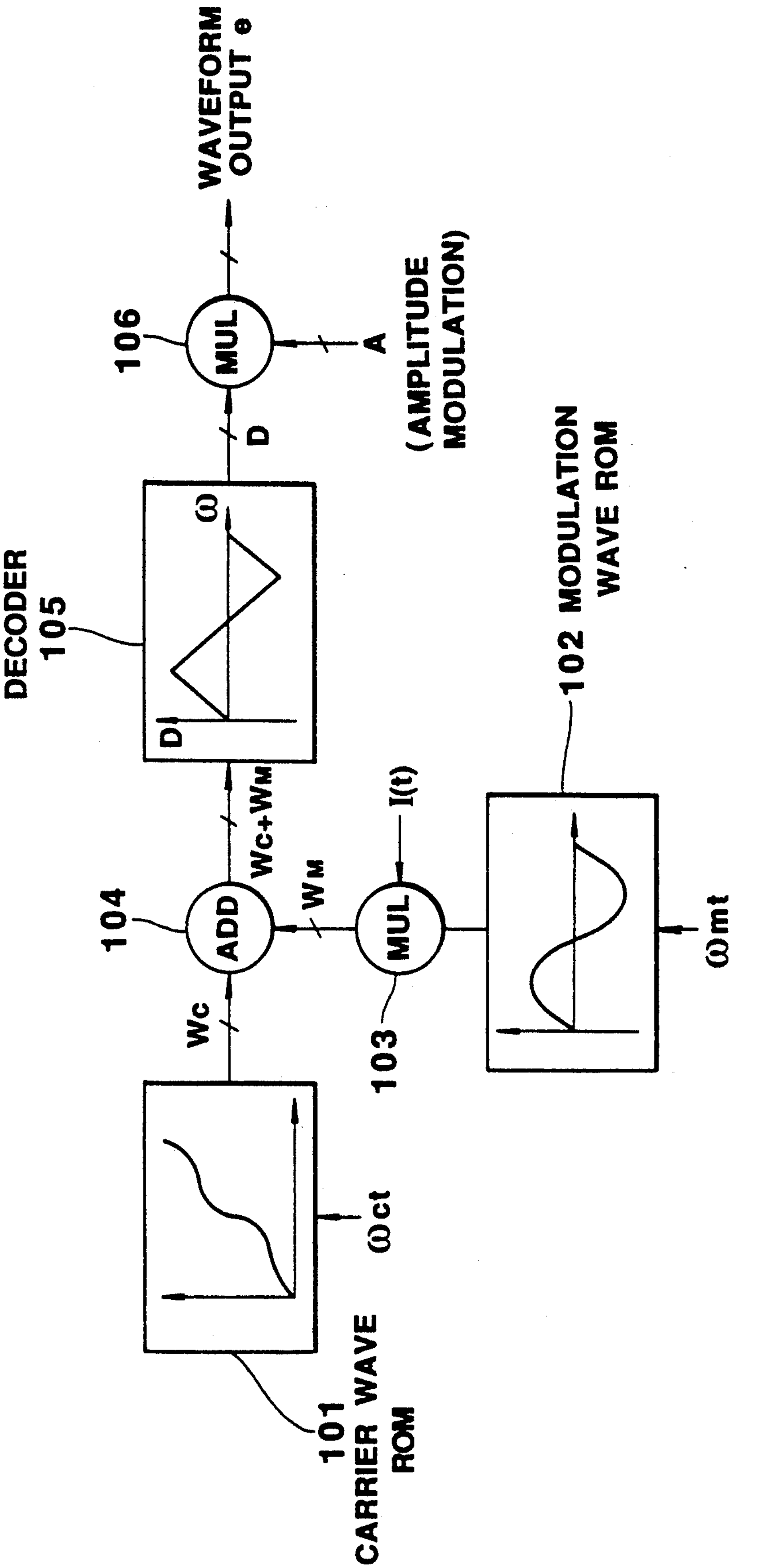
FIG. 1 is view depicting the a principle structure of the first embodiment.

Embodiments of the present invention will be explained by referring to the drawings.

1. An explanation of the first embodiment

First, the first embodiment of the present invention will be explained. To begin with, a principle of the first embodiment is explained.

FIG. 1 shows the principle of the first embodiment. A carrier wave phase angle $\omega_{ct}$ sequentially increasing linearly between 0 and $2\pi$[rad] is made to be an address of a carrier wave ROM 101 to read carrier signal $W_c$. Carrier wave phase angle $\omega_{ct}$ is obtained by multiplying time t[sec] by angular speed $\omega_c$[rad/sec]. "ct" is expressed as a group in a form of a suffix hereinafter if a specific reference is not made. A modulation wave phase angle $\omega_{mt}$ sequentially increasing linearly between 0 and $2\pi$[rad] is made to be an address of a modulation wave ROM 102 and a modulation signal read from modulation wave ROM 102 is multiplied by modulation depth function I(t)[rad], changing with time in a multiplier, hereinafter called MUL 103, to provide a modulation signal $W_M$. This modulation wave phase angle $\omega_{mt}$ is obtained by multiplying angular speed $\omega_m$ [rad/sec] by time t [sec] and "mt" is expressed as a group and in a suffix form if a specific reference is not made.

Modulation signal $W_M$ is added to carrier signal $W_C$ in adder (called ADD hereinafter) 104 and the added waveform $W_C+W_M$[rad] is further decoded by decoder to provide a decoded output D.

Decoded output D is multiplied by amplitude coefficient A in MUL 106 to finally provide waveform output e.

Figure 2:
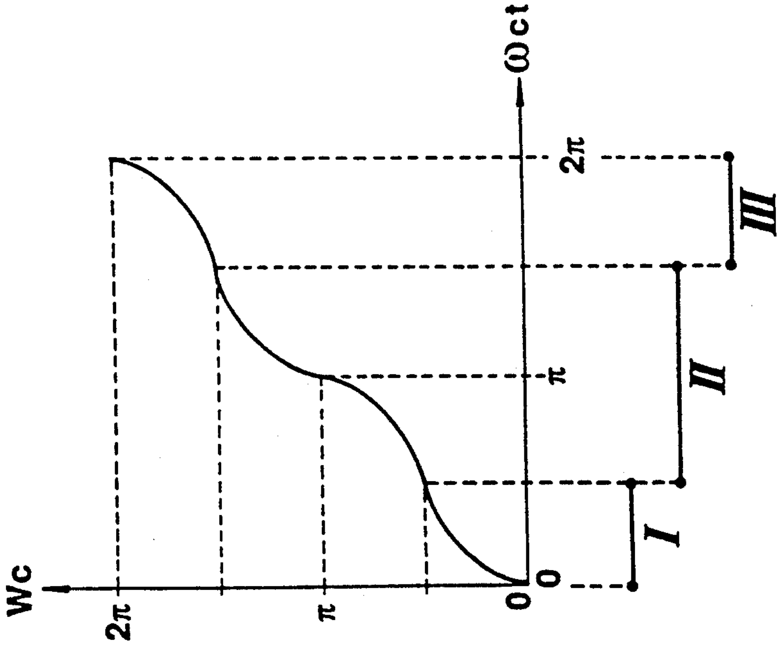
FIG. 2 is a drawing designating a memory content of a carrier wave ROM in the principle structure of the first embodiment.
Figure 4A:
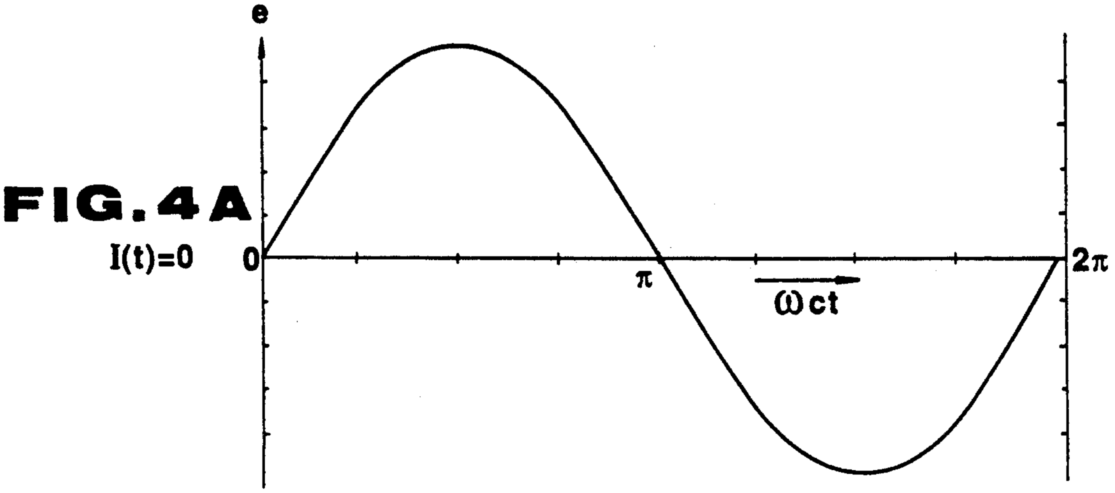
FIGS. 4A to 4I are views representing relations between I(t) and waveform output e in the principle structure of the first embodiment, where $\omega_{mt}=\omega_{ct}$.
Figure 4B:
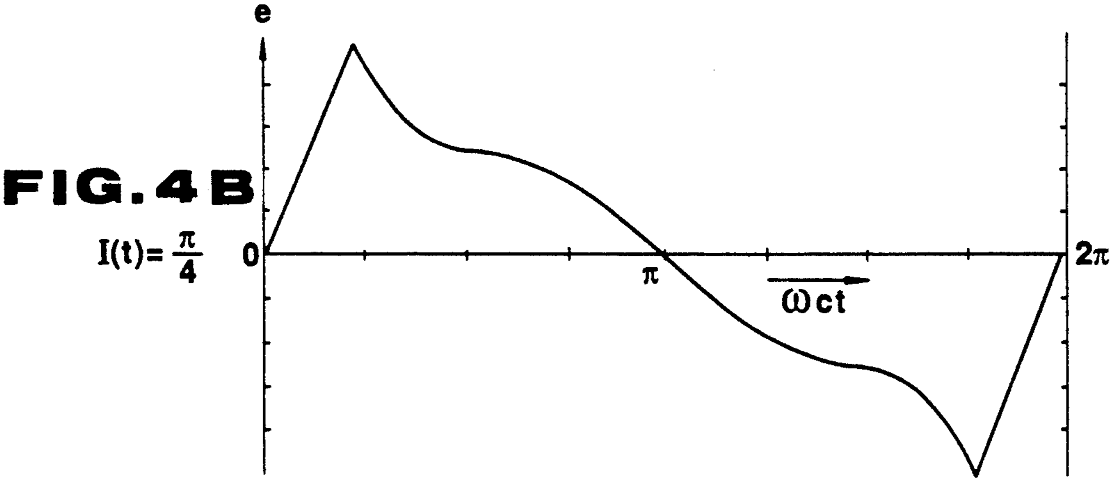
Figure 4C:
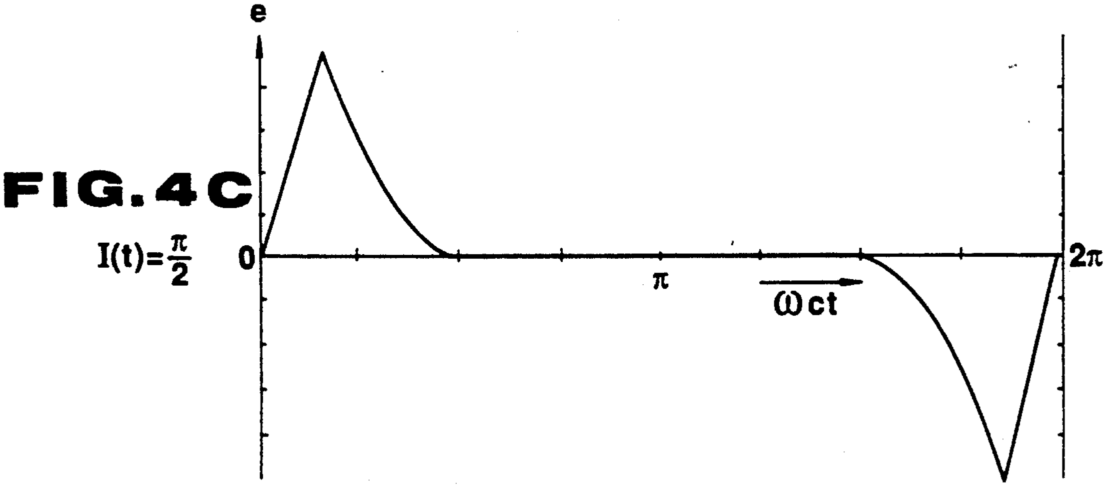
Figure 4D:
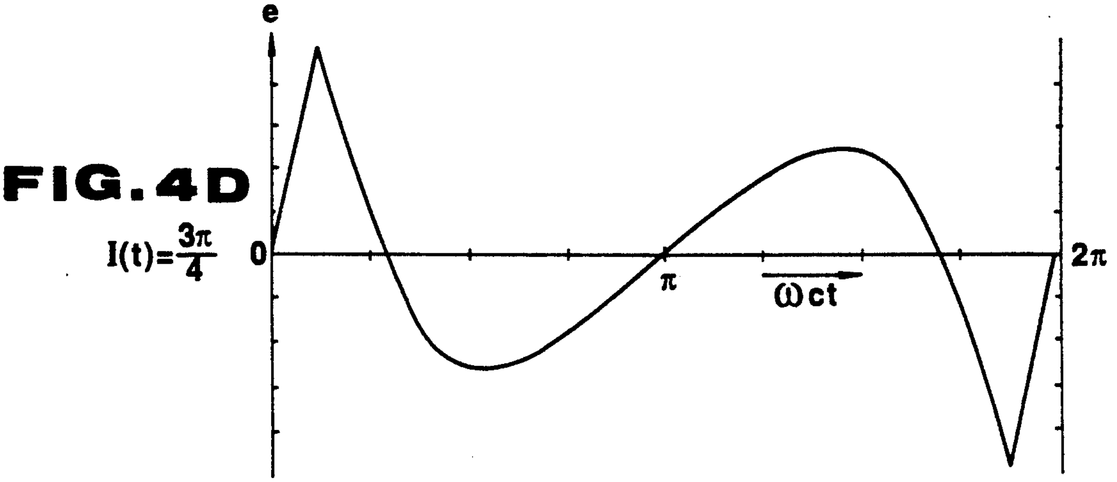
Figure 4E:
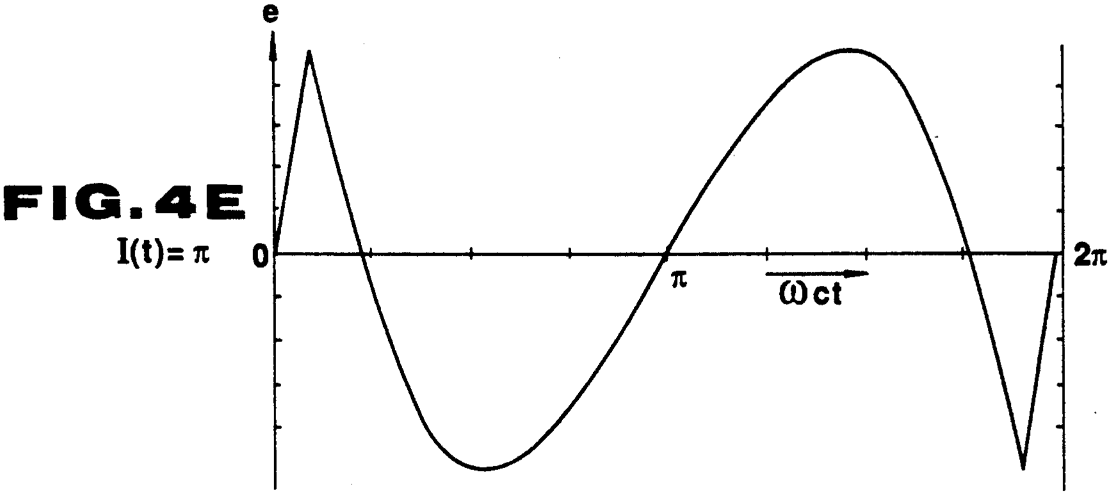
Figure 4F:
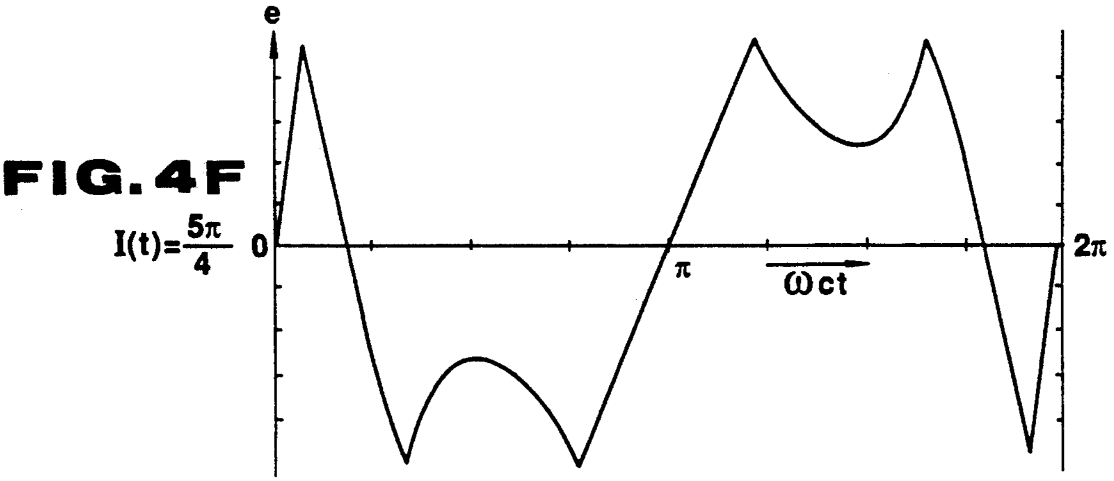
Figure 4G:
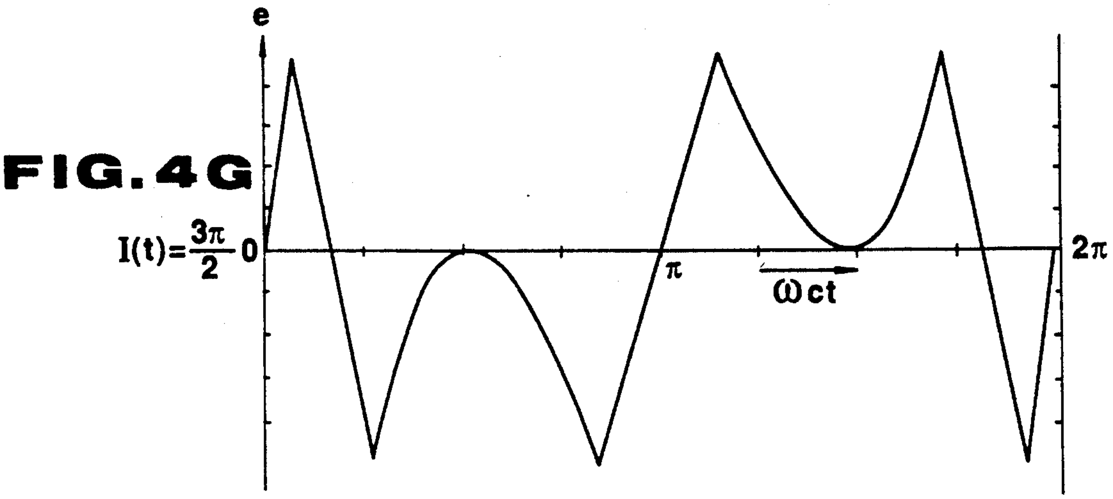
Figure 4H:
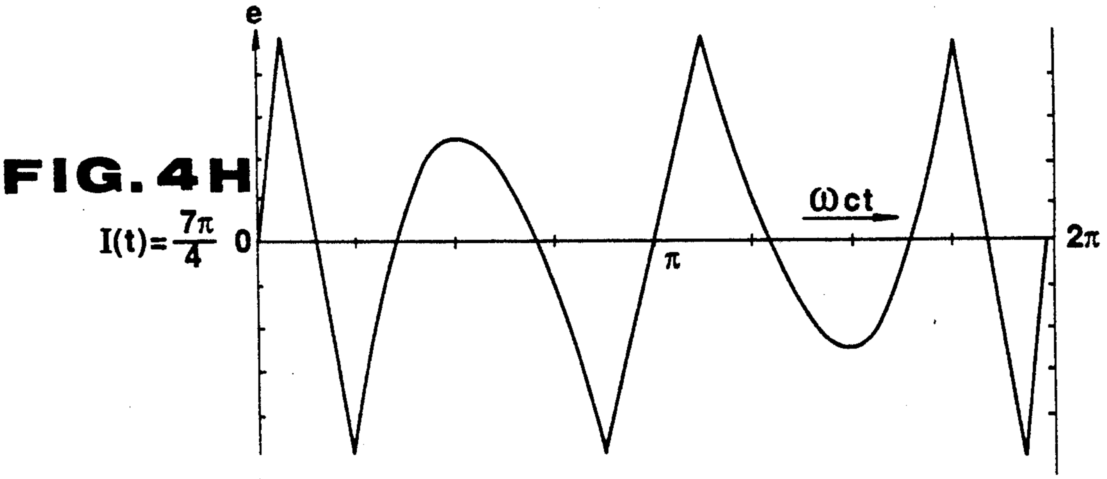
Figure 4I:
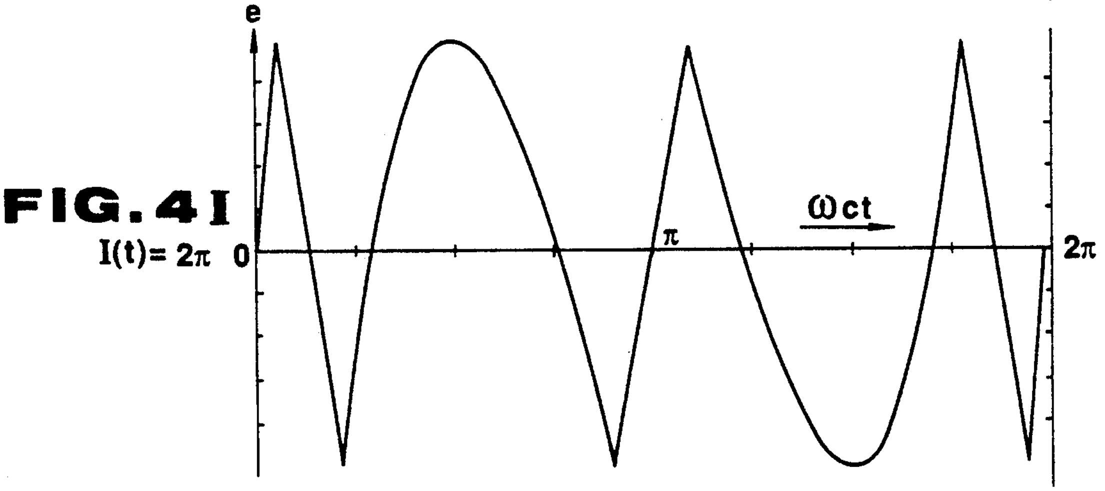
Figure 5A:
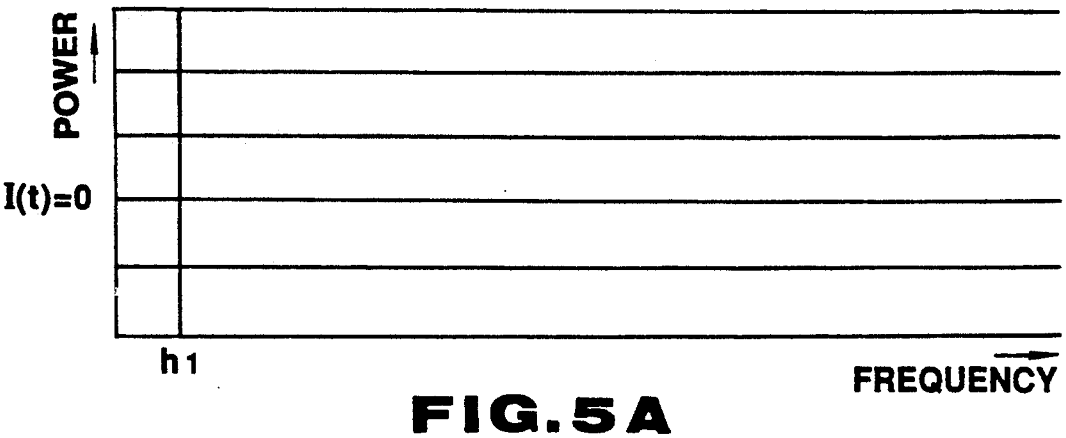
FIGS. 5A to 5I are views representing relations between I(t) and the frequency characteristic of waveform output e in the principle structure in the first embodiment, (where $\omega_{mt}=\omega_{ct}$)
Figure 5B:
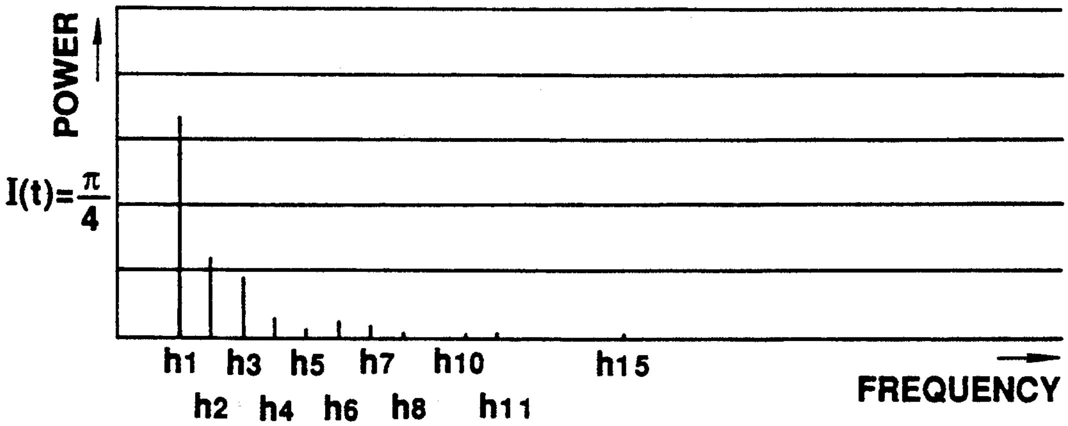
Figure 5C:
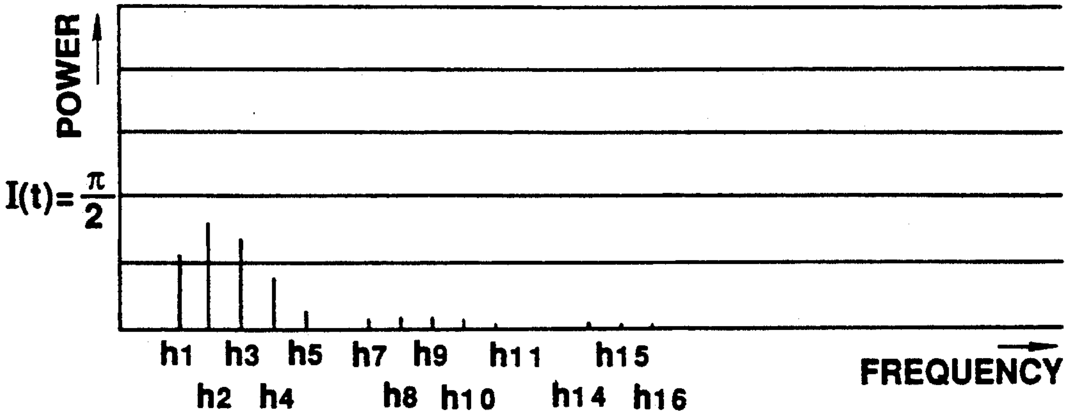
Figure 5D:
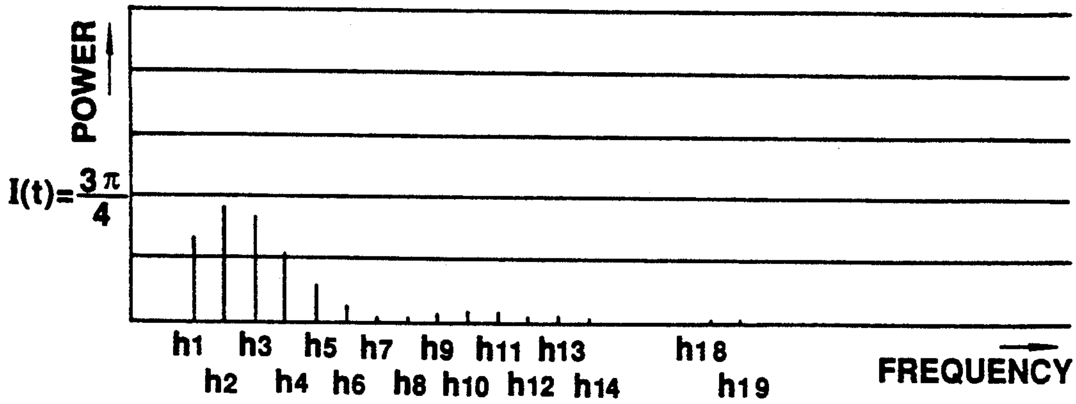
Figure 5E:
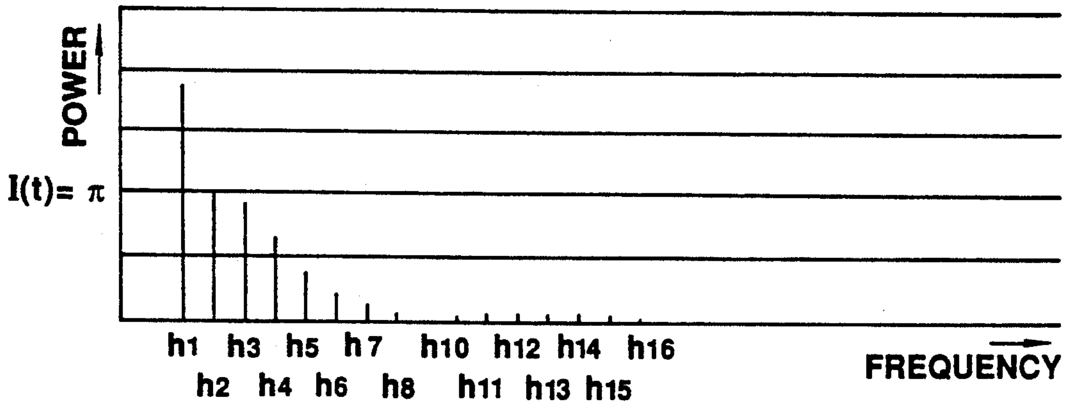
Figure 5F:
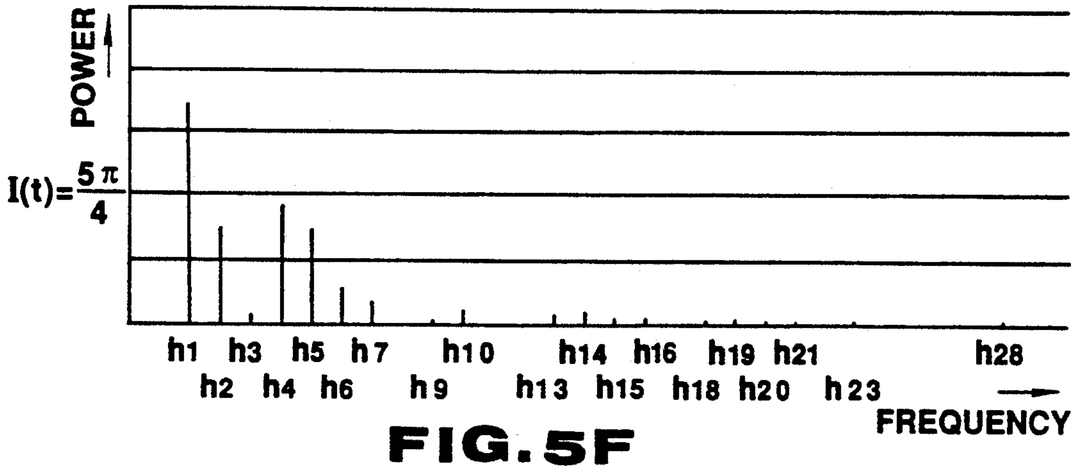
Figure 5G:
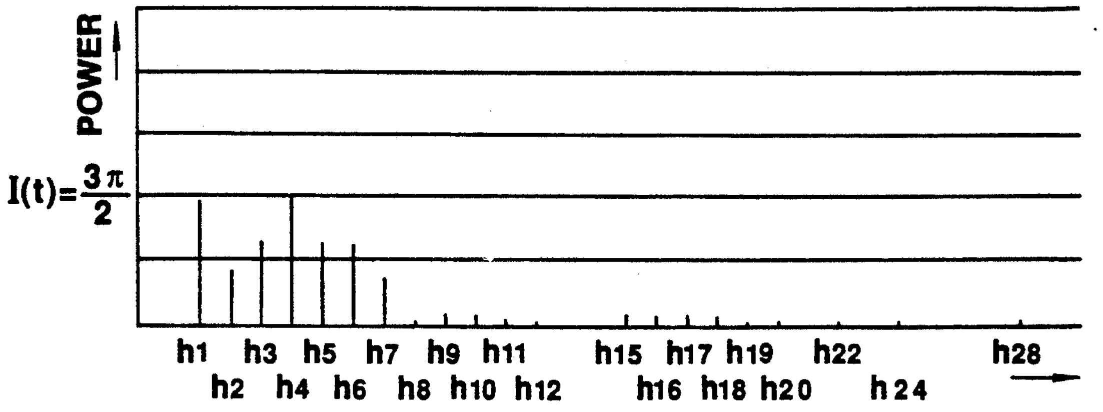
Figure 5H:
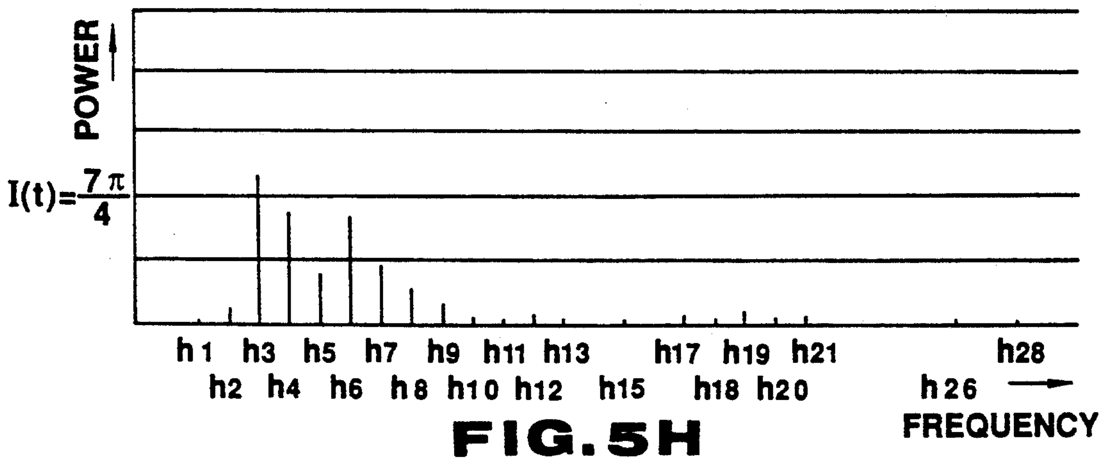
Figure 5I:
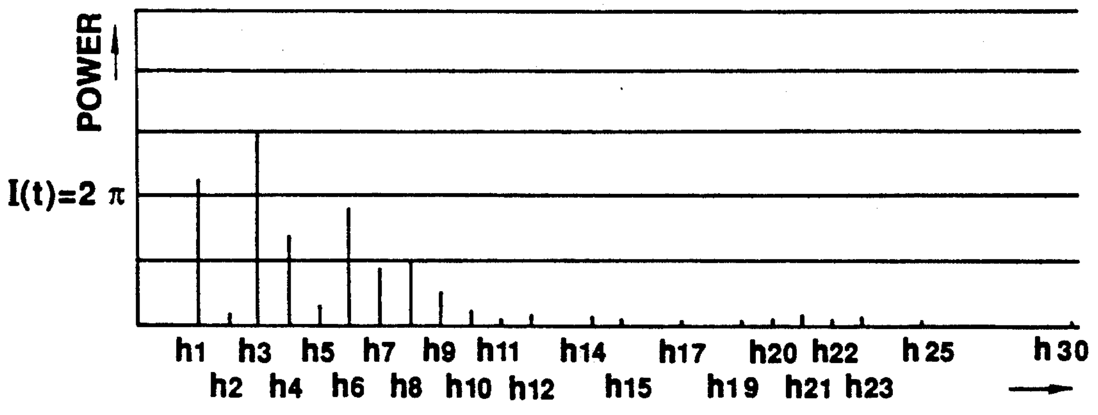

In a musical sound waveform generator with the above structure, the function wave shown in FIG. 2 is stored in carrier wave ROM 101. Supposing that $\pi$, representing the ratio of a circle's circumference to its diameter, and the relation between a carrier wave phase angle $\omega_{ct}$[rad] and a carrier signal $W_C$[rad] in respective regions I, II and III, is as follows.

$$W_c = (\pi/2)\sin\omega_{ct} \ldots (\text{regionI: } 0 \leqq \omega_{ct} \leqq \pi/2) \quad (3)$$

$$W_c = \pi - (\pi/2)\sin\omega_{ct} \ldots (\text{regionII: } \pi/2 \leqq \omega_{ct} \leqq 3\pi/2)$$

$$W_c = 2\pi + (\pi/2)\sin\omega_{ct} \ldots (\text{regionIII: } 3\pi/2 \leqq \omega_{ct} \leqq 2\pi)$$

On the other hand, an ordinary sine function waveform is stored in the modulation wave ROM 102. Therefore, the relation between modulation wave phase angle $\omega_{mt}$[rad] and modulation signal $W_M$[rad] after passing MUL 103 is expressed by the following equation.

$$W_M = I(t) \sin \omega mt \quad (4)$$

Carrier signal $W_C$ and modulation signal $W_M$ calculated in accordance with the above equations (3) and (4) are added and inputted to decoder 105, thereby causing output D to be outputted from decoder 105. Waveform output e obtained after the decoded output D is multiplied by amplitude coefficient A in MUL 106 is as follows.

$$e = A \cdot TRI\{(\pi/2)\sin\omega_{ct} + I(t)\sin\omega_{mt}\} \; . . \; (0 \leqq \omega_{ct} \leqq \pi/2) \quad (5)$$

$$e = A \cdot TRI\{\pi - (\pi/2)\sin\omega_{ct} + I(t)\sin\omega_{mt}\} \; . . \; (\pi/2 \leqq \omega_{ct} \leqq 3\pi/2)$$

$$e = A \cdot TRI\{2\pi + (\pi/2)\sin\omega_{ct} + I(t)\sin\omega_{mt}\} \; . . \; (3\pi/2 \leqq \omega_{ct} \leqq 2\pi)$$

TRI(x) is defined as a triangular wave function.

When the value of modulation depth function I(t) is 0, namely, in case of non-modulation, the waveform inputted to decoder 105 is carrier signal $W_C$ itself determined by equation (3). Namely, $$e = A \cdot TRI(W_C) \quad (6)$$

Figure 3:
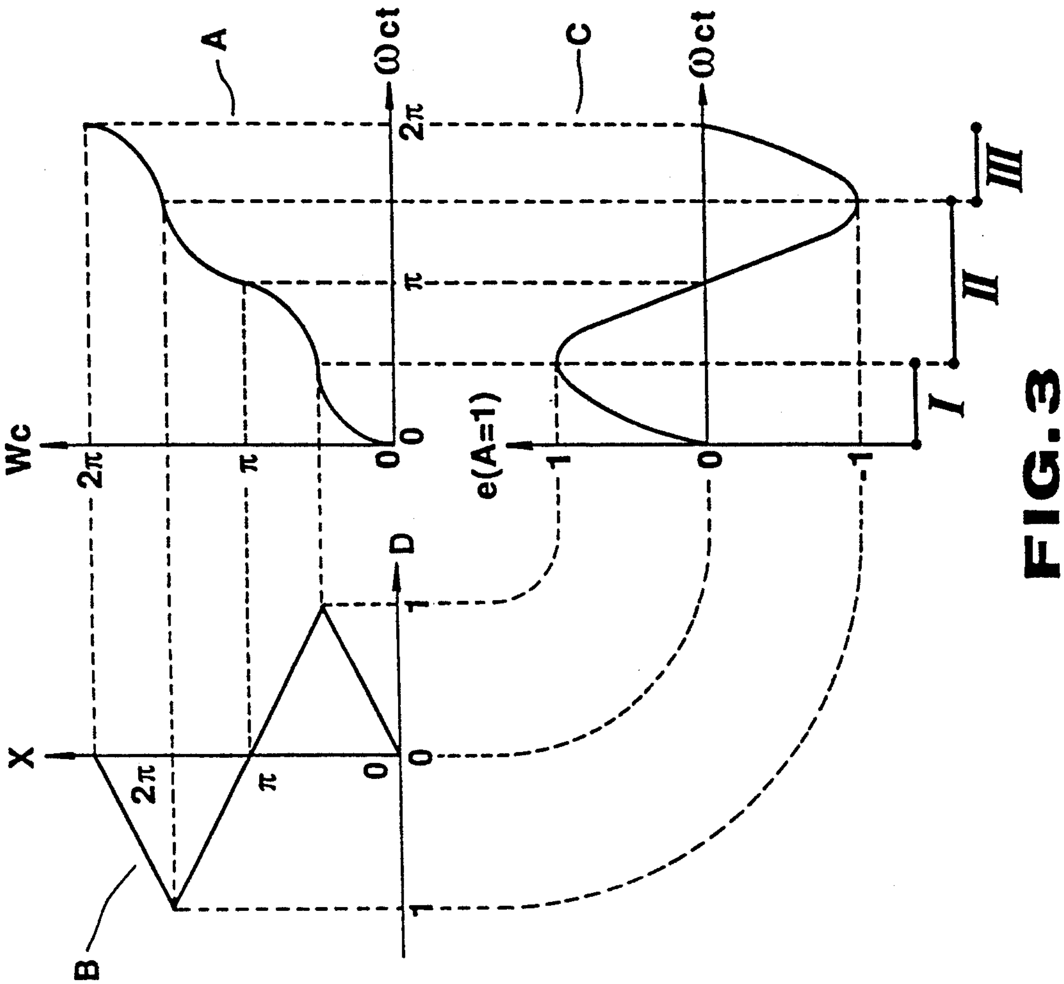
FIG. 3 is a view for explaining an operation during non-modulation in the principle structure of the first embodiment.

Carrier signal $W_C$ and carrier wave phase angle $\omega_{ct}$ are expressed by a relation A in FIG. 3, based on equation (3) or FIG. 2.

On the other hand, the triangular wave function D=TRI(x) calculated by decoder 105 is defined by the following equation (where x is an input) and is a function shown by relation B in FIG. 3.

$$D = TRI(x) = (2/\pi)x \; . . \; (\text{region I: } 0 \leqq x \leqq \pi/2) \quad (7)$$

$$D = TRI(x) = -1 + (2/\pi)(3\pi/2 - x) \; . . \; (\text{region II: } \pi/2 \leqq x \leqq 3\pi/2)$$

$$D = TRI(x) = -1 + (2/\pi)(x - 3\pi/2) \; . . \; (\text{region III: } 3\pi/2 \leqq x \leqq 2\pi)$$

As is clear from relations A and B in FIG. 3, carrier signal $W_C$ inputted to decoder 105 and triangular wave function D=TRI(x) calculated by decoder 105 are monotonously increasing functions in regions I, II and III defined by equations (3) and (7). Accordingly, carrier wave phase angle $\omega_{ct}$ inputted to equation (3) and x inputted to equation (7) always have each of their respective values assigned to the same region. Thus, the equations (3), (6) and (7) can be composed with regard to the same region. Namely, equation (6) is replaced by equations (3) and (7) as follows:

$$\begin{aligned} e &= A \cdot TRI\{(\pi/2)\sin\omega_{ct}\} \\ &= A \cdot (2/\pi)(\pi/2)\sin\omega_{ct} \\ &= A \cdot \sin\omega_{ct} \; . . \; (\text{region I: } 0 \leqq \omega_{ct} \leqq \pi/2) \end{aligned} \quad (8)$$

$$\begin{aligned} e &= A \cdot TRI\{\pi - (\pi/2)\sin\omega_{ct}\} \\ &= A \cdot \{-1 + (2/\pi)(3\pi/2 - \pi + (\pi/2)\sin\omega_{ct})\} \\ &= A \cdot \sin\omega_{ct} \; . . \; (\text{region II: } \pi/2 \leqq \omega_{ct} \leqq 3\pi/2) \end{aligned}$$

$$\begin{aligned} e &= A \cdot TRI\{2\pi + (\pi/2)\sin\omega_{ct}\} \\ &= A \cdot \{-1 + (2/\pi)(2\pi + (\pi/2)\sin\omega_{ct} - 3\pi/2)\} \\ &= A \cdot \sin\omega_{ct} \; . . \; (\text{region III: } 3\pi/2 \leqq \omega_{ct} \leqq 2\pi) \end{aligned}$$

Namely, during non-modulation, a single sine wave, sin $\omega_{ct}$, which does not include a higher harmonics component is produced in any region of carrier wave phase angle $\omega_{ct}$. For example, for amplitude ratio A=1, the relation between carrier wave phase angle $\omega_{ct}$ and waveform output e is expressed as a single sine wave as shown in relation C of FIG. 3.

As is clear from this relation, the value of modulation depth function I(t) in equation (5) approaches 0 with time, thus realizing a process in which a musical sound is attenuated to a single sine waveform component or a musical sound comprising only a single sine waveform component. Next, a variation of waveform output e as the value of modulation depth function I(t) increases is explained. As the value of modulation depth function I(t) increases from 0, the output signal $W_C+W_M$ from ADD 104 in FIG. 1 changes from a signal comprising only carrier signal $W_C$ to one comprising carrier signal $W_C$ superimposed by modulation signal $W_M$. Thus, waveform output e is gradually distorted from a single sine wave along the time axis, namely, waveform output e is varied to include a higher harmonics component along the frequency axis.

FIGS. 4A to 4I show waveform output e where carrier phase angle $\omega_{ct}$=modulation wave phase angle $\omega_{mt}$ and the value of modulation depth function I(t) changes from 0 to $2\pi$[rad]. FIG. 5A to 5I show the frequency characteristics (power spectrum) of respective outputs e corresponding to FIGS. 4A to 4I. In FIGS. 5A to 5I, h1 shows a fundamental frequency (pitch frequency) and h2, h3, h4 . . . show higher harmonics frequencies of two times, three times, four times . . . the fundamental frequency component.

As is clear from FIGS. 4A to 4I, a sharper edge appears in waveform output e in accordance with an increase of the value of frequency depth function I(t). Namely, components up to a pretty higher harmonics are predicted to be included in waveform output e.

This is clear from FIGS. 5A to 5I. Namely, in accordance with an increase in the value of modulation depth function I(t), it is shown that harmonics components higher than the tenth harmonics appear. The power of lower harmonics components do not simply increase or decrease, but a complicated variation of the harmonics can be obtained in accordance with a change of I(t).

Figure 6A:
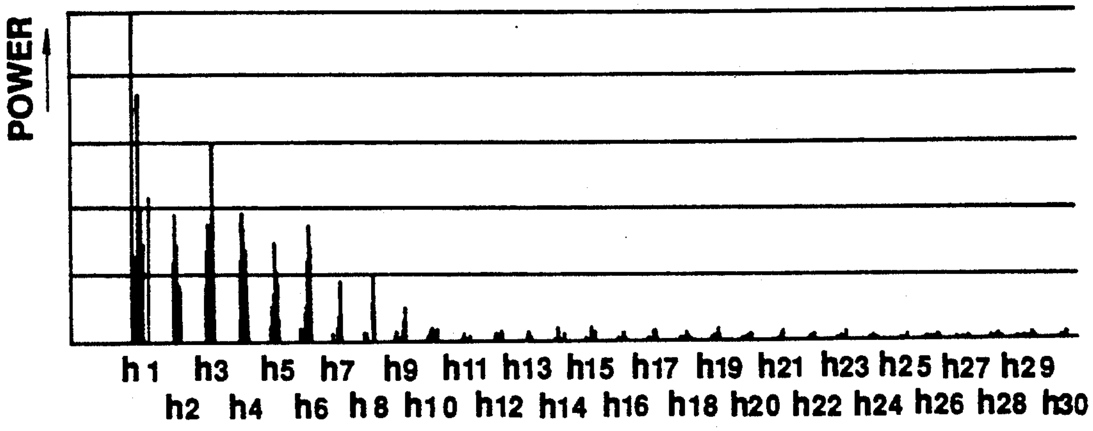
FIGS. 6A and 6B are views comparing the frequency characteristics of waveform output e in the principle structure of the first embodiment.
Figure 6B:
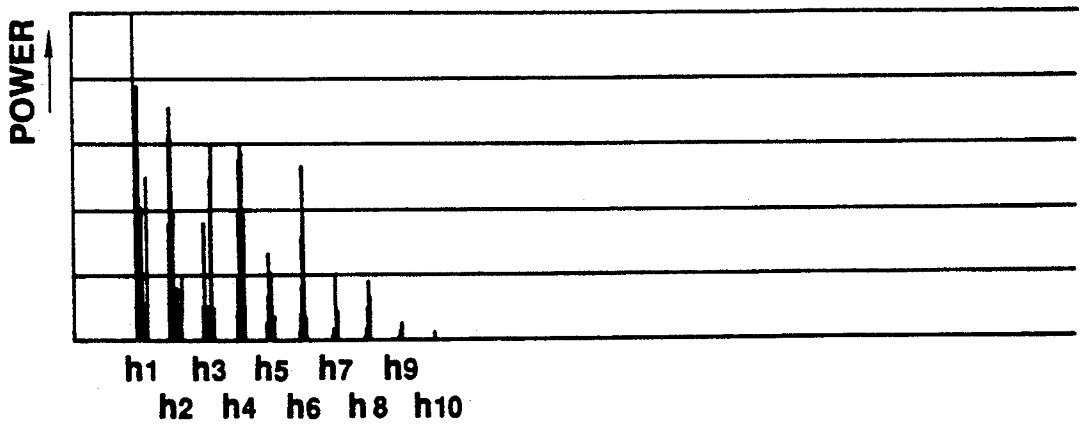

FIGS. 6A and 6B show histograms (occurrence number distributions) of the frequency characteristics of respective waveform outputs e composed under the same conditions using equation (5) of the present invention and equation (1) relating to an FM method of the prior art. The FM method shown in 6B cannot realize a harmonics component higher than the eleventh harmonics, but the present embodiment shown in FIG. 6A is capable of realizing a higher harmonics component up to the thirtieth harmonics.

Based on the above fact, the musical sound waveform generator shown in FIG. 1 can generate a process in which the musical sound is attenuated to a single sine wave or a musical sound comprising only a single sine wave component similar to an actual musical sound, by changing the value of the frequency depth function I(t) from 0 to $2\pi$[rad]. Thus, the musical sound waveform generator shown in FIG. 1 can easily generate a musical sound in which a higher harmonics component clearly exists as a frequency component. The musical sound waveform generator of the present embodiment is particularly effective where a low-pitched musical sound is composed, namely, where a musical sound with a low fundamental frequency (pitch frequency) h1 and including plenty of higher harmonics within a range of audible frequency is composed.

Figure 7A:
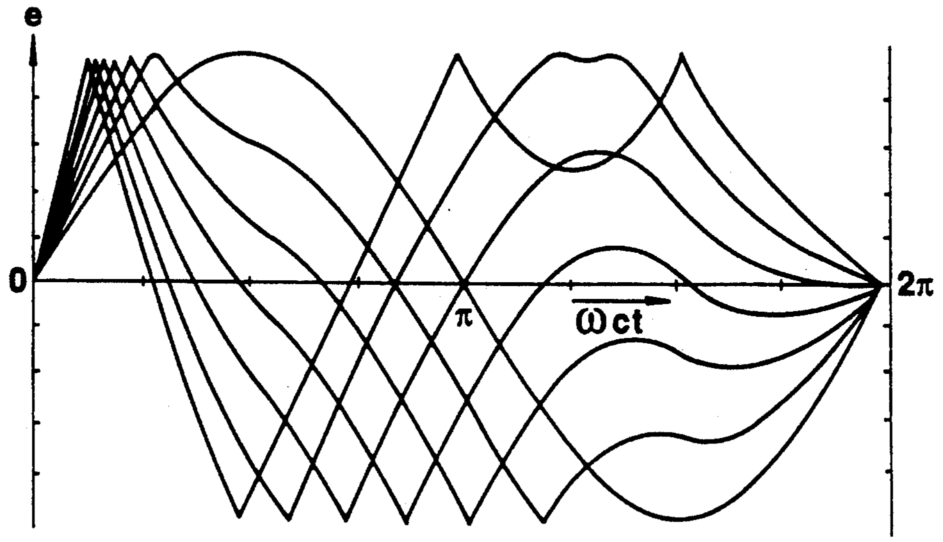
FIGS. 7A and 7B are views representing waveform output e when the ratio of $\omega_{ct}$ to $\omega_{mt}$ and the value of I(t) are changed, in the principle structure of the first embodiment.
Figure 7B:
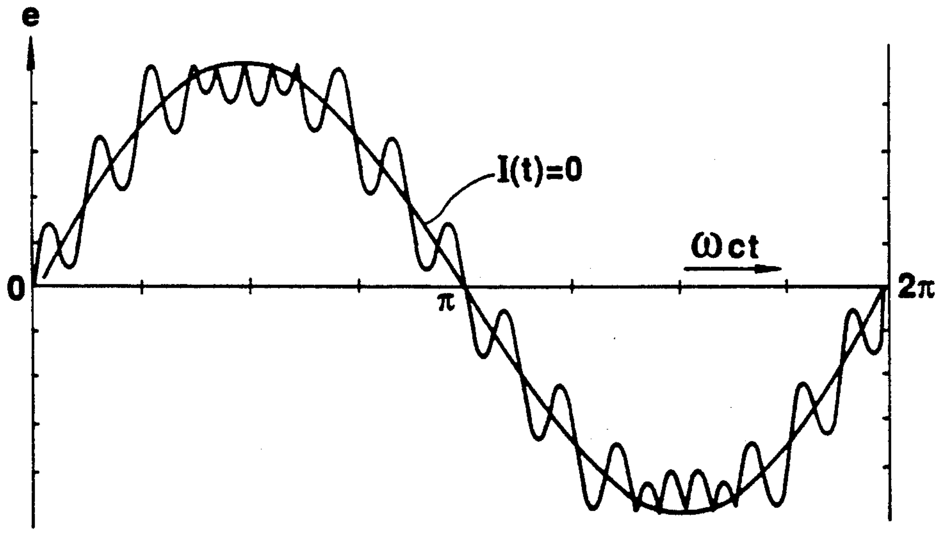

FIG. 7A shows the variation of waveform output e where the ratio of the angular speed $\omega_c$ of a carrier wave phase angle $\omega_{ct}$ to the angular speed $\omega_m$ of modulation wave phase angle $\omega_{mt}$ is $\omega_c$: $\omega_m$=1:0.5, and where the value of the modulation depth function I(t) varies. FIG. 7B shows the waveform output e where $\omega_c$:$\omega_m$=1:16 and where the value of modulation depth function I(t) is 0 or an appropriate value. The waveform shown in FIG. 7A is effective to compose a musical sound such as a brass sound which is thick with increased subharmonics (0.5 harmonics). The waveform output e of FIG. 7B is especially effective for producing higher harmonics produced by percussing a string, for example, an electric piano sound or vibraphone sound.

A chorus effect is obtained by slightly shifting the ratio of $\omega_c$ to $\omega_m$ from an integer ratio to a non-integer ratio (by performing a detune). A chorus effect can be similarly obtained by making the modulation wave phase angle $\omega_{mt}$ to be of a low frequency of about several hertz to several tens of hertz and by adding a phase modulation to the carrier wave phase angle $\omega_{ct}$. A chime sound or drum sound including non-integer harmonics can be simulated by making the ratio of the carrier wave phase angle $\omega_{ct}$ to the modulation wave phase angle $\omega_{mt}$ to be a complete non-integer.

In a principle structure of the above musical sound waveform generator, a carrier wave ROM 101 stores a carrier signal $W_C$ which is represented by the equation (3), FIG. 2 or the relation A shown in FIG. 3. This carrier signal $W_C$ enables waveform output e of decoder 105 which has a characteristic shown by the equation (7) or a relation B shown in FIG. 3 to be a sine wave, thereby producing a single sine wave.

However, the present invention is not limited to the above situation and may enable decoder 105 to perform an arithmetic operation of a function originally including harmonics component other than a single sine wave and subsequently store in carrier wave ROM 101 a function for enabling the output D of the decoder 105 to be a sine wave, thereby achieving the same effect. FIGS. 8A to 8D show examples of combinations of a function to be arithmetically operated by decoder 105 and a function to be stored in carrier wave ROM 101. In FIGS. 8A to 8D, a function for enabling a carrier wave phase angle $\omega_{ct}$ to be associated with the carrier signal $W_C$ is stored in carrier wave ROM 101, and a function for enabling an input X to be associated with the decode output D is arithmetically operated by decoder 105. The characteristics correspoding to FIGS. 8A to 8D are explained hereinafter.

Figure 8A:
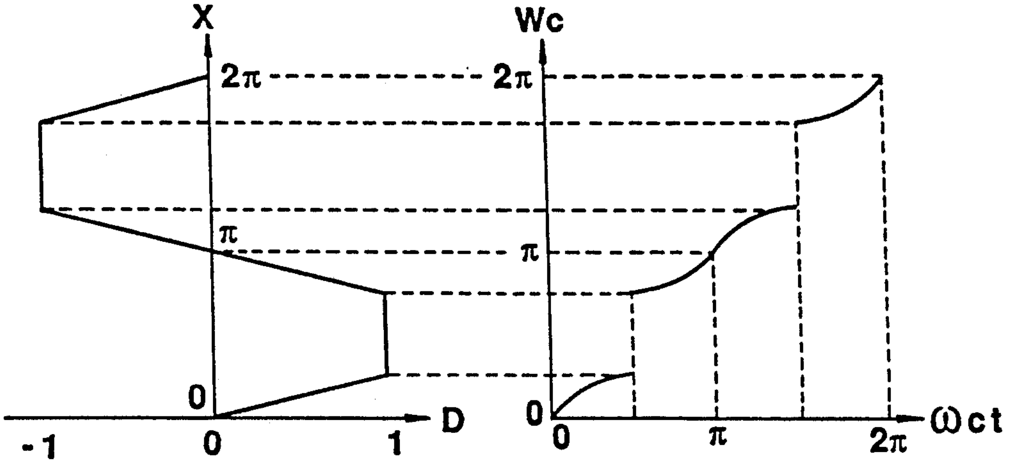
FIGS. 8A to 8D are views representing other modes of the memory waveform in the carrier wave ROM and a triangular wave decoder in the principle structure of the first embodiment.

At first, the function to be arithmetically operated by decoder 105 shown in FIG. 1 corresponding to FIG. 8A is as follows:

$$D = (4/\pi)x \ldots (0 \leqq x \leqq \pi/4) \quad (9)$$

$$D = 1 \ldots (\pi/4 \leqq x \leqq 3\pi/4)$$

$$D = -(4/\pi)x + 4 \ldots (3\pi/4 \leqq x \leqq 5\pi/4)$$

$$D = -1 \ldots (5\pi/4 \leqq x \leqq 7\pi/4)$$

$$D = (4/\pi)x - 8 \ldots (7\pi/4 \leqq x \leqq 2\pi)$$

The function stored in carrier wave ROM 101 in FIG. 1 corresponding to FIG. 8A is as follows.

$$W_c = (\pi/4)\sin\omega_{ct} \ldots (0 \leqq \omega_{ct} \leqq \pi/2) \quad (10)$$

$$W_c = -(\pi/4)\sin\omega_{ct} + \pi \ldots (\pi/2 \leqq \omega_{ct} \leqq 3\pi/2)$$

-continued $$W_c = (\pi/4)\sin\omega_{ct} + 2\pi \ldots (3\pi/2 \leqq \omega_{ct} \leqq 2\pi)$$

Figure 8B:
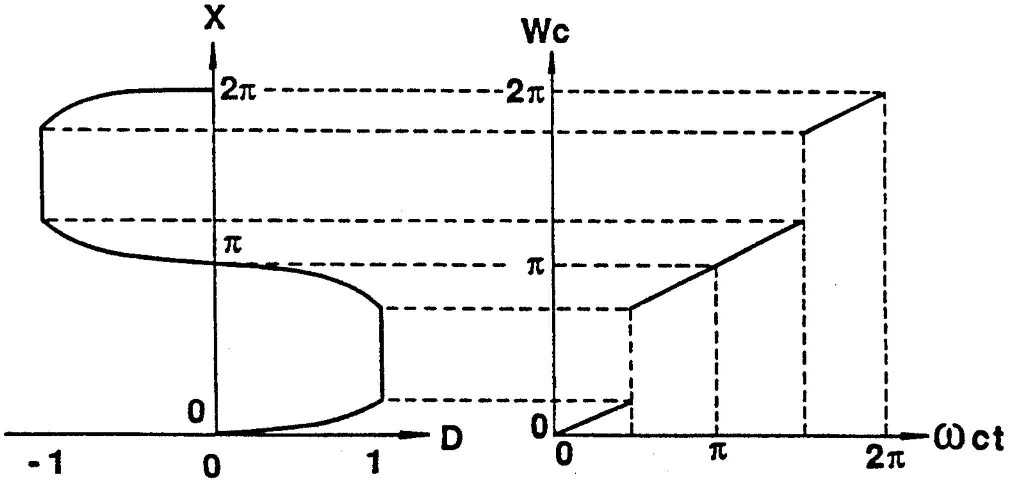

Next, the function to be calculated by decoder 105 of FIG. 1 corresponding to FIG. 8B is as follows.

$$D = \sin 2x \ldots (0 \leqq x \leqq \pi/4) \quad (11)$$

$$D = 1 \ldots (\pi/4 \leqq x \leqq 3\pi/4)$$

$$D = \sin(2x - \pi) \ldots (3\pi/4 \leqq x \leqq 5\pi/4)$$

$$D = -1 \ldots (5\pi/4 \leqq x \leqq 7\pi/4)$$

$$D = \sin(2x - 2\pi) \ldots (7\pi/4 \leqq x \leqq 2\pi)$$

The function stored in carrier wave ROM 101 in FIG. 1 corresponding to FIG. 8B is as follows.

$$W_c = \omega_{ct}/2 \ldots (0 \leqq \omega_{ct} \leqq \pi/2) \quad (12)$$

$$W_c = \omega_{ct}/2 + \pi/2 \ldots (\pi/2 \leqq \omega_{ct} \leqq 3\pi/2)$$

$$W_c = \omega_{ct}/2 + \pi \ldots (3\pi/2 \leqq \omega_{ct} \leqq 2\pi)$$

Figure 8C:
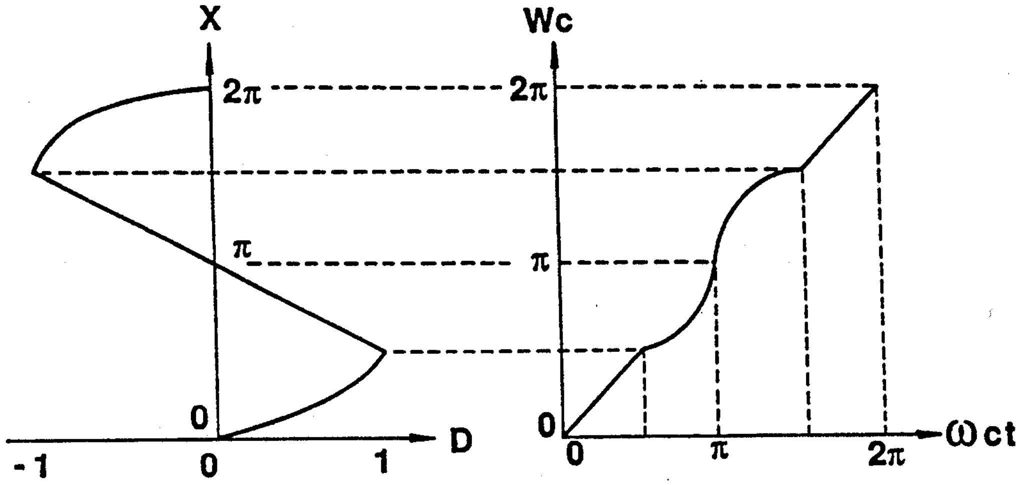

The function to be arithmetically operated by decoder 105 in FIG. 1 corresponding to FIG. 8C is as follows.

$$D = \sin x \ldots (0 \leqq x \leqq \pi/2) \quad (13)$$

$$D = -(2/\pi)x + 2 \ldots (\pi/2 \leqq x \leqq 3\pi/2)$$

$$D = \sin x \ldots (3\pi/2 \leqq x \leqq 2\pi)$$

The function stored in carrier wave ROM 101 in FIG. 1 corresponding to FIG. 8C is as follows.

$$W_c = \omega_{ct} \ldots (0 \leqq \omega_{ct} \leqq \pi/2) \quad (14)$$

$$W_c = -(\pi/2)\sin\omega_{ct} + \pi \ldots (\pi/2 \leqq \omega_{ct} \leqq 3\pi/2)$$

$$W_c = \omega_{ct} \ldots (3\pi/2 \leqq \omega_{ct} \leqq 2\pi)$$

Figure 8D:
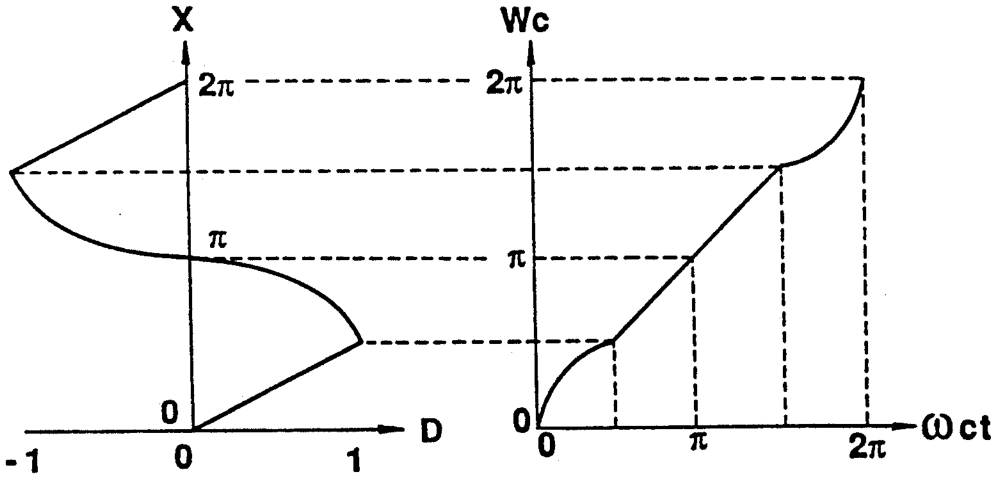

The function to be arithmetically operated by decoder 105 in FIG. 1 corresponding to FIG. 8D is as follows.

$$D = (2/\pi)x \ldots (0 \leqq x \leqq \pi/2) \quad (15)$$

$$D = \sin x \ldots (\pi/2 \leqq x \leqq 3\pi/2)$$

$$D = (2/\pi)x - 4 \ldots (3\pi/2 \leqq x \leqq 2\pi)$$

The function stored in carrier wave ROM 101 in FIG. 1 corresponding to FIG. 8D is as follows.

$$W_c = (\pi/2)\sin\omega_{ct} \ldots (0 \leqq \omega_{ct} \leqq \pi/2) \quad (16)$$

$$W_c = \omega_{ct} \ldots (\pi/2 \leqq \omega_{ct} \leqq 3\pi/2)$$

$$W_c = (\pi/2)\sin\omega_{ct} + 2\pi \ldots (3\pi/2 \leqq \omega_{ct} \leqq 2\pi)$$

In accordance with a combination of the equations (9) and (10), the equations (11) and (12), the equations (13) and (14), or the equations (15) and (16), single sine waves can be outputted as waveform output e from decoder 105 as a result of inputting carrier signal $W_C$ outputted from carrier wave ROM 101 as input x to decoder 105 where the value of modulation depth function I(t) in MUL 103 in FIG. 1 is made to be 0.

A waveform output e including a wide range of harmonics can be obtained depending on the functions of decoder 105 as shown in FIGS. 8A to 8D if the value of modulation depth function I(t) is made to be a value other than 0.

Figure 9A:
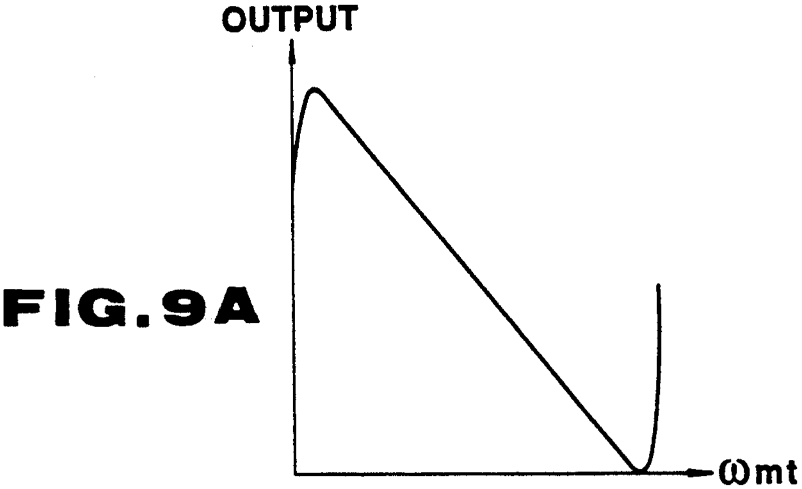
FIGS. 9A, 9B and 9C show examples of a memory waveform stored in the modulation wave ROM in the principle structure of the first embodiment.
Figure 9B:
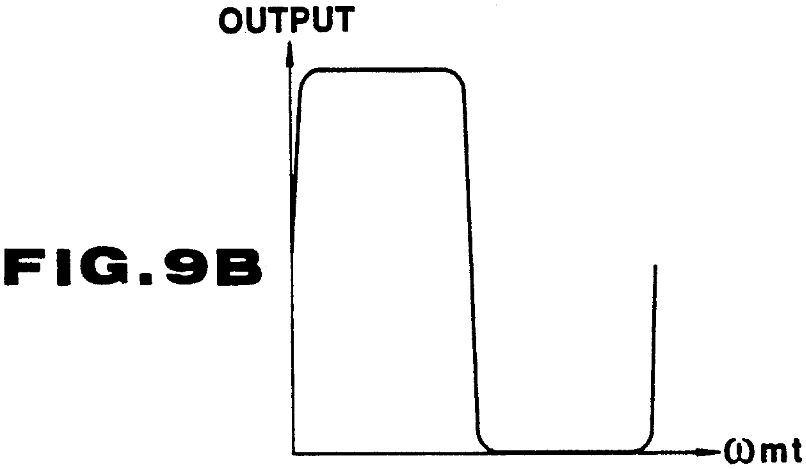
Figure 9C:
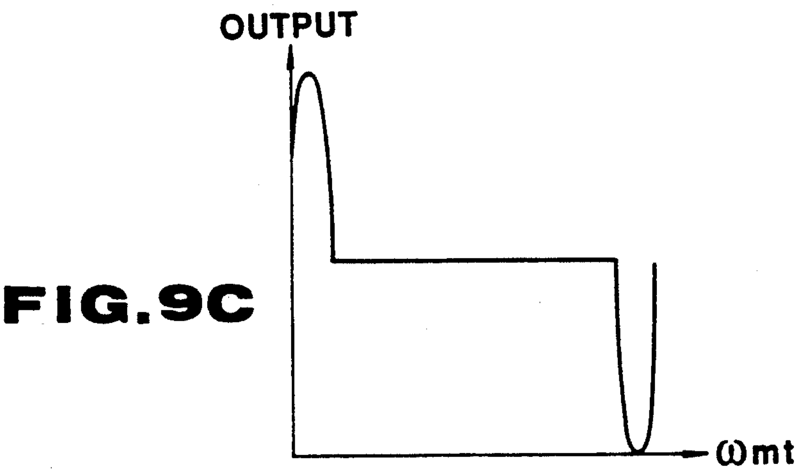

In respective modes relating to a principle structure of the first embodiment, the sine function is stored in modulation wave ROM 102 in FIG. 1 and modulation is carried out by using modulation signal $W_M$ produced based on the equation (4). However, the present invention is not limited to the above case. For example, a waveform, including higher harmonics such as a sawtooth wave and a rectangular wave as shown in FIGS. 9A to 9C can be inputted to decoder 105 to thereby produce a musical sound waveform including a wide range of higher harmonics. Instead of producing a modulation wave by reading various kinds of waveforms from modulation wave ROM 102, a logic circuit is provided inside the apparatus such that various phase angle waveforms stored in ROM 102 are input to the above logic circuit to thereby enable a modulation signal including higher harmonics. The structure of decoder 105 in FIG. 1 for directly producing a waveform including high harmonics can be provided as an alternative to the above logic circuit to enable production of a modulation signal including higher harmonics.

The amplitude coefficient A multiplied by MUL 106 in FIG. 1 has been represented as a constant value in respective embodiments, but this amplitude coefficient A can actually be changed with time and thus the envelope characteristics subjected to amplitude modulation can be added to a musical sound.

Next, a detailed structure of a first embodiment based on the principle structure of the first embodiment will be explained. In this embodiment, musical sound waveform generator of the present invention is applied to an electronic musical instrument.

Figure 10:
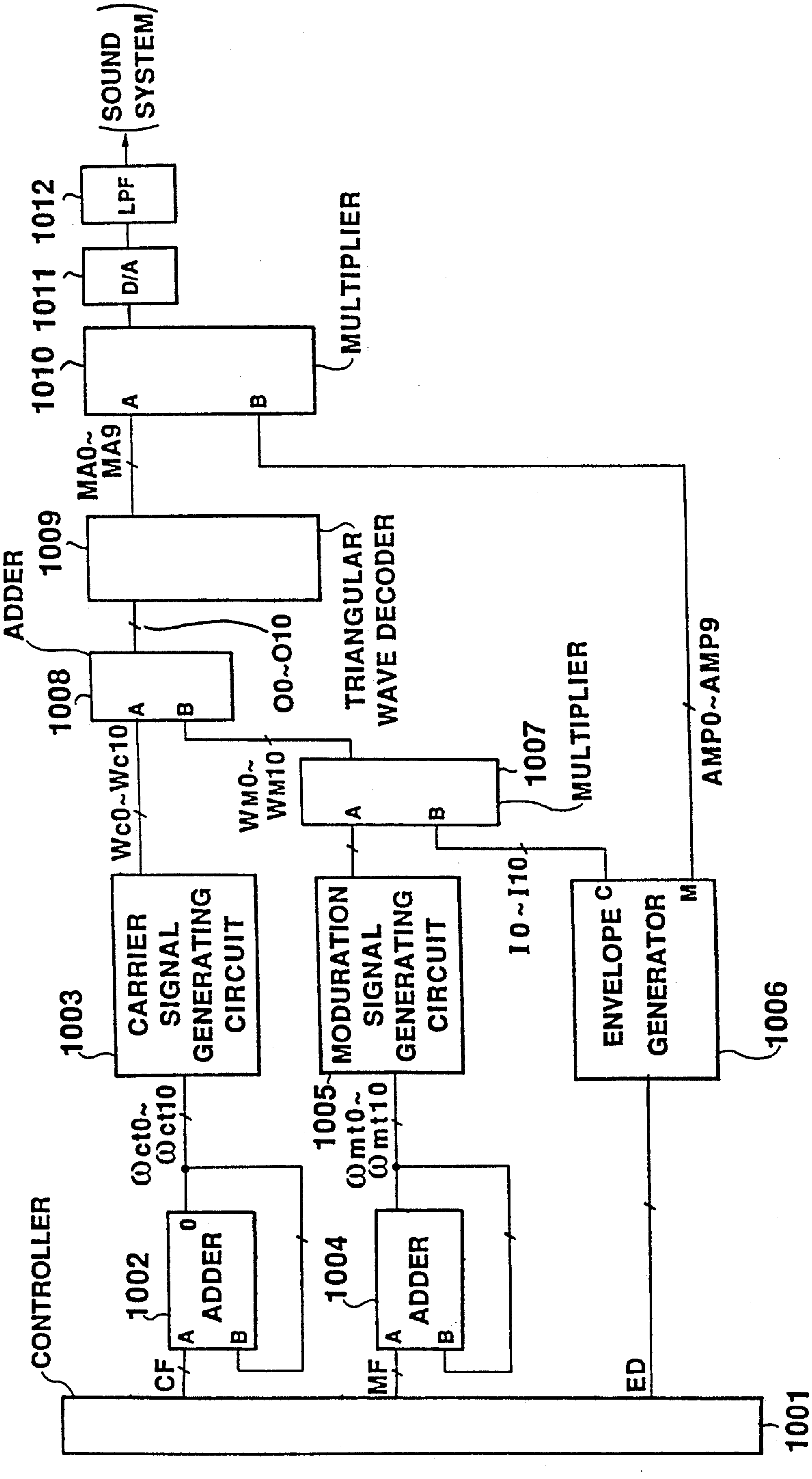
FIG. 10 is a view showing the detailed structure of the first embodiment.

FIG. 10 shows a view of an electronic musical instrument according to the first embodiment. In this embodiment, the principle structure of the first embodiment in FIG. 1 is used as a basis and thus FIG. 1, for example, will be referred to in the following explanation.

Controller 1001 produces and outputs carrier frequency CF, modulator frequency MF and envelope data ED (respective rate values and level values, for example, of the envelope) in accordance with a setting state set by a parameter setting unit and a performance operation in a keyboard unit which are not shown in the drawing.

Adders 1002 or 1004 feed back respective outputs therefrom to a terminal B where an input is added, and input carrier frequency CF or modulator frequency MF to a terminal A so that 10 bit carrier wave phase angle $\omega_{ct}0$ to $\omega_{ct}10$ modulation phase angle $\omega_{mt}0$ to $\omega_{mt}10$ whose respective values increase by the step width of respective frequencies is generated, thereby constituting an accumulator. Carrier wave phase angle $\omega_{ct}0$ to $\omega_{ct}10$ and modulation wave phase angle $\omega_{mt}0$ to $\omega_{mt}10$ respectively correspond to carrier wave phase angle $\omega_{ct}$ and modulation wave phase angle $\omega_{mt}$ in FIG. 1. Carrier frequency CF corresponds to angular speed $\omega_C$ of carrier wave phase angle $\omega_{ct}$, and modulator frequency MF corresponds to an angular speed $\omega_M$ of modulation wave phase angle $\omega_{mt}$.

The above carrier phase angle $\omega_{ct}0$ to $\omega_{ct}10$ and modulation wave phase angle $\omega_{mt}0$ to $\omega_{mt}10$ are respectively input to carrier signal generating circuit 1003 and modulation signal generating circuit 1005 as an address signal. Carrier signal generating circuit 1003 and modulation signal generating circuit 1005 respectively correspond to carrier wave ROM 101 and modulation wave ROM 102.

On the other hand, envelope generator 1006 outputs modulation depth function I0 to I10 of two channels comprising 11 bits and 10 bits and amplitude coefficient AMP0–AMP19 from terminals C and M based on the envelope data ED obtained from controller 1001. These values respectively correspond to modulation depth function I(t) in FIG. 1 and amplitude coefficient A, and can be changed with time.

Modulation depth function I0–I10 has a value less than "1", is inputted to terminal B of multiplier 1007, and is multiplied with the output from modulation signal generating circuit 1005 inputted to terminal A, thereby producing modulation signal $W_M0$–$W_M10$ of 11 bits. Multiplier 1007 and modulation signal $W_M0$–$W_M10$ respectively correspond to MUL 103 and modulation signal $W_M$ in FIG. 1.

Carrier signal $W_C0$–$W_C10$ outputted from carrier signal generating circuit 1003 and modulation signal $W_M0$–$W_M10$ outputted from multiplier 1007 are respectively inputted to terminals A and B of adder 1008 for addition to output the adding waveform O0–O10 of 11 bits. Adder 1008 and adding waveform O0–O10 respectively correspond to ADD 104 and adding waveform $W_C+W_M$ in FIG. 1.

The above adding waveform O0–O10 becomes an address signal of triangular wave decoder 1009. Triangular wave decoder 1009 generates decoded outputs MA0–MA9 which respectively correspond to decoder 105 and decoded output D in FIG. 1.

Decoded outputs MA0–MA9 are further input to terminal A of multiplier 1010 and are multiplied with amplitude coefficients AMP0–AMP9 inputted to terminal B, thereby being amplitude-modulated. Amplitude coefficients AMP0–AMP9 have a value less than "1".

The digital musical sound signal produced as recited above is converted to an analog musical sound signal in D/A converter 1011 and low pass filter 1012, so that the analog musical sound signal produces a sound through a sound system not shown in the drawing.

With the arrangement described just above, carrier frequency CF, modulator frequency MF and envelope data ED are outputted from controller 1001 in accordance with a performance operation by a player, and a musical sound having a pitch, volume and tone controlled based on the performance operation is outputted as a sound in the same manner as in the musical waveform generator shown in FIG. 1.

Figure 11:
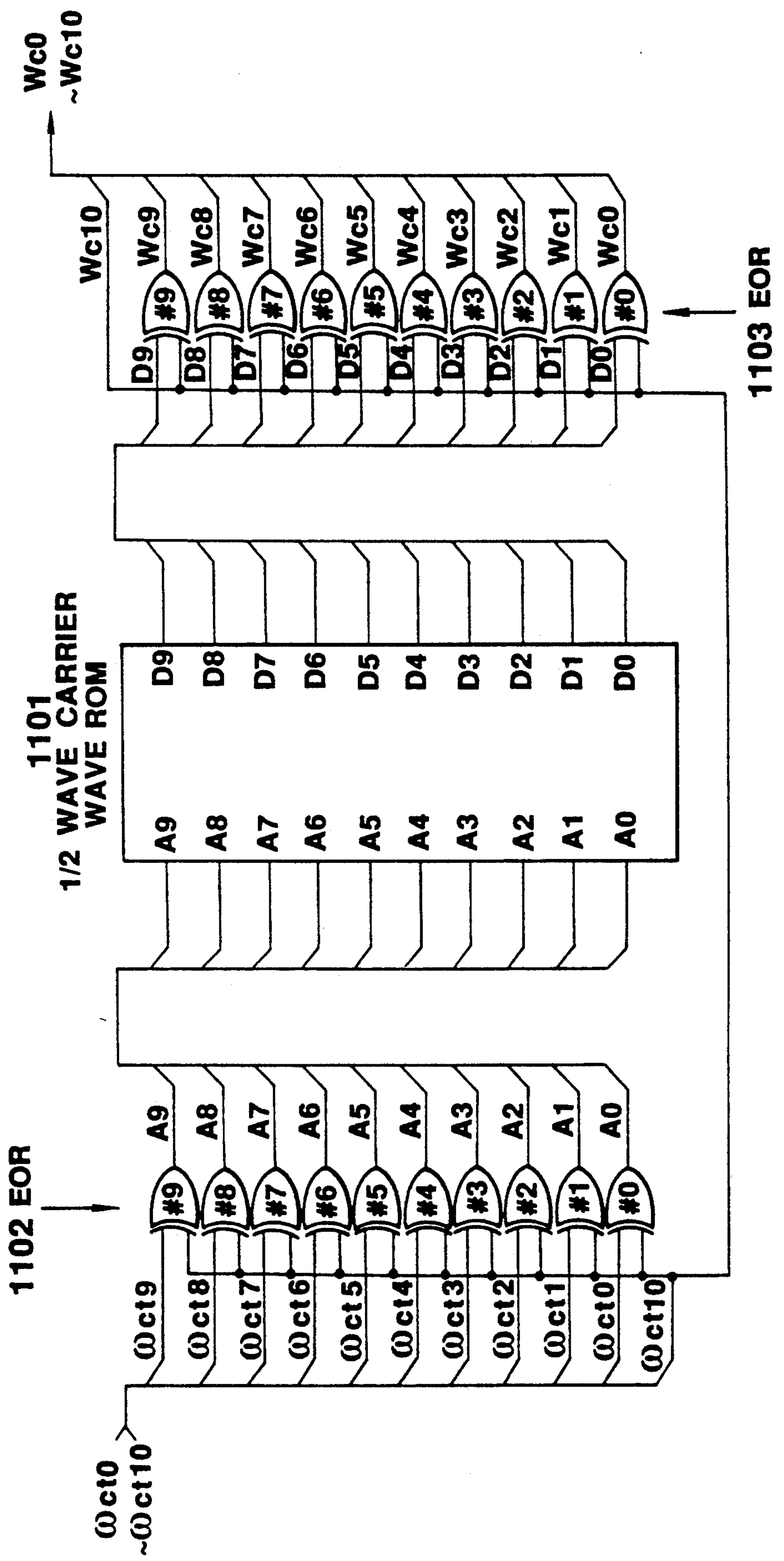
FIG. 11 is a view representing an example of the first circuit of a carrier signal generating circuit in the detailed structure of the first embodiment, FIGS. 12(*a*) to 12(*f*) are views for explaining an example of the operation of the first circuit of the carrier signal generating circuit in the detailed structure of the first embodiment.

Next, a first circuit example of the carrier signal generating circuit 1003 of FIG. 10 is shown in detail in FIG. 11.

Respective first input terminals of exclusive-logic-OR-circuits (called EOR hereinafter) #0 to #9 receive a carrier wave phase angle $\omega_{ct}$10 of the most significant bit from adder 1002 in FIG. 10, and respective second input terminals thereof receive a carrier wave phase angle $\omega_{ct}0$–$\omega_{ct}9$ of 0–9 bits from adder 1002. The outputs A0–A9 from EOR 1102 of #0–#9 are input to the ½ wave carrier wave ROM 1101 as respective address signals.

The ROM outputs D0–D9 from the ½ wave carrier wave ROM 1101 are input to the respective first input terminals of EOR 1103 of #0–#9. The carrier wave phase angle $\omega_{ct}$10 of the most significant bit is input to the second input terminals of EOR 1103 of #0–#9.

Respective outputs of EOR 1103 of #0–#9 and carrier wave phase angle $\omega_{ct}10$ of the most significant bit are inputted to adder 1008 of FIG. 10 as carrier signal $W_C0$-$W_C10$.

An operation of the first circuit example will now be explained based on the operational explanation shown in FIG. 12. A waveform corresponding to a ½ period ((0–π)rad) of carrier signal $W_C$ explained in FIG. 2 or the equation (3) is stored in ½ wave carrier wave ROM 1101 in FIG. 11. The value determined by outputs D0–D9 of the ½ wave carrier wave ROM 1101 in FIG. 11 based on the equation (3) is expressed as Y1 and then the following waveform is stored.

$$Y1 = (\pi/2)\sin\omega_{ct} \ldots (0 \leqq \omega_{ct} \leqq \pi/2) \quad (17)$$

$$Y1 = \pi - (\pi/2)\sin\omega_{ct} \ldots (\pi/2 \leqq \omega_{ct} \leqq \pi)$$

where a carrier wave phase angle $\omega_{ct}$ means the value determined by $\omega_{ct}0$-$\omega_{ct}9$.

On the other hand, carrier wave phase angle $\omega_{ct}0$-$\omega_{ct}10$ outputted from adder 1002 in FIG. 10 can designate phase angles 0−π[rad] in a full range of the lower 10 bits corresponding to $\omega_{ct}0$-$\omega_{ct}9$, in which the most significant bit $\omega_{ct}10$ is in logic "0". Further, a phase angle of π-2π[rad] can be designated in a full range of $\omega_{ct}0$-$\omega_{ct}9$, in which $\omega_{ct}10$ is in logic "1".

Figure 12:
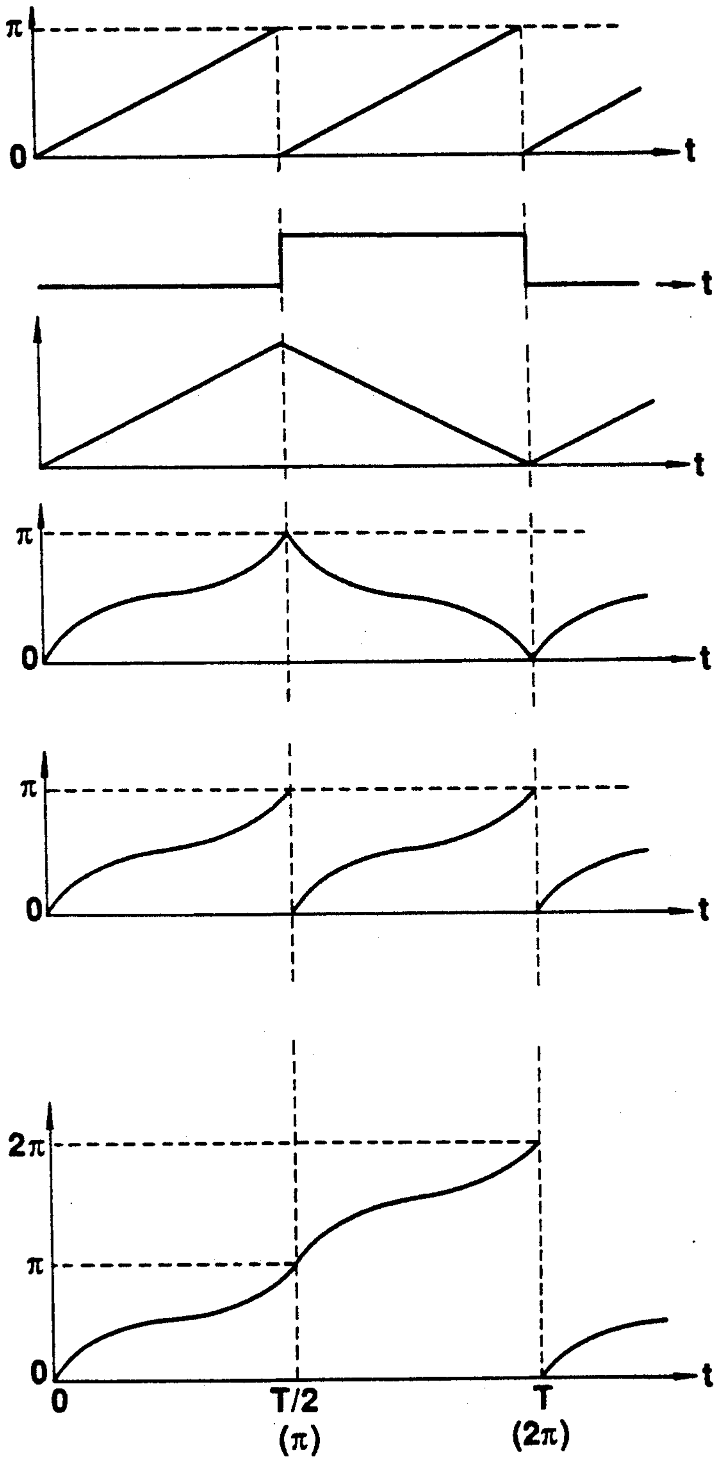

Accordingly, supposing that the period for designating a full range of carrier wave phase angle $\omega_{ct}0$-$\omega_{ct}10$ in adder 1002 of FIG. 10 is T, in a time period 0 to T/2, carrier wave phase angle $\omega_{ct}10$ of the most significant bit is logic 0 as shown in FIG. 12B and a full range of the lower 10 bits corresponding to carrier wave phase angle $\omega_{ct}0$-$\omega_{ct}9$ is designated. Then, carrier wave phase angle $\omega_{ct}10$ is inputted to the first input terminals EOR 1102 of #0–#9, and when the value of the lower 10 bits corresponding to carrier wave phase angle $\omega_{ct}0$-$\omega_{ct}9$ sequentially increases in the period 0–T/2, address signals A0–A9 which sequentially increases in the same manner as the carrier wave phase angle increases are obtained. Therefore, the outputs D0–D9 in a range from 0–π[rad] based on the equation (17) are sequentially read out from ½ wave carrier wave ROM 1101 in FIG. 11. The waveform is input to the first input terminals of EOR 1103 of #0–#9 and the most significant bit with a logic "0" corresponding to carrier phase angle $\omega_{ct}10$ is input to the second input terminal of EOR 1103 and thus, carrier signal $W_C0$-$W_C9$ of the lower 10 bits of the output of EOR 1103 are, as shown in FIG. 12E, the same waveform as the outputs D0–D9 of FIG. 12D. Further, as carrier signal $W_C10$ of the most significant bit is equal to carrier wave phase angle $\omega_{ct}10$ of the most significant bit with a logic "0", the same waveform as output D0–D9 shown in FIG. 12D is outputted as carrier signal $W_C0$-$W_C10$, as shown in the period 0 to T/2 in FIG. 12(*f*).

Next, in a period T/2 to T, carrier wave phase angle $\omega_C10$ of the most significant bit is logic "1" as shown in FIG. 12(*b*), and a full range of carrier wave phase angle $\omega_{ct}0$-$\omega_{ct}9$ of the lower 10 bits is designated. As carrier wave phase angle $\omega_{ct}10$ of the most significant bit of the logic "1" is input to the first input terminals of EOR 1102 of #0–#9, and when the value of carrier wave phase angle $\omega_{ct}0$ to $\omega_{ct}9$ of lower 10 bits sequentially increases in the period T/2 to T, address signals A0–A9 sequentially decreases in an opposite manner as shown in FIG. 12(*c*). Therefore, a waveform in a range from 0 to π[rad] based on the equation (17) is read out in an opposite direction as shown in FIG. 12(*d*) to provide outputs D0–D9 from ½ wave carrier wave ROM 1101 in FIG. 11. The waveform is input to the first input terminals of EOR 1103 of #0–#9 and, as carrier wave phase angle $\omega_{ct}10$ of the most significant bit of the logic "1" is input to the second input terminal of EOR 1103, as shown in FIG. 12(*e*), carrier signals $W_C0$-$W_C9$ of the lower 10 bits of the output of EOR 1103 is outputted to provide a waveform increasing and decreasing in a manner opposite to the outputs D0–D9 shown in FIG. 12(*d*). In addition, carrier signal $W_C10$ of the most significant bit is equal to carrier wave phase angle $\omega_{ct}10$ of the most significant bit with a value of logic "1" and thus, an offset of π[rad] corresponding to a full range of carrier wave phase angle $\omega_{ct}0$-$\omega_{ct}9$ of the lower 10 bits is superimposed to the above output. As a result, the waveform shown in the period T/2−T of FIG. 12(*f*) is outputted as carrier signal $W_C0$-$W_C10$.

As is clear from the above operation, the waveform output in the period from 0 to T is the same as the waveform of carrier signal $W_C$ explained above by referring to FIG. 2 and the equation (3). In the case of the first circuit example, a waveform with a ½ period only has to be stored in ½ wave carrier wave ROM 1101 shown in FIG. 11, that is, in comparison with the waveform with one period shown in FIG. 2. Therefore, the capacity of the memory can be simply made ½ as compared with the case in which a waveform with a period of 1 is stored.

Figure 13:
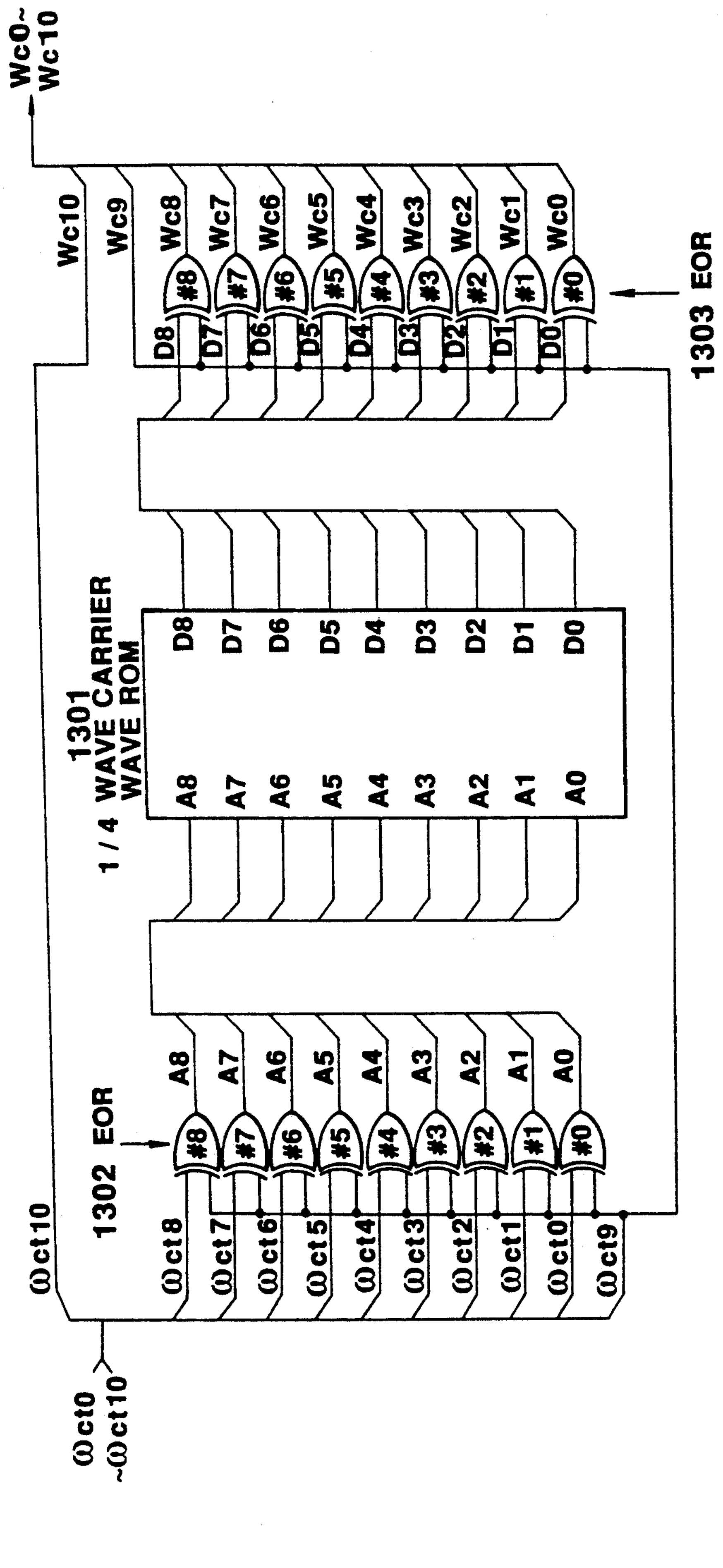
FIG. 13 is a view representing an example of the second circuit of a carrier signal generating circuit in the detailed structure of the first embodiment, FIGS. 14(*a*) to 14(*g*) are views for explaining an example of the operation of the second circuit of the carrier signal generating circuit in the detailed structure of the first embodiment.

FIG. 13 shows the structure of the second circuit example of carrier signal generating circuit 1003 of FIG. 10. Carrier wave phase angle $\omega_{ct}9$ of the 10th bit from adder 1002 in FIG. 10 is inputted to respective first input terminals #0–#8 of EOR 1302 and carrier wave phase angles $\omega_{ct}0$-$\omega_{ct}8$ of 0 to 8 bits are inputted to the respective second input terminals.

Outputs A0–A8 of EOR 1302 of #0–#8 are input to ¼ wave carrier wave ROM 1301 as respective address signals.

ROM outputs D0–D8 from ¼ wave carrier wave ROM 1301 are inputted to the first input terminals of EOR 1303 of #0–#8. Carrier wave phase angle $\omega_{ct}9$ of the 10th bit is inputted to second input terminals of EOR 1303 of #0–#8.

Respective outputs of EOR 1103 of #0–#8, carrier wave phase angle $\omega_{ct}9$ of the 10th bit and carrier wave phase angle $\omega_{ct}10$ of the most significant bit are outputted to adder 1008 in FIG. 10 as carrier signal $W_C0$-$W_C10$.

The operation of the second circuit example is explained below.

A wave corresponding to ¼ period (0–90 /2 [rad]) of carrier signal $W_C$ explained by referring to FIG. 2 or the equation (3) is stored in ¼ wave carrier wave ROM 1301 in FIG. 13. Supposing that the value determined by the outputs D0–D8 from ¼ wave carrier wave ROM 1301 in FIG. 13 in accordance with equation (3) is Y2, then the following waveform is stored.

$$Y2 = (\pi/2)\sin\omega_{ct} \ldots (0 \leqq \omega_{ct} \leqq \pi/2) \quad (18)$$

The carrier phase angle $\omega_{ct}$ means the values determined by $\omega_{ct}0$-$\omega_{ct}8$.

On the other hand, with regard to carrier wave phase angle $\omega_{ct}0$ to $\omega_{ct}10$ outputted from adder 1002 in FIG. 10, where a combination ($\omega_{ct}10$, $\omega_{ct}9$) of a logic of most significant bit $\omega_{ct}10$ and 10th bit $\omega_{ct}9$ is (0, 0), a phase angle of 0 to π/2 [rad] can be designated by a full range of the lower 9 bits of $\omega_{ct}0$-$\omega_{ct}8$. Where the combination becomes (0, 1), a phase angle of $\pi/2$-$\pi$[rad] can be designated by a full range of the lower 9 bits $\omega_{ct}0$ -$\omega_{ct}8$. Where the combination becomes, (0, 0) the phase angle of $\pi$-$3\pi/2$ [rad] is similarly designated, and where the combination becomes (1, 1), the phase angle $3\pi/2$-$2\pi$-[rad] can further be designated. The above four cases will be explained hereinafter respectively.

A period in which a full range of carrier wave phase angle $\omega_{ct}0$-$\omega_{ct}10$ is designated by adder 1002 of FIG. 10 is shown by T. As in the first case, ($\omega_{ct}10$, $\omega_{ct}9$)=(0, 0) correspond to the time period 0–T/4 as is shown by FIG. 14 (*b*) and (*c*). In this period range, carrier wave phase angle $\omega_{ct}9$ of the 10th bit of the logic "0" is input to the first input terminals of EOR 1302 of #0–#8 and the value of carrier phase angle $\omega_{ct}0$-$\omega_{ct}8$ of the lower 9 bits sequentially increase in the period 0–T/4. When value of the carrier phase angle increase, the address signals A0–A8 increase in the same manner as shown in FIG. 14(*d*). Therefore, the outputs D0–D8 of ¼ wave carrier wave ROM 1301 in FIG. 13 are sequentially read to output a waveform in a range 0–$\pi/2$ (rad) based on the equation (18) as shown in FIG. 14(*e*). The waveform is input to the first input terminals of EOR 1303 of #0–#8, and carrier wave phase angle $\omega_{ct}9$ of the 10th bit of logic "0" is input to the second input terminals of EOR 1303. Thus, carrier signals $W_C0$-$W_C8$ of the lower 9 bits of the outputs are the same waveform as the outputs D0–D8 of FIG. 14(*e*), as shown in FIG. 14(*f*). Further, carrier signal $W_C10$ of the 10th bit and $W_C9$ of the most significant bit are equal to the carrier wave phase angle $\omega_{ct}9$ of the 10th bit and $\omega_{ct}10$ of the most significant bit, respectively, and are commonly at logic "0". As a result, as shown in a period 0–T/4 of FIG. 14 (*g*), the same waveform as the outputs D0 to D8 shown in FIG. 14(*e*) is outputted as carrier signal $W_C0$-$W_C10$.

Next, in a second case, ($\omega_{ct}10$, $\omega_{ct}9$)=(0, 1) corresponds to the time period T/4 to T/2 as shown in FIG. 14(*b*) and (*c*). When carrier wave phase angle $\omega_{ct}9$ of the 10th bit of the logic "1" is inputted to the first input terminals of EOR 1302 of #0–#8 in the period T/4–T/2, the value of carrier phase angle $\omega_{ct}0$-$\omega_{ct}8$ of the lower 9 bits sequentially increase in a period T/4–T/2 and thus address signals A0–A8 sequentially decrease in an opposite manner as shown in FIG. 14(*e*). Therefore, the outputs D0–D8 of ¼ wave carrier wave ROM 1301 in FIG. 13 can be read in a reverse direction to provide a waveform in a range from 0 to $\pi/2$ [rad] based on the equation (18). The waveform is inputted to the first input terminals of EOR 1303 of #0–#8, and carrier wave phase angle $\omega_{ct}9$ of the 10th bit of the logic "1" is input to the second input terminals of EOR 1303. Thus, carrier signals $W_C0$-$W_C8$ of the lower 9 bits outputted from EOR 1303 are, as shown in FIG. 14(*f*), waveforms which increase and decrease in a manner opposite to the outputs D0–D8 shown in FIG. 14(*e*). In addition, carrier signal $W_C9$ of the 10th bit and carrier signal $W_C10$ of the most significant bit are respectively equal to the carrier wave phase angle $\omega_{ct}9$ of the 10th bit and carrier wave phase angle $\omega_{ct}10$ of the most significant bit and are respectively logic "1" and "0". Therefore, an offset of $\pi/2$ [rad] corresponding to a full range component of carrier wave phase angles $\omega_{ct}0$-$\omega_{ct}9$ of the lower 10 bit is added to the above output. As a result, the waveform shown in the period T/4–T/2 in FIG. 14(*g*) is outputted as carrier signals $W_C0$-$W_C10$.

Sequentially, in a third case, ($\omega_{ct}10$, $\omega_{ct}9$)=(1, 0) corresponds to a period T/2 to 3T/4, as shown in FIG. 14(*b*) and (*c*). The carrier wave phase angle $\omega_{ct}9$ of the 10th bit is logic "0" in the period T/2–3T/4 and thus, the operation of EOR 1302, ¼ wave carrier wave ROM 1301 and EOR 1303 are the same as in the first case. Therefore, carrier signals $W_C0$-$W_C8$ of the lower 9 bits outputted from EOR 1303 are, as shown in FIG. 14(*f*), to provide the same waveform as the outputs D0–D8 in FIG. 14(*e*). In addition, carrier signal $W_C9$ of the 10th bit and carrier signal $W_C10$ of the most significant bit are respectively equal to carrier wave phase angle $\omega_{ct}9$ of the 10th bit and carrier wave phase angle $\omega_{ct}10$ of the most significant bit with respective logic value of "0" and "1". Therefore, an offset of $\pi$[rad] corresponding to twice the full range of carrier wave phase angle $\omega_{ct}0$-$\omega_{ct}8$ of the lower 9 bits is added to the above output and as a result, a waveform shown in a period T/4–T/2 in FIG. 14 (*g*) is outputted as carrier signals WC0–WC10.

Finally, in a fourth case, ($\omega_{ct}10$, $\omega_{ct}9$)=(1, 1) corresponds to the time period 3T/4–T as shown in FIGS. 14(*b*) and (*c*). The carrier phase angle $\omega_{ct}9$ of the 10th bit is logic "1" in this time period and thus the operation of EOR 1302, ¼ wave carrier wave ROM 1301 and EOR 1303 are the same as those in the second case. Therefore, carrier signals $W_C0$-$W_C8$ of the lower 9 bits outputted from EOR 1303 provide a waveform increasing or decreasing in a manner opposite to the outputs D0–D8 of FIG. 14(*e*). In addition, carrier signal $W_C9$ of the 10th bit and carrier signal $W_C10$ of the most significant bit are respectively equal to carrier phase angle $\omega_{ct}9$ of the 10th bit and carrier wave phase angle $\omega_{ct}10$ of the most significant bit with a common logic value of "1". An offset of 3 $\pi/2$ corresponding to three times the full range of carrier wave phase angle $\omega_{ct}0$-$\omega_{ct}8$ of the lower 9 bits is added to the above outputs and as a result, a waveform designated during the period of 3T/4 as shown in FIG. 14(*g*) is outputted as carrier signals $W_C0$-$W_C10$.

As is clear from the above operation, the waveform outputted during the period 0–T is the same waveform as that of carrier signal $W_C$ as explained referring to FIG. 2 or the equation (3).

In the second circuit example, a ¼ period of a waveform may be stored in ¼ wave carrier wave ROM 1301 of FIG. 13 with regard to a waveform of a single period shown in FIG. 2. The memory capacity can be made ½ as compared with the first circuit example and is merely made ¼ as compared with the case where a waveform of one period stored.

Figure 15:
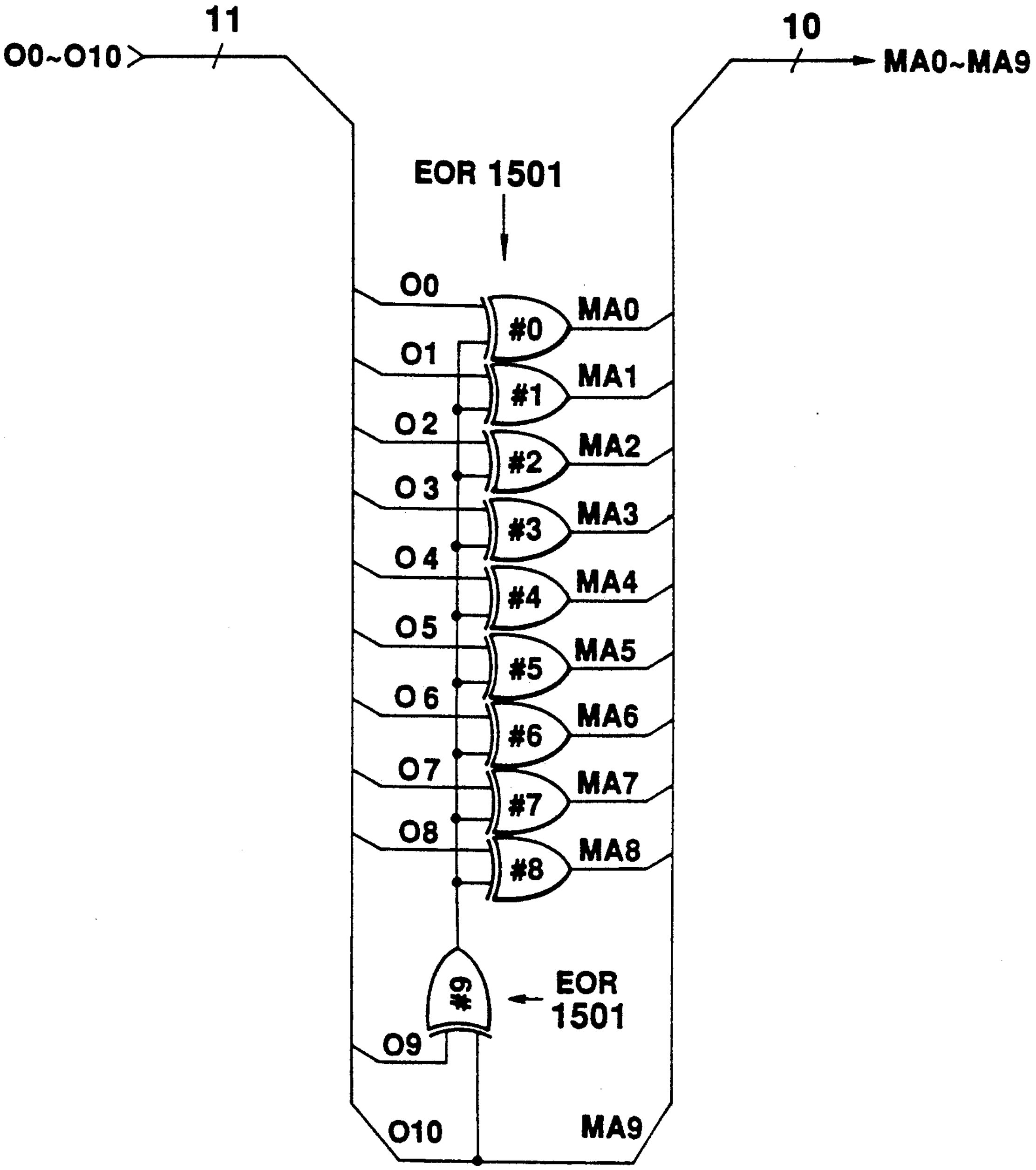
FIG. 15 is a view representing an example of a circuit of a triangular wave decoder in the detailed structure of the first embodiment.

FIG. 15 shows a circuit example of triangular wave decoder 1009 of FIG. 10. The addition waveform O9 of the 10th bit and the addition waveform O10 of the most significant bit from adder 1008 in FIG. 10 are inputted to respective input terminals of #9. This output is inputted to the respective first terminals of EOR 1501 of #0–#8. Addition waveform O0 to O8 of 0 to 8 bit are inputted to the respective second terminals of EOR 1501 of #0–#8. Respective outputs of EOR 1501 of #0–#8 are inputted to a multiplier 1010 in FIG. 10 as the decoded outputs MA0–MA8, and addition waveform O10 of the most significant bit are inputted to the multiplier 1010 as the decoded output MA9.

An operation of the triangular wave decoder with the above structure will now be explained.

Supposing that the value Z determined by addition waveforms O0–O10 sequentially increases in proportion to a time and a phase angle of a single period, namely, 0–$2\pi$[rad] can be designated by a full range of addition waveforms O0–O10. As a first case, a combination (O10, O9) of the logic of the most significant bit O10 and the 10th bit O9 of the addition waveforms is (0, 0), and the values designated by addition waveforms O0 to O10 change from 0 to $\pi/2$[rad], namely, ¼ a full range.

In this area, the output of EOR 1501 of #9 becomes logic "0" and thus, as addition waveforms O0–O8 inputted to EOR 1501 of #0–#8 sequentially increase with time, the same waveforms as the addition waveforms O0–O8 appear as decoded output MA0–MA8 of lower 9 bits. Further, decoded output MA9 of the most significant bit, which is a sine bit, is equal to addition waveform 010 of the most significant bit and is logic "0". Thus, a positive decoded output is produced in the above range. If this is represented by an equation and W is the value determined by decoded output MA0–MA9, the following relation is established.

$$W=Z \quad (19)$$

where, $(0 \leq Z \leq \pi/2)$

As a second case, suppose (O10, O9)=(0, 1) where the values representing addition waveforms O0–O10 change from $\pi/2$ to $\pi$[rad]. In this range, the output of EOR 1501 of #9 becomes logic "1" and as addition waveforms O0–O8 inputted to EOR 1501 of #0–#8 sequentially increases with time, the waveforms sequentially decreasing in a manner opposite to the above addition waveforms are outputted as decoded outputs MA0–MA8 of the lower 9 bits. Further, decoded output MA9 of the most significant bit is a sine bit and is equal to addition waveform O10 of the most significant bit with a logic value of "0". Therefore, the positive decoded output is produced in the above range and is expressed by the following equation.

$$W=-Z+\pi \quad (20)$$

where, $(\pi/2 \leq Z \leq \pi)$

As a third case, suppose (O10,O9)=(1, 0) where the values represented by addition waveforms O0–O10 change from $\pi$ to $3\pi/2$ [rad]. In this range, the output of EOR 1501 of #9 becomes logic "1" in a manner similar to the second case and thus, the state of EOR 1501 of #0–#8 is similar to that in the second case. Inputted addition waveforms O0–O8 sequentially increase with time, and waveforms sequentially decreasing in a manner opposite to the above addition waveforms are outputted as decoded outputs MA0–MA8 of the lower 9 bits. On the other hand, decoded output MA9 of the most significant bit which is a sine bit produces a negative decoded output in the above range as addition waveform O10 of the most significant bit is changed to logic "1". This is expressed by the following equation.

$$W=-Z+\pi \quad (21)$$

where, $(\pi \leq Z \leq 3\pi/2)$

As a fourth case, suppose (O10, O9)=(1, 1) where the values designated by addition waveforms O0–O10 change from $3\pi/2$ to $2\pi$[rad]. In this range, the output of EOR 1501 of #9 becomes logic "0" in a manner similar to the first case. The state of EOR 1501 of #0–#8 is similar to that in the first case, and as inputted addition waveforms O0–O8 sequentially increase with time the same waveforms as the addition waveforms are outputted as the decoded outputs MA0–MA8 of the lower 9 bits. On the other hand, decoded output MA9 of the most significant bit is a sine bit and the addition waveform O10 of the most significant bit is logic "1", thereby producing a negative decoded output within the above range. This is expressed by the following equation.

$$W=Z-2\pi \quad (22)$$

where $(3\pi/2 \leq Z \leq 2\pi)$

The equations (19)–(22) corresponding to the above first to fourth cases are summarized as follows.

$$W = Z \text{ where, } (0 \leq Z \leq \pi/2) \quad (23)$$

$$W = -Z + \pi \text{ where, } (\pi/2 \leq Z \leq 3\pi/2)$$

$$W = Z - 2\pi \text{ where, } (3\pi/2 \leq Z \leq 2\pi)$$

The equation (7) shown above to represent a characteristic of decoder 105 in FIG. 1 can be changed to provide the following equation.

$$D = (2/\pi)x \,..\, (0 \leq x \leq \pi/2) \quad (24)$$

$$D = (2/\pi)(-x + \pi) \,..\, (\pi/2 \leq x \leq 3\pi/2)$$

$$D = (2/\pi)(x - 2\pi) \,..\, (3\pi/2 \leq x \leq 2\pi)$$

When the above equation (24) is compared with the equation (23) the relation of the input and output is substantially the same except that the entire gain is different by $2/\pi$. Therefore, triangular wave decoder 1009 operates in the same manner as decoder 105 in FIG. 1 represented by the characteristic of the equation (7) as shown in FIG. 15.

A detailed circuit example of carrier signal generating circuit 1003 and triangular wave decoder 1009 in FIG. 10 are shown above. Modulation signal generating circuit 1005 of FIG. 10 can be realized by ROM memory for storing a sine wave of ½ or ¼ the period of generating a waveform of one period in a manner similar to FIG. 11 or 13. Adders 1002, 1005 and 1008, or multipliers 1007 and 1010 can be realized by a well-known circuit, and envelope generator 1006 can be realized by a well-known circuit in the electronic musical instrument field.

The first embodiment of FIG. 10 has been identified as a circuit for outputting a single musical sound waveform However, adder 1002, carrier signal generating circuit 1003, adder 1004, modulation signal generating circuit 1005, envelope generator 1006, multiplier 1007, adder 1008, triangular wave decoder 1009 and multiplier 1010 are constructed in a manner such as they can operate in a time divisional manner. Thus a musical sound of respective time divisional channels is accumulated every sampling period at an input stage of D/A converter 1011. In the present invention, a plurality of musical sound waveforms can therefore be produced in parallel.

2. An explanation of the second embodiment

The second embodiment of the present invention will now be explained.

The basic principles of the second embodiment are the same structural and operational principles of the first embodiment recited with reference to FIGS. 1 to 9.

Figure 16:
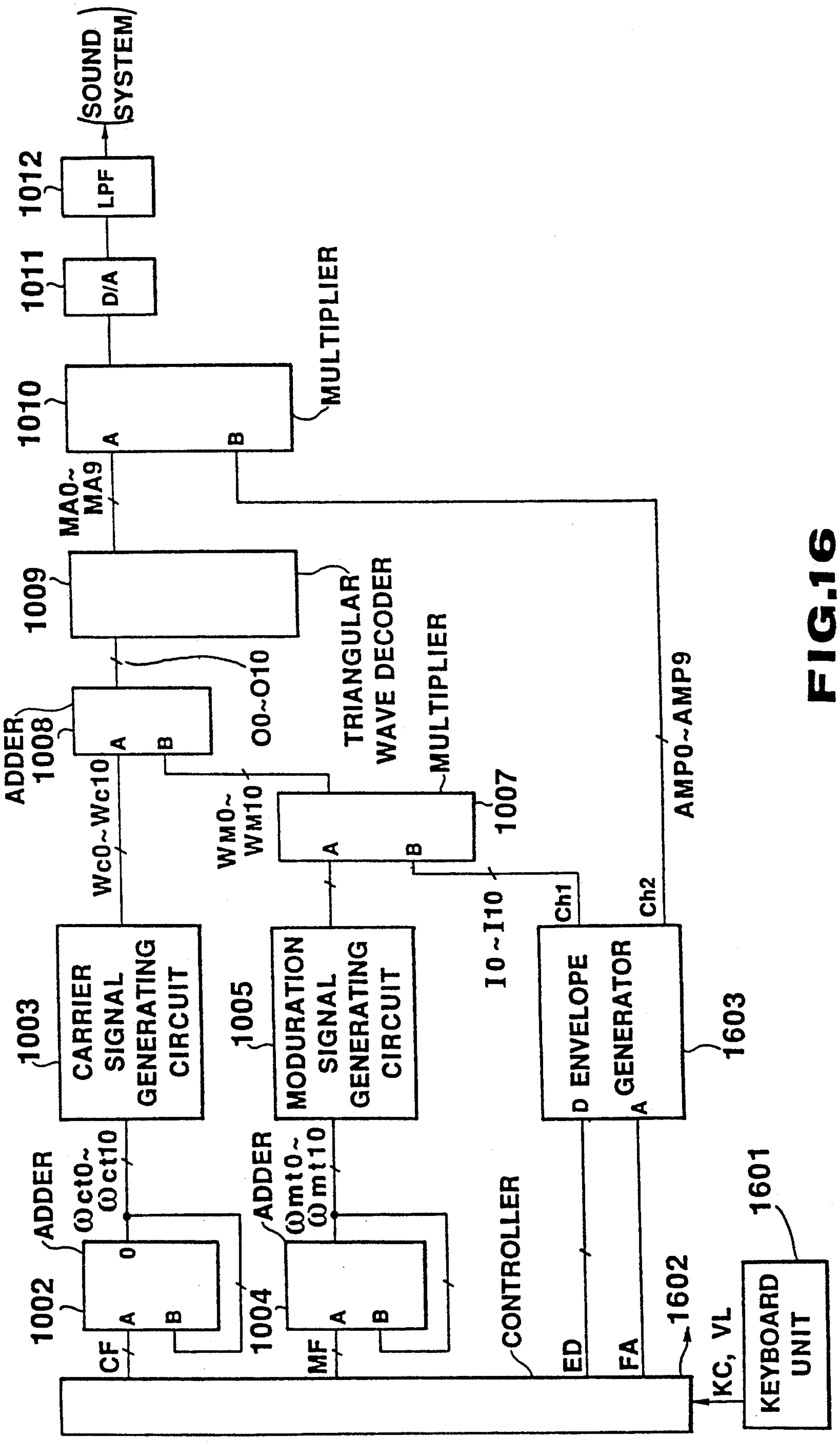
FIG. 16 is a view representing the detailed structure of the second embodiment.

The detailed structure of the second embodiment is shown in FIG. 16. This embodiment is an example in which a musical sound waveform generator of the present invention is applied to an electronic keyboard. The present embodiment is characterized by controlling a wide change in state from higher harmonics in a produced musical sound to a single sine wave in a produced musical sound based on the speed (strength) of depression of a key on a keyboard of a musical instrument. In FIG. 16, the circuit or signals given the same number as in the first embodiment in FIG. 10 perform the same function as in FIG. 10. The second embodiment of FIG. 16 is different from the first embodiment in FIG. 10 in that keyboard unit 1601 is connected to controller 1602 (which corresponds to a controller 1001 in FIG. 10). Controller 1602 produces an output carrier frequency CF, modulator frequency MF and envelope data ED and FA (which will be explained in detail later), depending on the state of a parameter set by a setting unit not shown in the drawing, and depending on a key code KC and a velocity VL from keyboard 1601.

Adders 1002 or 1004 are accumulators for respectively generating carrier wave phase angle $\omega_{ct}0$–$\omega_{ct}10$ of 10 bits or modulation wave phase angle $\omega_{mt}0$–$\omega_{mt}10$ in the same manner as in FIG. 10. Carrier frequency CF is determined to be a frequency corresponding to a key code KC from keyboard unit 1601, for example, and modulator frequency MF is determined to provide the ratio previously set by a performer with regard to a carrier frequency CF, for example, thereby generating a musical sound waveform of a pitch corresponding to the keyboard operation of the performer.

The function of carrier signal generating circuit 1003 and modulation signal generating circuit 1005 is the same as in FIG. 10.

On the other hand, envelope generator 1603 outputs modulation depth function I0–I10 of two channels comprising 11 bits and 10 bits, respectively, and further outputs amplitude coefficients AMP0–AMP19 from terminals Ch1 and Ch2 of envelope generator 1603 based on the address data FA and setting data ED from controller 1602. These correspond to modulation depth function I(t) and amplitude coefficient A in FIG. 1, and can be changed with time based on key codes KC and velocity VL inputted from keyboard unit 1601. This feature differs from the first embodiment shown in FIG. 10. The functions and operation of multiplier 1007, adder 1008, triangular wave decoder 1009, multiplier 1010, D/A converter 1011 and low pass filter 1012 are all the same as in the first embodiment shown in FIG. 10.

The detailed circuit example of carrier signal generating circuit 1003 in FIG. 16 is the same as that in FIGS. 11 and 13 of the first embodiment. Operation has already been explained with reference to FIGS. 12 and 14.

The detailed circuit example of triangular wave decoder 1009 in FIG. 16 is the same as that in FIG. 15 of the first embodiment. Operation has also already been explained.

Further, the detailed circuit of modulation signal generating circuit 1005 in FIG. 16 can be realized as the circuit for storing ½ or ¼ period of sine waveform in ROM and for generating a waveform of one period in the same manner as in FIGS. 11 and 13.

Next, operation of an envelope generator 1603 in FIG. 16 will be explained and is the same as that of the envelope generator circuit used in an ordinary electronic musical instrument, except that an envelope waveform for two channels can be outputted in the case of the present invention. The present embodiment has characteristics in that respective parameters are set in envelope generator 1603 from controller 1602. The operation will be explained below.

Figures 17, 18:
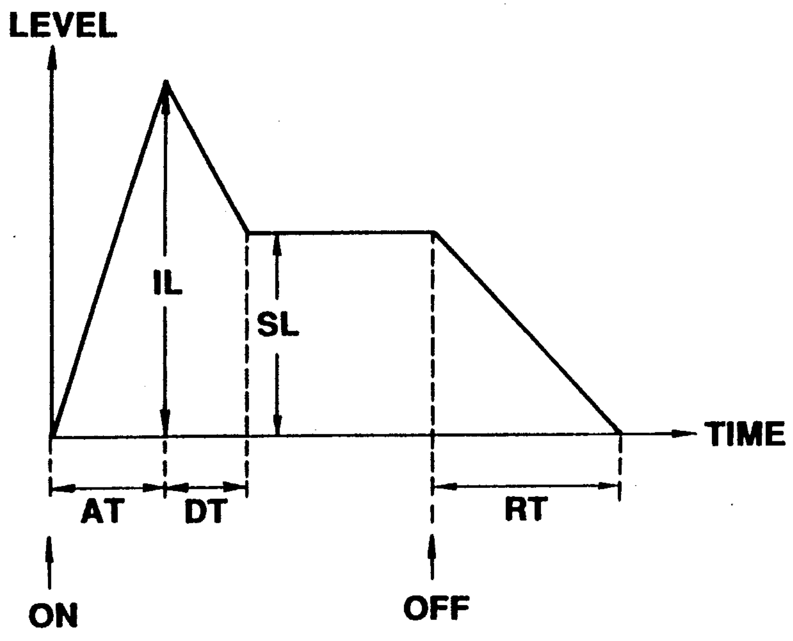
FIG. 17 is a view of an output characteristic of an envelope generator in the detailed structure of the second embodiment.
FIG. 18 is a view showing the relation between an address data value and the kind of the set data in the detailed structure of the second embodiment.

An example of modulation depth function I0–I10 and amplitude coefficients AMP0–AMP9 respectively outputted as channels Ch1 and Ch2 from envelope generator 1603 are shown in FIG. 17. In FIG. 17, ON designates a timing means when a key on keyboard unit 1601 in FIG. 16 is depressed, and OFF designated a timing means when a key depression is released. Respective output values of channel Ch1 and channel Ch2 reaches an initial level IL during the period of an attack time AT starting with the depression of the key and becomes a sustain level SL when decay time DT elapses from the time of initial level IL. The sustain level SL is maintained until the key is released and the level becomes 0 in a release time RT after a release of the key, thereby enabling the sound to be silent.

Address data FA is set to the address input terminal A of envelope generator 1603 by controller 1602 in FIG. 16 and the setting data ED is provided to data input terminal D, thereby enabling respective output waveforms channel Ch1 and channel Ch2 of envelope generator 1603 in FIG. 16 to be set. In this case, the relation between the address value of address input terminal A and the kind of data of data input terminal D is shown in FIG. 18. By providing respective values shown in FIG. 18 to address input terminal A by address data FA, various kinds of data shown in FIG. 18 can be set to data input terminal D by setting data ED. The same kind of parameter is set in channel Ch1 and Ch2 in FIG. 18, but the kind of the parameter may be different.

Figures 26, 27:
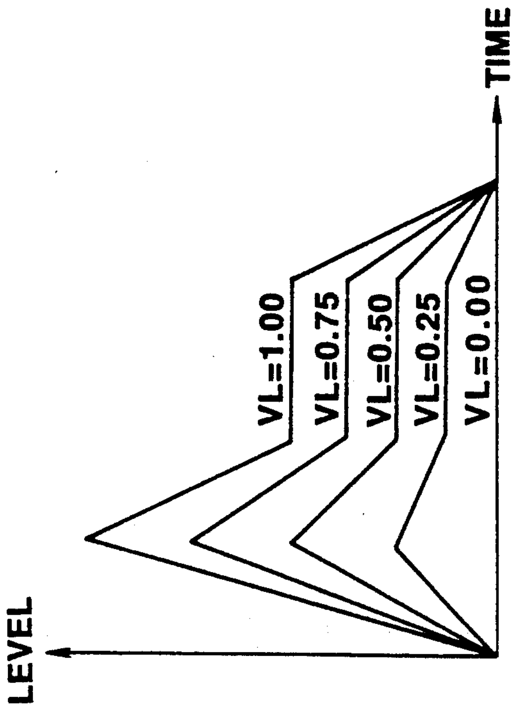
FIG. 26 is a view representing tone data in the detailed structure of the second embodiment.
FIG. 27 is a view representing an example of the operation of the envelope generator in the detailed structure of the second embodiment.

Next, an operational flow chart of controller 1602 is shown in FIGS. 19 to 25 when a performer plays by operating keyboard unit 1601 shown in FIG. 16. Respective variable numbers to be processed by controller 1602 are shown in FIG. 26. Detune data DTUNE of a modulation wave with regard to a carrier wave in FIG. 26 designates how much the frequency of modulation wave phase angle $\omega_{mt}0$–$\omega_{mt}10$ is shifted from the frequency of carrier wave phase angle $\omega_{ct}0$–$\omega_{ct}10$ upon setting the frequency, thereby varying the structure of the higher harmonics of a musical waveform produced.

Respective data corresponding to channel Ch1 and channel Ch2 in FIG. 26 correspond to respective data shown in FIG. 18 and set in envelope generator 1603 of FIG. 16.

Figure 19:
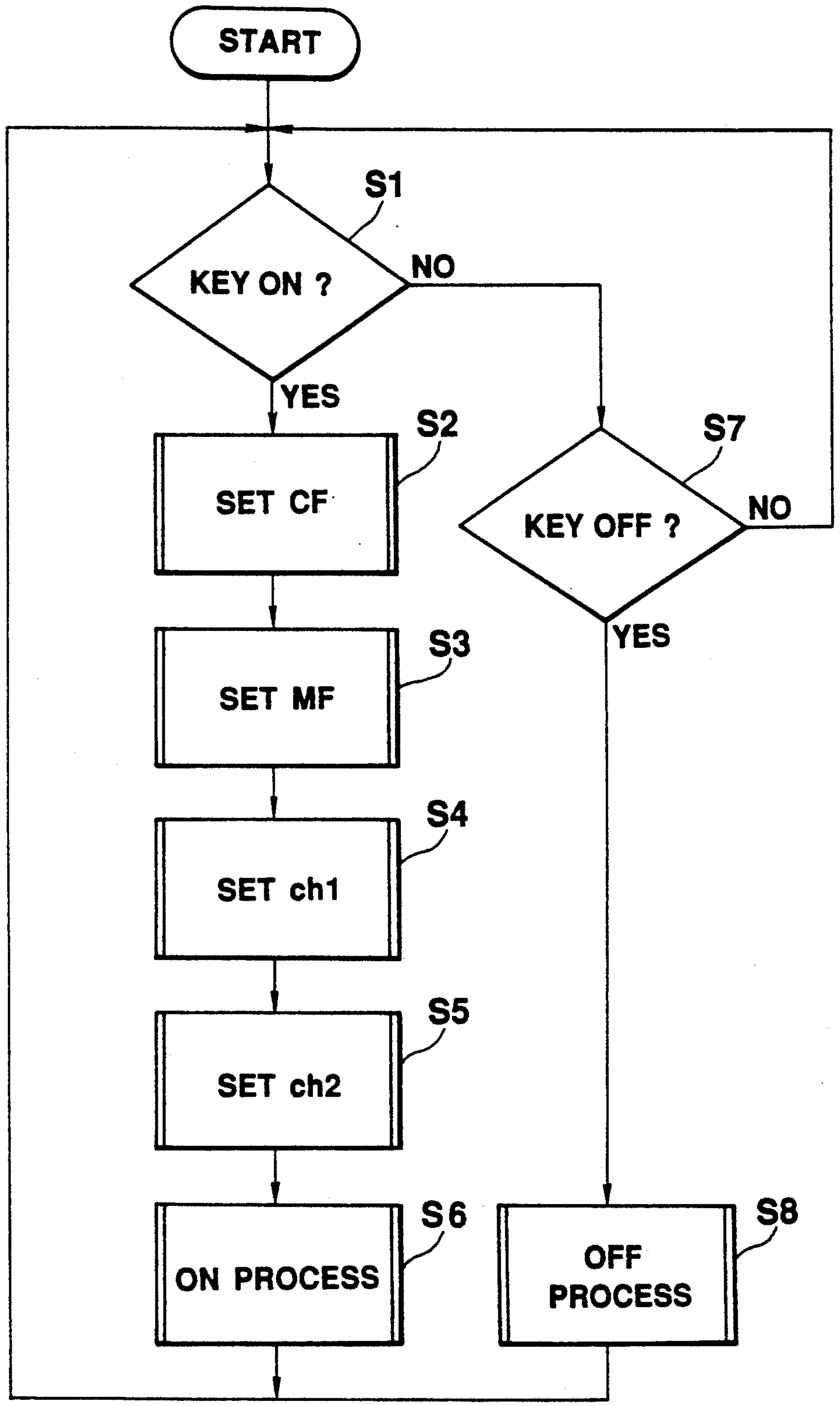
FIG. 19 is a flow chart of the main operation in the detailed structure of the second embodiment.

FIG. 19 is the main operational flow chart of controller 1602. In a repetition of processes from S1 to S7 in FIG. 19, controller 1602 monitors which key is depressed or released on keyboard unit 1601.

When any one of the keys depressed, the process advances from S1 to S2. At S2, the process of setting carrier frequency CF in adder 1002 in FIG. 16 is conducted. The operational flow chart is shown in FIG. 20.

At S9, key code KC is obtained by a depression from keyboard unit 1601.

Figure 20:
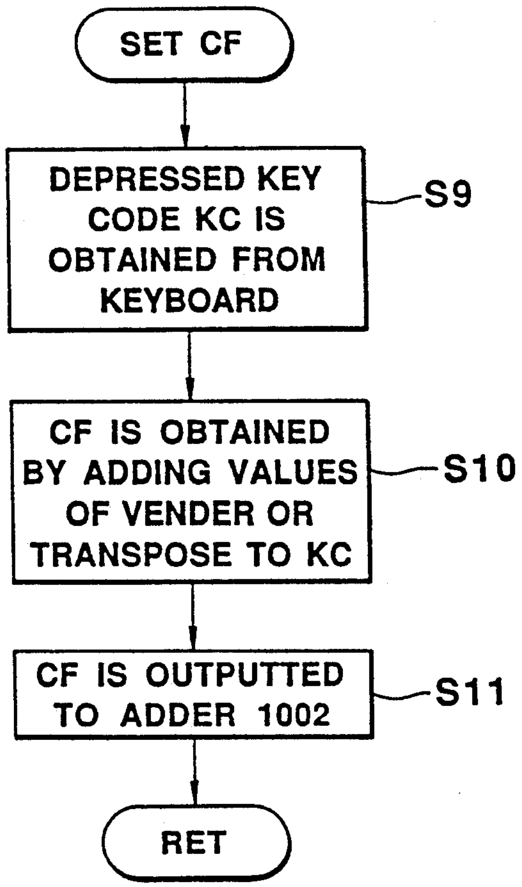
FIG. 20 is a flow chart of an operation of CF set in the detailed structure of the second embodiment.

Next, at S10, values such as vendor and transpose which are not shown in FIG. 20 are added to key code KC to calculate carrier frequency CF. The vendor value is the data of the controller provided so that the performer can selectively change the pitch of a musical sound which is being produced during the performance. The transpose value is the setting data for shifting of the key or changing of an octave upon keyboard unit 1601.

Sequentially, at S11 in FIG. 20, carrier frequency CF calculated as recited above is outputted to adder 1002.

Figure 21:
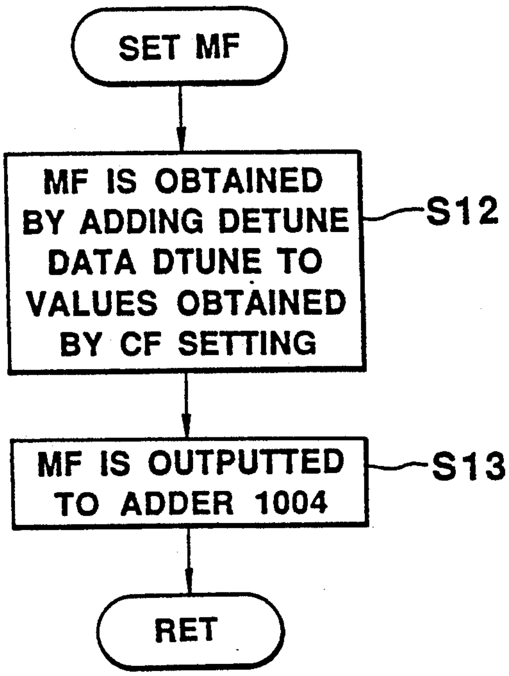
FIG. 21 is a flow chart of an operation of an MF set in the detailed structure of the second embodiment.

Therefore, the adder 1002 in FIG. 16 outputs carrier wave phase angle $\omega_{ct}0-\omega_{ct}10$ in accordance with a depressed key. After the above operation is conducted the process is returned to the main operational flowchart shown in FIG. 19, and proceeds from S2 to S3. At S3, modulator frequency MF is set in adder 1004 in FIG. 16 and follows the operational flowchart as shown in FIG. 21.

First of all, at S12, detune data DTUNE (which should be referred to FIG. 26) is set beforehand by a performer and is added to the carrier frequency CF set in S2 (FIG. 20), thereby calculating the modulator frequency MF. Modulator frequency MF, determined as recited above, is outputted to adder 1004. Therefore, adder 1004 outputs modulation wave phase angle $\omega_{mt}0-\omega_{mt}10$ having a predetermined relationship with carrier wave phase angle $\omega_{ct}0-\omega_{ct}10$ outputted from adder 1002 in FIG. 16.

Figure 22:
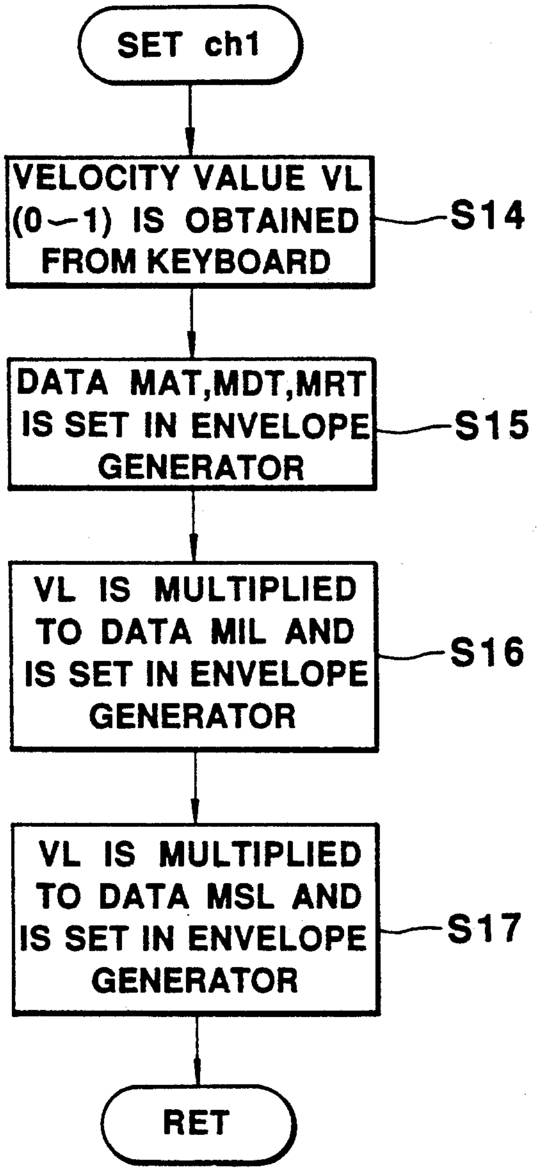
FIG. 22 is a flow chart of an operation of a Ch1 set in the detailed structure of the second embodiment.

After the above operation is conducted the process is returned to the main operational flow chart shown in FIG. 19, and the process advances from S3 to S4. At S4, a process for setting respective parameters of channel Ch1 of envelope generator 1603 in FIG. 16 is conducted. FIG. 22 shows an operational flowchart.

At S14, velocity VL of a key depressed on keyboard 1601 in FIG. 16 can be obtained. The value can be obtained between 0 to 1.

Next, at S15, attack time MAT, decay time MDT and release time MRT of channel Ch1 (which should be referred to FIG. 26) is set in envelope generator 1603 in FIG. 16 as tone data. This setting is conducted by determining the value provided to address input terminal A of envelope generator 1603 by address data FA and by outputting the corresponding various variable value to data input terminal D as setting data ED as shown in FIG. 18.

Sequentially, at S16, the initial level MIL of channel ch1, which is tone data, is multiplied by a value of velocity VL and is set in envelope generator 1603. The setting operation is conducted in the same manner as at S15.

Further at S17, sustain level MSL of channel Ch1, which is tone data, is multiplied by velocity VL and then is set in envelope generator 1603 in the same manner as above.

Figure 23:
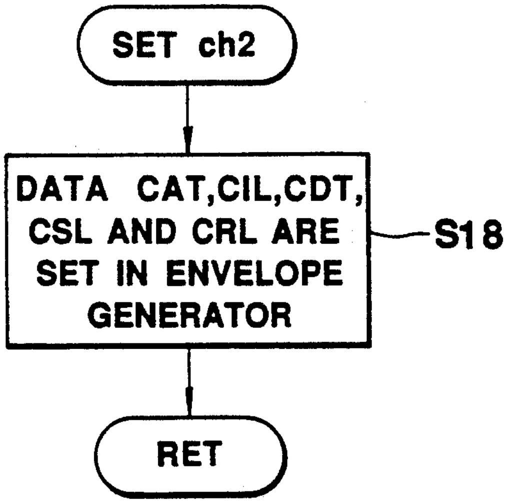
FIG. 23 is a flow chart of an operation of a Ch2 set in the detailed structure of the second embodiment

After the above operation is conducted, the process is returned to the main operational flowchart of FIG. 19 and advances from S4 to S5. At S5, a process of determining respective parameters of channel Ch2 of envelope generator 1603 in FIG. 16 is conducted. FIG. 23 shows the operational flowchart.

Namely, at S18, attack time CAT, initial level CIL, decay time CDT, sustain level CSL and release time CRT (which should be referred to FIG. 26) of channel Ch2 are set in envelope generator 1603 in FIG. 16 as tone data. The setting operation is conducted in the same manner as in channel Ch1.

Figure 24:
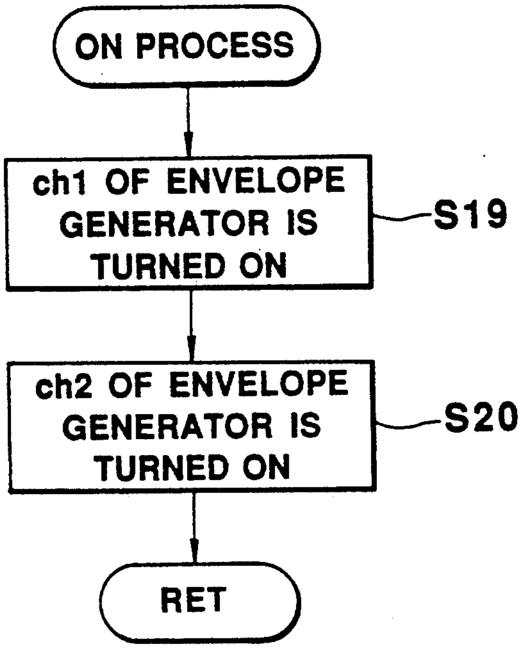
FIG. 24 is a flow chart of an operation of an on process in the detailed structure of the second embodiment.

In accordance with the above process, upon completing a setting of respective parameters to carrier frequency CF, modulator frequency MF and envelope generator 1603, the process is returned to the main opeational flow chart in FIG. 19, and proceeds from S5 to S6, where it performs an ON process for producing a musical sound. The operational flowchart is shown in FIG. 24.

At S19, a command for turning on channel Ch1 is provided to envelope generator 1603, as shown in FIG. 16. This process is executed by enabling controller 1602 of FIG. 16 to set the value 0 at address data FA and to output an appropriate command data as setting data ED.

Next, at S20, a command for turning on channel Ch2 is provided to envelope generator 1603. This process is executed by enabling controller 1602 of FIG. 16 to set the value 7 as an address data FA, and to output an appropriate command data as setting data ED, as shown in FIG. 18, in the same manner as in channel ch1.

Thus, the ON process at S6 in FIG. 19 is completed.

Figure 25:
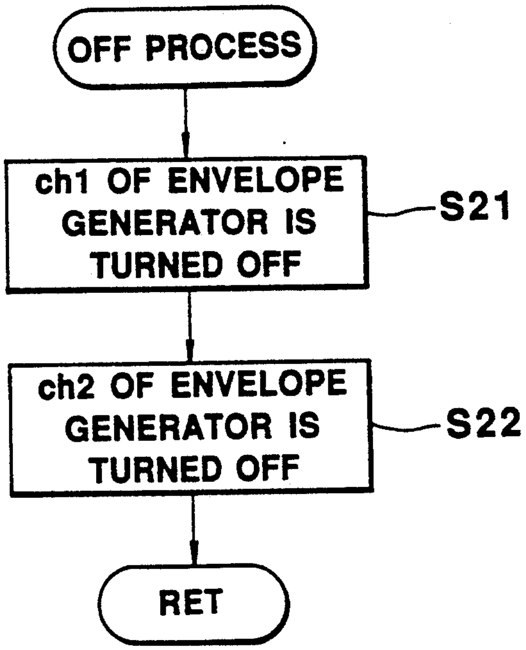
FIG. 25 is a flow chart of an operation of an off process in the detailed structure of the second embodiment.

On the other hand, upon releasing a key which has been depressed on keyboard unit 1601 in FIG. 16, the process proceeds from S7 to S8 in FIG. 19, and performs an OFF process to extinguish the musical sound which has been produced. The operational flowchart is shown in FIG. 25.

At S21, a command for turning on channel Ch1 is provided to envelope generator 1603 in FIG. 16. This process is executed by enabling controller 1602 of FIG. 16 to set the value 1 as address data FA, and outputs an appropriate command data as setting data ED, as shown in FIG. 18.

Next, at S22, a command for turning off channel Ch2 is provided to envelope generator 1603. This process is executed by enabling controller 1602 in FIG. 16 to set the value 8 as address data FA and to output an appropriate command data as setting data ED, as shown in FIG. 18 in the same manner as in channel ch1.

Therefore, the OFF process at S8 in FIG. 19 is completed.

In accordance with the above process, modulation depth function I0–I10 and amplitude coefficient AMP0–AMP9 corresponding to channel ch1 are produced from envelope generator 1603 in FIG. 16 with such characteristics as shown in FIG. 17. Based on these data, respective circuit in FIG. 16 are operated as explained above to generate a musical sound waveform.

In this case, a characteristic of modulation depth function I0–I10 corresponding to channel Ch1 varies as shown in FIG. 27 in accordance with the value of velocity VL representing the strength of a depressed key on keyboard unit 1601 in FIG. 16. The more initial level IL and sustain level SL increase, the larger the value of velocity VL becomes, as shown S16 and S17 in FIG. 22.

Therefore, when the key is depressed strongly, the value of velocity VL becomes large, thereby increasing the value of-modulation depth function I0–I10 as a whole. As a result, the mixture ratio of modulation wave phase angle $\omega_{mt}0-\omega_{mt}10$ to carrier phase angle $\omega_{ct}0-\omega_{ct}10$ at adder 1008 in FIG. 16 is made large, thereby enabling plenty of higher harmonics to be included in a produced musical sound.

Reversely, when the key is depressed weakly, the value of velocity VL becomes small, thereby decreasing the modulation depth function I0–I10 as a whole. As a result, the mixture ratio of modulation wave phase angle $\omega_{mt}0-\omega_{mt}10$ to modulation wave phase angle $\omega_{ct}0-\omega_{ct}10$ shown as adder 1008 in FIG. 16 is made small, thereby enabling the produced musical sound to become close to a single sine wave. As recited above, the present embodiment has a feature of controlling a wide change in state from higher harmonics in the produced musical sound to a single sine wave in the produced musical sound, based on the strength or speed of the depression of the key.

In the above embodiment, the envelope characteristics of channel Ch1 of envelope generator 1603 in FIG. 16, namely, the modulation depth functions I0–I10, can be changed in accordance with a velocity VL and envelope characteristics of channel Ch2. Additionally, the amplitude coefficient AMP0–AMP9 can be changed by-velocity VL, thereby varying the sound volume of the musical sound in accordance with the strength of the depression of a key.

The envelope characteristic of modulation depth function I0–I10 is changed by velocity VL and is controlled by the key of keyboard unit 1601 in FIG. 16 which is depressed. Namely, where a key of a lower range is depressed, the value of modulation depth functions I0–I10 is made small and, where the key in a higher range is depressed, it is made large, thereby enabling suitable operation for simulation of a tone including higher harmonics in a lower range such as a piano sound.

The embodiment of FIG. 16 has been identified as a circuit outputting a single musical sound waveform. As is the similar aforementioned first embodiment, adder 1002, carrier signal generating circuit 1003, adder 1004, modulation signal generating circuit 1005, envelope generator 1603, multiplier 1007, adder 1008, triangular wave decoder 1009 and multiplier 1010 in FIG. 16 may be constructed to be operated in a time divisional manner. Thus, a musical sound of respective time divisional channels is accumulated every sampling period at an input stage of D/A converter 1011. In the present invention, a plurality of musical sound waveforms can therefore be produced in parallel.

3. An explanation of the third embodiment

The third embodiment of the present invention will now be explained.

Figure 28:
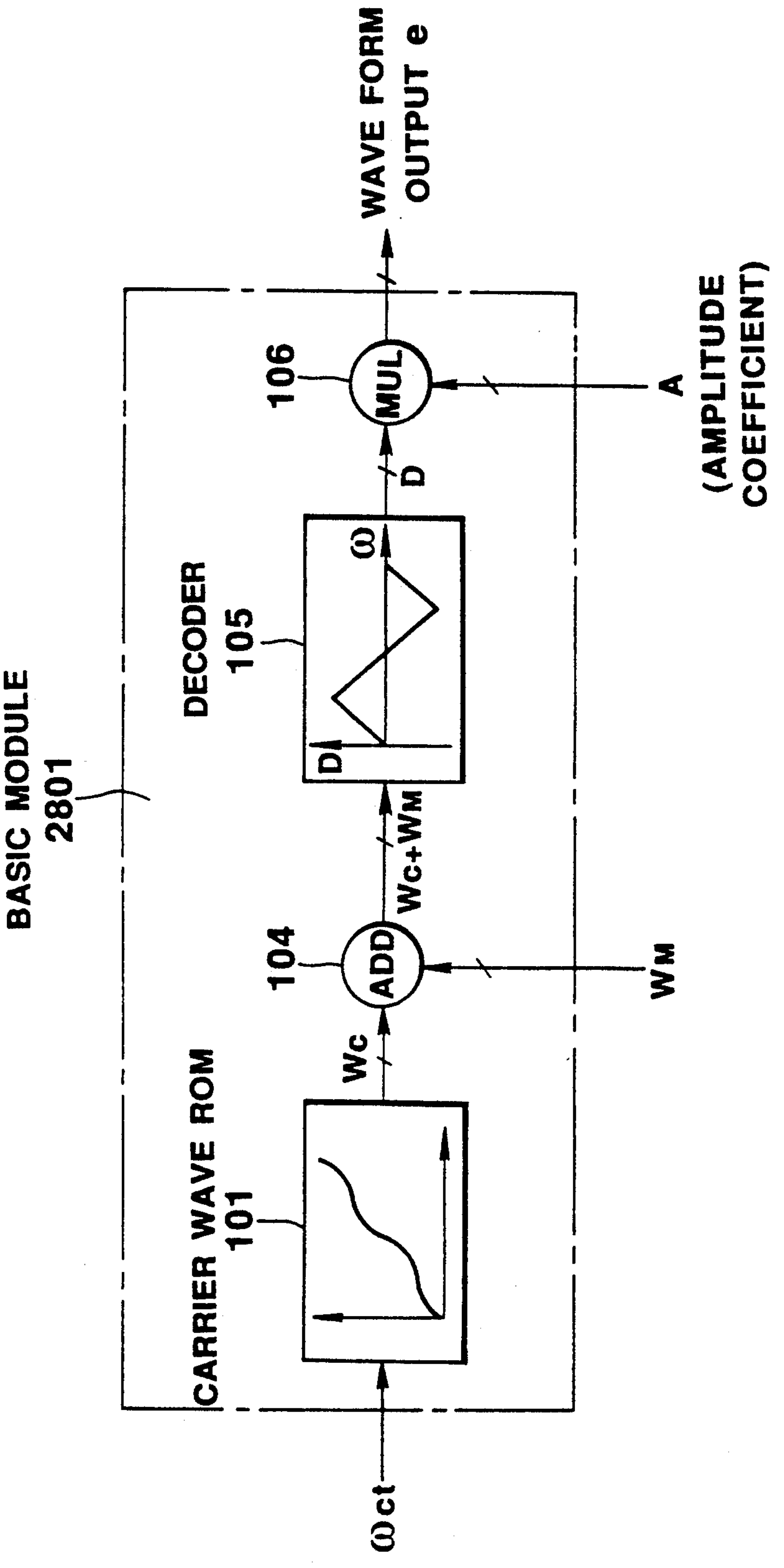
FIG. 28 is a view of the principle structure of the third embodiment.

The concept of a basic module for performing an arithmetic operation of basic waveform output is used and the principle structure of basic module will now be explained. FIG. 28 shows this principle strucure of a basic module 2801.

The basic module is different from the principle structure of the first embodiment shown in FIG. 1. Namely, modulation signal $W_M$ is not input to through MUL 103 from modulation wave ROM 102 unlike case where the basic module receives the output of the previous basic module as is described later. However, the basic operation per module is almost the same as in FIG. 1.

Namely, in basic module 2801, the function waveform shown in FIG. 2 is stored in carrier wave ROM 101. Therefore, the relation between carrier wave phase angle $\omega_{ct}$[rad] and carrier signal $W_C$[rad] in respective regions I, II and III in FIG. 2 is similar to the equation (3).

Carrier signal $W_C$ arithmetically operated in accordance with the equation (3) and modulation signal $W_M$ transmitted from an external unit are added and are inputted to decoder 105. The decoded output D is outputted from decoder 105 and further multiplied by amplitude coefficient A in MUL106, thereby providing the following wavefrom output e.

$$e = A \cdot TRI\{(\pi/2)\sin\omega_{ct} + W_M\} \ldots (0 \leqq \omega_{ct} \leqq \pi/2) \quad (25)$$

$$e = A \cdot TRI\{\pi - (\pi/2)\sin\omega_{ct} + W_M\} \ldots (\pi/2 \leqq \omega_{ct} \leqq 3\pi/2)$$

$$e = A \cdot TRI\{2\pi + (\pi/2)\sin\omega_{ct} + W_M\} \ldots (3\pi/2 \leqq \omega_{ct} \leqq 2\pi)$$

TRI(x) is defined as a triangular function.

When modulation signal $W_M$ is 0, namely, in the case of non-modulation, the input waveform to decoder 105 is nothing but the carrying signal $W_C$ defined by the equation (3). This corresponds to the case where the value of modulation depth function I(t) is 0 in FIG. 1 and therefore waveform output e is the same as the equation (6). Carrier signal $W_C$ and carrier wave phase angle $\omega_{ct}$ are expressed by the relation A in FIG. 3 in the same manner as in FIG. 1. On the other hand, triangular function D=TRI(x) (where, x is input) arithmetically operated in decoder 105 is defined by the equation (7) in the same manner as in FIG. 1, and is a function represented by the relation B in FIG. 3. Therefore, the waveform output e is changed as shown in equation (8) in the same manner in FIG. 1, thereby providing a single sine wave $A \cdot \sin \omega_{ct}$. Namely, where it is supposed that amplitude coefficient A=1, for example, the relation between the carrier wave phase angle $\omega_{ct}$ and waveform output e upon non-modulation is expressed as relation C in FIG. 3 in the same as in FIG. 1.

From the above relation, it becomes clear that modulation signal $W_M$ inputted from an external unit is made close to 0 with time in order to realize a process in which a musical sound is attenuated to comprise only a single sine wave component. Or the modulation signal is 0 to generate musical sound comprising only a single sine wave component.

Next, the change of waveform output e in the case of increasing the mixture ratio of modulating signal $W_M$ to carrier signal $W_C$ at ADD 104 will be explained. In this case, the same effect as in the case where the value of modulation depth function I(t) is increased in FIG. 1 can be obtained. Namely, when the mixture ratio of modulating signal $W_M$ is gradually increased from the value 0 and when the addition waveform $W_C+W_M$ outputted from ADD 104 in FIG. 28 is changed from a component comprising only carrier signal $W_C$ to a signal in which the modulation signal $W_M$ component is gradually superimposed to carrier signal $W_C$, waveform output e is reformed along a time axis from a single sine wave to a distorted wave and is changed along a frequency axis so that higher harmonics component are included. In this case, a conversion function at decoder 105 is originally the triangular wave shown by the equation (7) or FIG. 3B and originally includes higher harmonics components. Modulation is applied to this function based on the modulation signal $W_M$, thereby enabling more complex harmonics characteristics to be obtained.

In the above basic module 2801, carrier wave ROM 101 stores carrier signal $W_C$ represented by the equation (3) or relation A of FIGS. 2 or 3 and enables waveform output e of decoder 105 to comprise a sine wave, the decoder 105 having characteristics shown by the equation (7) or relation B of FIG. 3, thereby enabling a single sine wave to be produced. The present invention is not limited to the above case and a combination shown in FIGS. 8A to 8D may provide the same effect as in the case shown in FIG. 1. These relations are shown by the above recited equations (9) to (16).

In the basic module 2801 in FIG. 28, amplitude coefficient A multiplied by MUL 106 is identified as a constant value but it can actually be changed with time as in the case shown in FIG. 1. Thus, the amplitude modulated envelope characteristic can be added to waveform output e.

Next, the detailed structure of the third embodiment based on the principle structure of the basic module in FIG. 8 will be explained.

Figure 29:
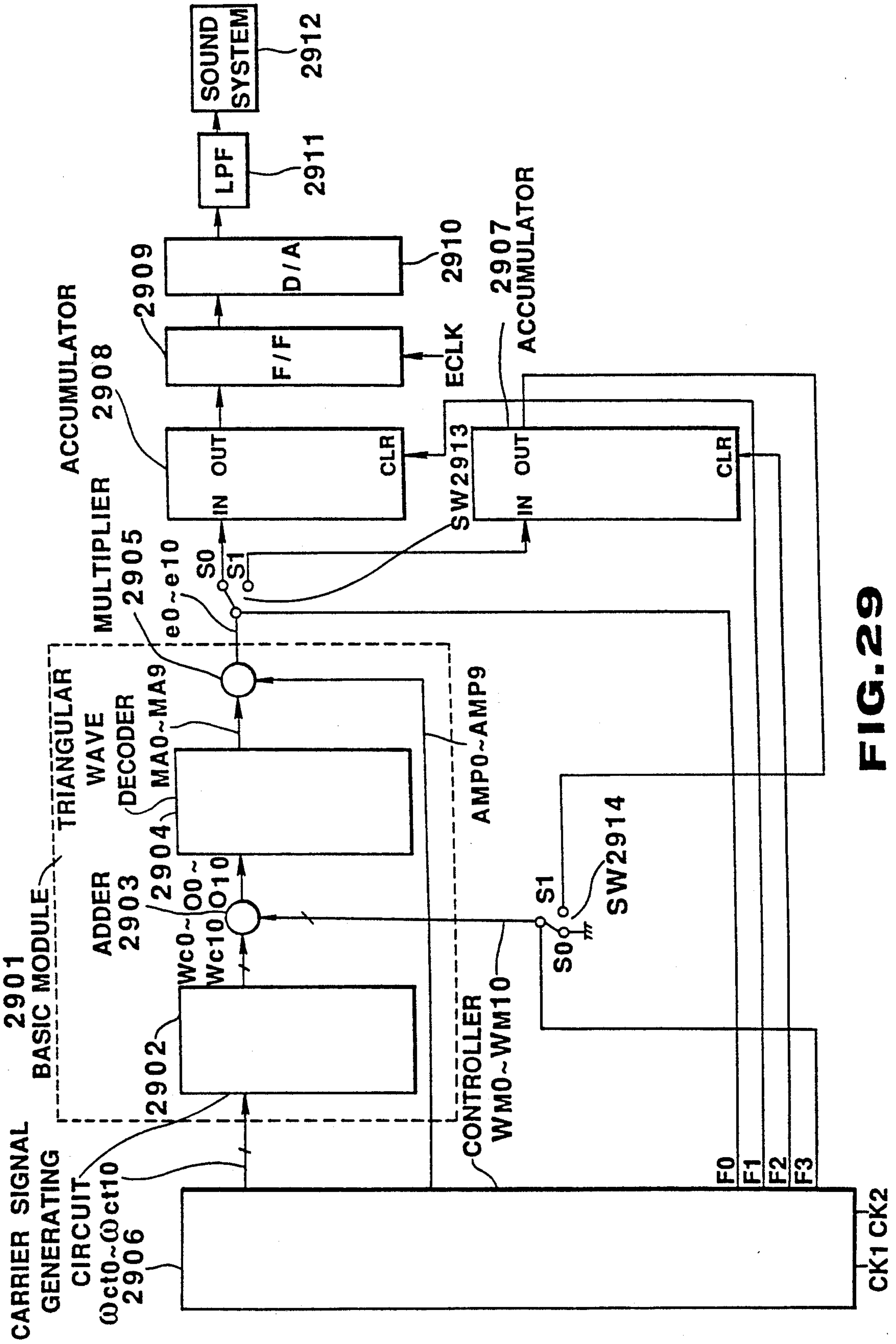
FIG. 29 is a view of the detailed structure of the third embodiment.

FIG. 29 is a structural view of an entire electronic musical instrument according to the third embodiment. The present embodiment comprises a structure of the basic module shown in FIG. 28 as a basis and thus the present embodiment is explained by referring to FIG. 28 when necessary.

Controller 2906 produces carrier wave phase angle $\omega_{ct}0$-$\omega_{ct}10$ comprising 11 bits, amplitude coefficients AMP0-AM09 comprising 10 bits, formation data F0, F1, F2 and F3, two phase clock CK1 and CK2, and latch clock ECLK in accordance with the state of parameters set by setting unit (not shown and described leter) and a pitch designation operation performed by, for example, a keyboard unit. In this case, repsective data corresponding to the number of the basic module which are combined per formation is outputted in a time divisional manner. This is described later in detail. Carrier phase angle $\omega_{ct}0$-$\omega_{ct}10$ and amplitude coefficients AMP0-AMP9 correspond to carrier wave phase angle $\omega_{ct}$ and amplitude coefficient A in FIG. 28.

The above carrier wave phase angle $\omega_{cr}$-$\omega_{ct}10$ and amplitude coefficients AMP0-AMP9 are inputted to basic module 2901.

Basic module 2901 corresponds to basic module 2801 in FIG. 28 and is constituted by carrier signal generating circuit 2902 corresponding to carrier wave ROM 101 shown in FIG. 28, triangular wave decoder 2904 corresponding to decoder 105, adder 2903 corresponding to ADD 104 and multiplier 2905 corresponding to MUL 106.

Carrier wave phase angle $\omega_{ct}0$-$\omega_{ct}10$ and amplitude coefficients AMP0-AMP9 are respectively supplied to carrier wave generating circuit 2902 and multiplier 2905 from controller 2906.

In the basic module 2901, carrier signals $W_C0$-$W_C10$ comprising 11 bits outputted from carrier signal generating circuit 2902 correspond to carrier signal $W_C$ in FIG. 28. Addition waveforms O0-O10 comprising 11 bits outputted from adder 2903 correspond to addition waveform $W_C+W_M$ in FIG. 28. Decoded outputs MA0-MA9 comprising 10 bits outputted from triangular wave decoder 2904 correspond to decoded output D in FIG. 28. Waveform output e0-e10 comprising 11 bits outputted from multiplier 2905 corresponds to waveform output e in FIG. 28.

Waveform output e0-e10 outputted from basic module 2901 is selectively outputted to accumulator 2908 or 2907 through switch SW2913, which is controlled to be connected to terminal S0 or S1 depending on a logic "0" or logic "1" of formation data F0 outputted from controller 2906.

Accumulator 2907 accumulates waveform outputs e0-e10 from basic module 2901 after receiving the waveform outputs e0-e10 from terminal S1 of switch SW2913. This process is controlled by formation data F2 inputted to clear terminal CLR of accumulator 2907 from controller 2906, and two phase clock CK1 and CK2 transmitted from controller 2906. The structure will be explained later by referring to FIG. 30.

The output of accumulator 2907 is applied to terminal S1 of switch SW2914; terminal S0 of swtich SW2914 is fixed to level logic "0". Switch SW2914 connects terminal S0 or S1 to adder 2903 of basic module 2901 depending on whether formation data F3 from controller 2901 is logic "0" or logic "1", thereby supplying modulation signals $W_M0$-$W_M10$ of 11 bits. Terminal S0 of switch SW2914 is not limited to the logic "0" level and may be a value near "0" as long as it does not effect the modulation of the carrier signal.

On the other hand, accumulator 2908 accumulates waveform outputs e0-e10 of basic module 2901 after receiving the waveform output from terminal S0 of switch SW2913. This process is controlled by formation data F1 inputted to clear terminal CLR from controller 2906, and two phase clock CLK1 and CLK2 from controller 2906. The structure will be explained in detail by referring to FIG. 31. The output of accumulator 2908 is latched at a flip-flop (which is called F/F hereinafter) in accordance with latch clock ECLK from controller 2906, thereby providing a digital musical sound signal.

The digital musical sound signal formed as stated above is converted into an analog musical sound signal in D/A converter 2910 and low-pass filter (LPF) 2911, and produces a sound through sound system 2912.

A detailed circuit example of carrier signal generating circuit 2902 of basic module 2901 in FIG. 29 is shown in FIGS. 11 or 13 in a manner similar to the first embodiment, and their operations are performed in the same manner as explained in FIG. 12 or 14.

A detailed circuit example of a triangular decoder 2904 in FIG. 29 is shown in FIG. 15 in the same manner as in the first embodiment and the operation is performed in the same manner previously explained.

Figure 30:
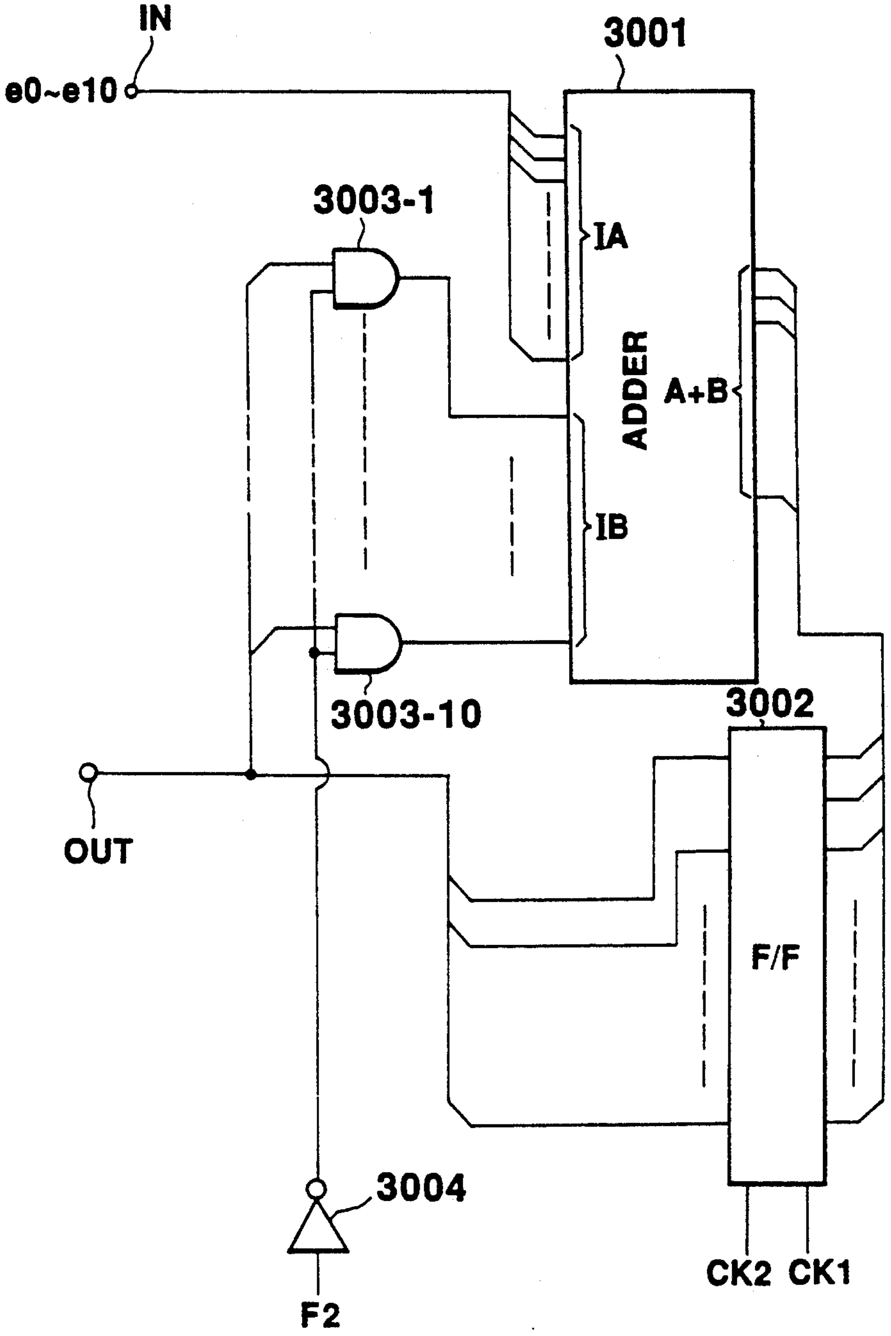
FIG. 30 is a view representing an example of a circuit of accumulator 12 in the detailed structure of the third embodiment.

FIG. 30 shows a circuit structure of accumulator 2907 of FIG. 29. Waveform outputs e0-e10 of 11 bits from basic module 2901 through terminal S1 of switch SW 2913 in FIG. 29 are inputted to addition input terminal IA of adder 3001 through input terminal IN, and are added to inputs of 11 bits supplied from AND circuits 3003-1-3003-10 connected to addend input terminal IB.

The outputs of 11 bits from the addition output terminal A+B of adder 3001 are set to F/F 3002 at a timing when clock CK1 is outputted from controller 2906 in FIG. 29.

The above data set to F/F 3002 is read at a timing when clock CK2 outputted from controller 2906 in FIG. 29 rises, is outputted to terminal S1 of switch SW2914 in FIG. 29 from output terminal OUT, and is selectively accumulated by being fed back to addend input terminal IB of adder 3001 through AND circuit 3003-1 to 3003-10.

Formation information data F2 from controller 2906 in FIG. 29 is inputted to AND circuit 3003-1 to 3003-10 after it is inverted by inverter 3004, thereby performing an opening and closing operation of the AND circuit.

Figure 31:
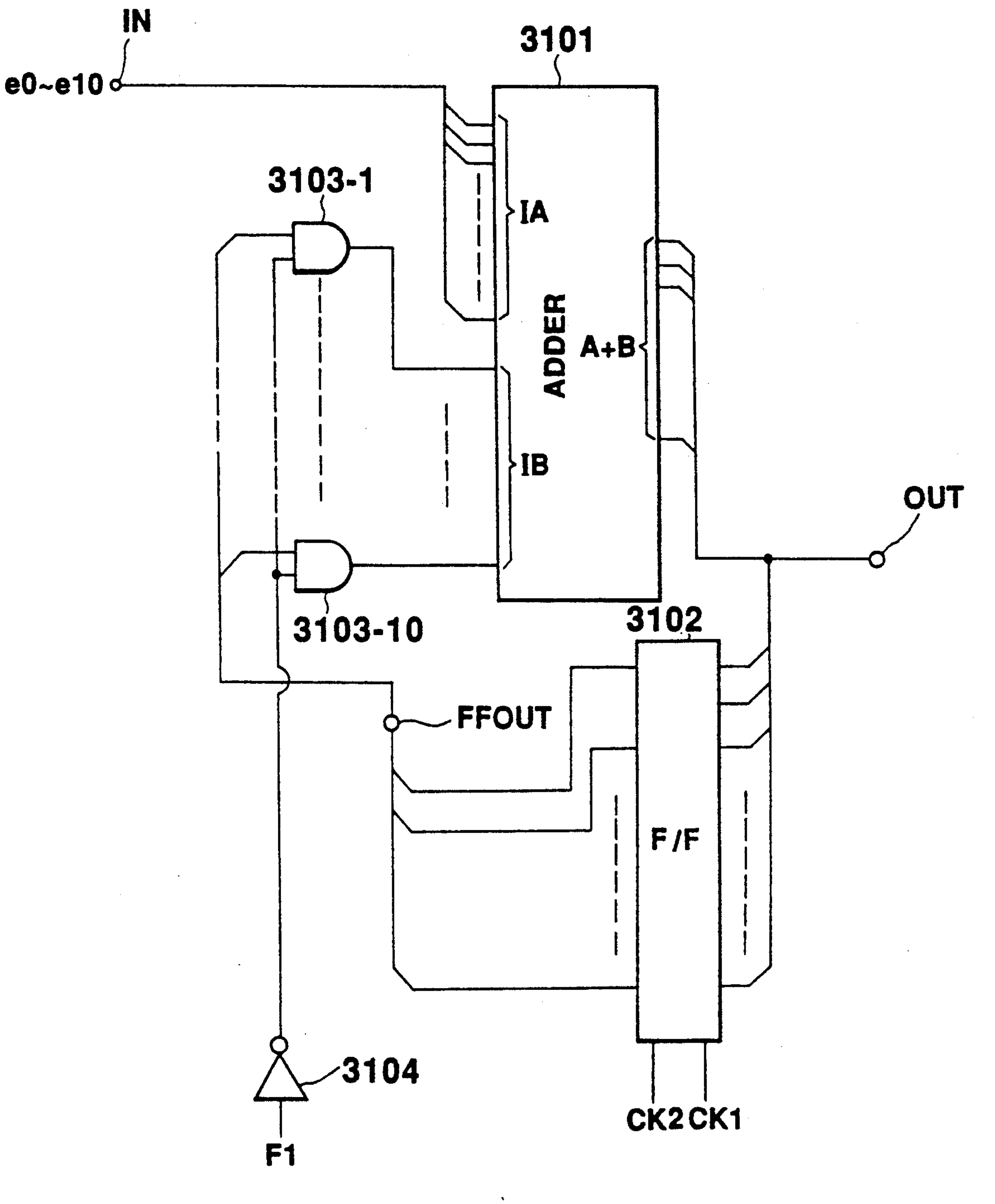
FIG. 31 is a view showing an example of a circuit of accumulator 13 in the detailed structure of the third embodiment.

The circuit structure of accumulator 2908 in FIG. 29 is shown in FIG. 31, and will now be explained.

Waveform outputs e0-e10 comprising 11 bits outputted from basic module 2901 is received by accumulator 2908 through terminal S0 of switch SW2913 in FIG. 29 and is inputted to addition input terminal IA of adder 3101 from input terminal IN. The structure of adder 3101, F/F 3102, and circuits 3103-1 to 3103-10 and inverter 3104 is the same as that of accumulator 2907 in FIG. 31.

The outputs from addition output terminals A+B of adder 3101 are connected to output terminal OUT and the output terminal FFOUT of F/F3102 is inputted directly to AND circuits 3103-1 to 3103-10. Formation data F1 from controller 2906 in FIG. 29 is inputted to AND circuits 3103-1 to 3101-10 after being inverted by inverter 3104, thereby performing an opening and closing operation of AND circuits 3103-1 to 3103-10.

An entire operation of the electronic musical instrument shown in FIG. 29 is explained. This explanation mainly concerns variations between the basic module 2901 and acumulators 2097 and 2908 and switches SW2913, SW2914 and F/F2909.

FIGS. 33A to 33G show an example of the formation of an electronic musical instrument according to the third embodiment. This formation can be selected by a player through a parameter setting unit, not shown By this means, a player can control the production of a musical sound comprising various harmonics structures.

M1 to M4 in FIGS. 33A to 33G show an arithemetic operation unit executed by basic module 2901 in FIG. 29. Respective process periods are obtained by dividing a sampling period into 4 process periods (called M1 process period-M4 process period) in a time divisional manner.

An operation of the electronic musical instrument shown in FIG. 29, which corresponds to respective formation examples from FIGS. 33A to 33G, will be sequentially explained by referring to respective operation timing charts shown in FIGS. 32A to 32G. In the following explanation, formation data F0-F3, clocks CK1, CK2 and latch clock ECLK are abbreviated as F0-F3, CK1, CK2 and ECLK.

Figure 32A:
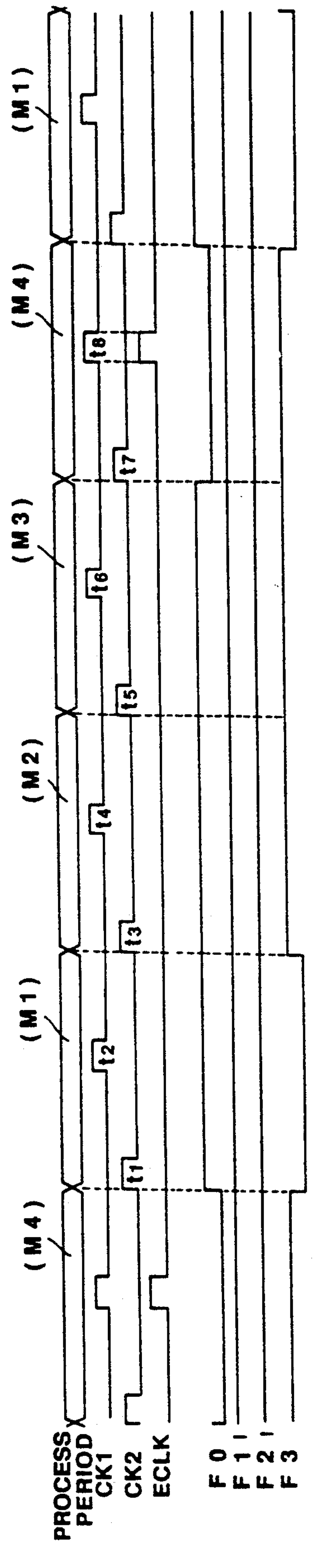
FIGS. 32A to 32G are operational timing charts of the detailed structure of the third embodiment.
Figure 33F:
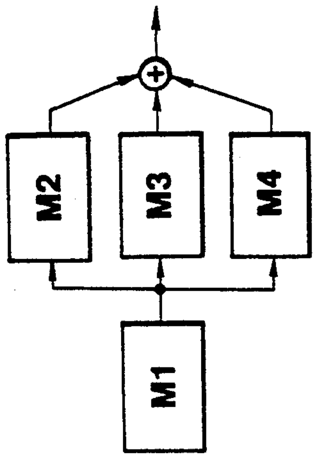
FIGS. 33A to 33G are views representing examples of formation in the detailed structure of the third embodiment.
Figure 33G:
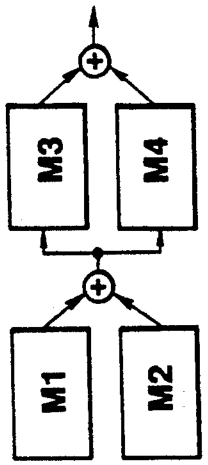
Figure 33D:
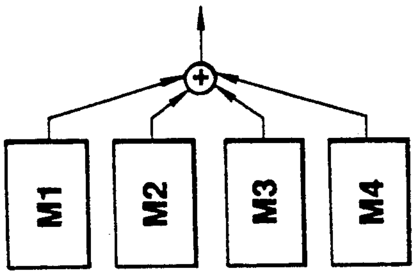
Figure 33E:
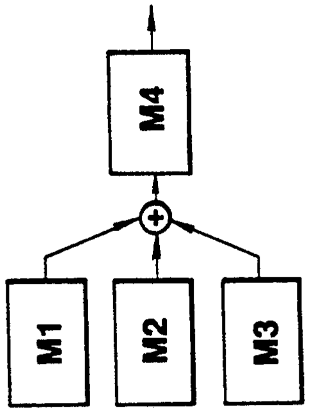
Figure 33A:
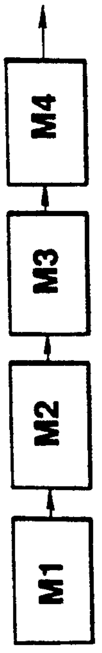

The operation of the formation example shown in FIG. 33A is explained by referring to the operational timing chart of FIG. 32A.

At a timing t1, (hereinafter called t1 and t2-t8 are used in a similar manner) in which CK2 is logic "1" during M1 process, F3 is logic "0" and the value 0 is supplied as modulation signals $W_M0$-$W_M10$. As a result, as in shown by equation (8) or relation C of FIG. 3 which are used for the explanation shown in FIG. 28, waveform outputs e0-e10 from basic module 2901 is a single frequency sine wave multiplied by amplitude coefficients AMP0-AMP9. This output is expressed as e(M1). At the same time, F0 becomes logic "1" at t1, as shown in FIG. 32A, the above e(M1) is inputted to accumulator 2907. In FIG. 30, F2 is logic "1" at t1 as shown in FIG. 32A, i.e., AND circuits 3001-1 to 3001-10 are turned off. Therefore, a O signal is input to terminal IB of adder 300C and e(M1) is outputted from addition output terminal A+B of adder 3001. e(M1) is set in F/F 3002 at t2 at which CK1 is logic "1".

Sequentially, in M2 process period e(M1) is outputted to output terminal OUT of accumulator 2907 in FIG. 30 at t3 at which CK2 becomes logic "1". As F3 becomes logic "1" as shown in FIG. 32A at t3 at which CK2 becomes logic "1", e(M1) is outputted to output terminal OUT of accumulator 2907 in FIG. 30. As F3 becomes logic "1" as shown in FIG. 32A at t3, e(M1) is inputted to basic module 2901 as modulation signals $W_M0$-$W_M10$ through switch SW 2914. As a result, in basic module 2091, waveform outputs e0-e10, modulated value e(M1), are outputted based on equation (25) which is for an explanation of FIG. 28. This output is made to be e(M2). At the same time, as in M1 process period, at t3, e(M2) is inputted to accumulator 2907 when F0 is logic "1", as shown in FIG. 32A. At t3, as shown in FIG. 32A, F2 is logic "1" and then a 0 signal is inputted to addend terminal IB of adder 3001 in FIG. 30. Therefore, e(M2) is outputted from addition output terminal A+B of adder 3001. At t4, at which CK1 is logic "1", it is set to F/F 3002.

The operation during the M3 process period is the same as that during the M2 process period. Namely, at t5 at which CK2 becomes logic "1", e(M2) is outputted to output terminal OUT of accumulator 2907 in FIG. 30 and simultaneously, when F3 is logic "1", a basic module 2901 of FIG. 29 produces a waveform output e0-e10 modulated based on e(M2). This is made to be e(M3). At t5, when F0 is logic "1", e(M3) is inputted to accumulator 2907 and simultaneously, when F2 is logic "1", all 0 is inputted to addend input terminal IB of adder 3001 in FIG. 30. Therefore, addition output terminal A+B of adder 3001 outputs e(M3) and at t6, at which CK1 becomes logic "1", it is set to F/F 3002.

The operation during M4 process period is similar to that during M2 or M3 processes. Namely, at t7 at which CK2 becomes logic "b 1", e(M3) is outputted at output terminal OUT of accumulator 2907 in FIG. 30. At the same time, when F3 is logic "1", basic module 2901 of FIG. 29 produces waveforms e0-e10 modulated based on e(M3). These waveforms are made to be e(M4). At t7, at which F0 becomes logic "0", e(M4) is inputted to accumulator 2908. In accumulator 2908 of FIG. 31, at t7, F1 is logic "1" as shown in FIG. 32A and thus AND circuits 3103-1 to 3103-10 are turned off and a 0 signal is inputted to addend input terminal IB, and addition output terminal A+B of adder 3101 outputs e(M4) at output terminal OUT. The e(M4) is latched at F/F 2909 in FIG. 29 at t8 at which ECLK is logic "1".

In accordance with the operation during the above M1-M4 process periods, basic module 2901 of FIG. 29 outputs one sample of musical waveform e(M4) modulated in three serial stages of M2-M4 process periods and by repeating the above operation, sound system 2912 produces a musical sound through D/A converter 2910 and LPF 2911.

In the example of formation of FIG. 33A a deep modulation is applied and a musical sound waveform with a very rich harmonics can be obtained.

Figure 32B:
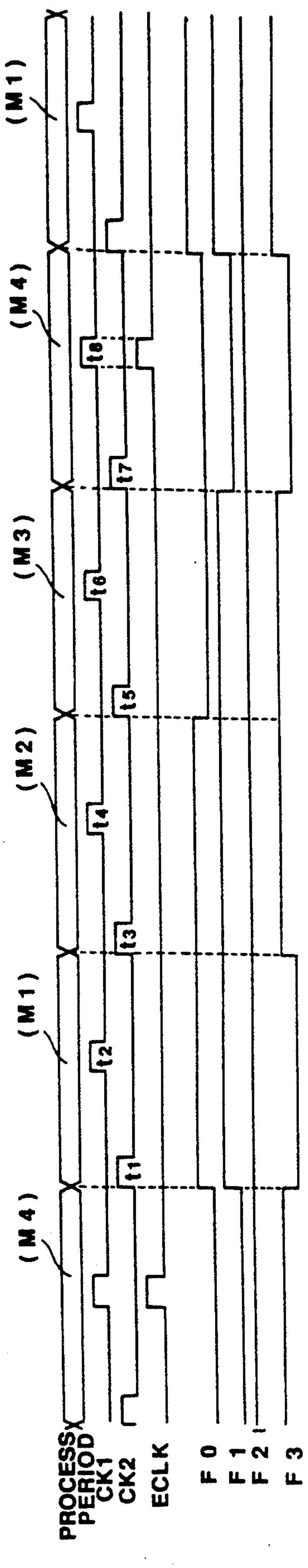
Figure 33B:
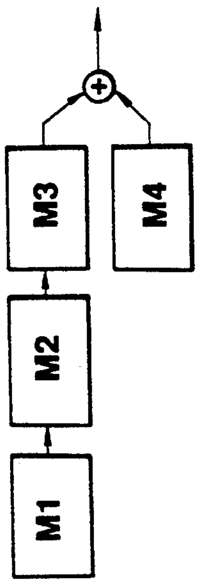

The operation in the formation example in FIG. 33B is explained based on the operational timing chart of FIG. 32B.

The operation during the M1 process period is the same as that during the M2 process period in the formation example of FIG. 33A. Namely, at t1, at which CK2 is logic "1", F3 becomes logic "0" and the basic module 2901 in FIG. 29 outputs waveform output e(M1) of a single sine wave which is not modulated. At t1, as shown in FIG. 32B, F0 becomes logic "1" and e(M1) is simultaneously inputted to accumulator 2907. Furthermore, at t1, as shown in FIG. 32B, F2 is logic "1" and a 0 signal is inputted to addend input terminal IB of adder 3001 of FIG. 30. Therefore, addition output terminal A+B of adder outputs e(M1) and at t2 at which CK1 becomes logic "1", it is set to F/F 3002.

The operation during the M2 process period is the same as that during the M1 process period in the formation example. Namely, at t3, at which CK2 becomes logic "1", e(M1) is outputted at output terminal OUT of accumulator 2907 of FIG. 30 and simultaneously when F3 becomes logic "1", basic module 3901 in FIG. 29 produces waveform output e(M2) modulated based on e(M1). At t3 when F0 is logic "1", e(M2) is inputted to accumulator 2907 and simultaneously, when F2 is logic "1", addend input terminal IB of adder 3001 in FIG. 30 receives all 0 signals. Thus, addition output terminal A+B of adder 3001 produces e(M2) and at t4 at which CK1 becomes logic "1", it is set to F/F 3002.

Sequentially, the operations during the M3 process period are the same as that during the M2 process period. Namely, at t5, at which CK2 becomes logic "1", e(M2) is outputted from output terminal OUT of accumulator 2907 of FIG. 30 and simultaneously, when F3 is logic "1", basic module 2901 of FIG. 29 produces waveform output e(M3) modulated based on e(M2). At t5, F0 becomes logic "0". Thus, as in the M4 process period in the formation example in FIG. 33A, e(M3) is inputted to accumulator 2908 and F1 simultaneously becomes logic "1", and addend input terminal IB of adder 3101 in FIG. 31 receives an all 0 signals and addition output terminal A+B of adder 3101 outputs e(M3). This e(M3) is set to F/F 3102 at t6 at which CK1 becomes logic "1".

The operations during the M4 process period are the same as those during the M1 process period. Namely, at t7, at which CK2 becomes logic "1", F0 becomes logic "0" and basic module 2901 of FIG. 29 produces waveform output e(M4) of a non-modulated single sine wave. As in the M3 process period, as shown in FIG. 33B, F0 simultaneously becomes logic "0" and e(M4) is inputted to accumulator 2908. In accumulator 2908 in FIG. 31, at t7, at which CK2 becomes logic "1", terminal FFOUT outputs e(M3) set in F/F 3102 and simultaneously, as shown in FIG. 32B, F2 becomes logic "0" and circuits 3103-1 to 3103-10 are turned on. Thus, the above e(M3) is inputted to addend input terminal IB, and output terminal OUT of addition output terminal A+B of adder 3101 outputs e(M3)+e(M4). Thus, e(M3)+e(M4) is latched in F/F 2909 in FIG. 29 at t8 at which ECLK becomes logic "1".

In accordance with the operation of the above M1–M4 process periods, basic module 2901 in FIG. 29 adds waveform output e(M3) modulated in a serial two stages of M2 and M3 process periods to sine wave e(M4) formed during M4 process period, thereby outputting one sample of an added musical sound waveform. By repeating the above operation, sound system 2912 produces the corresponding modulated musical sound through D/A converter 2910 and LPF 2911.

The above formation example in FIG. 33B provides a musical sound waveform obtained by mixing a deeply modulated component with a kind of sine wave component.

Figure 32C:
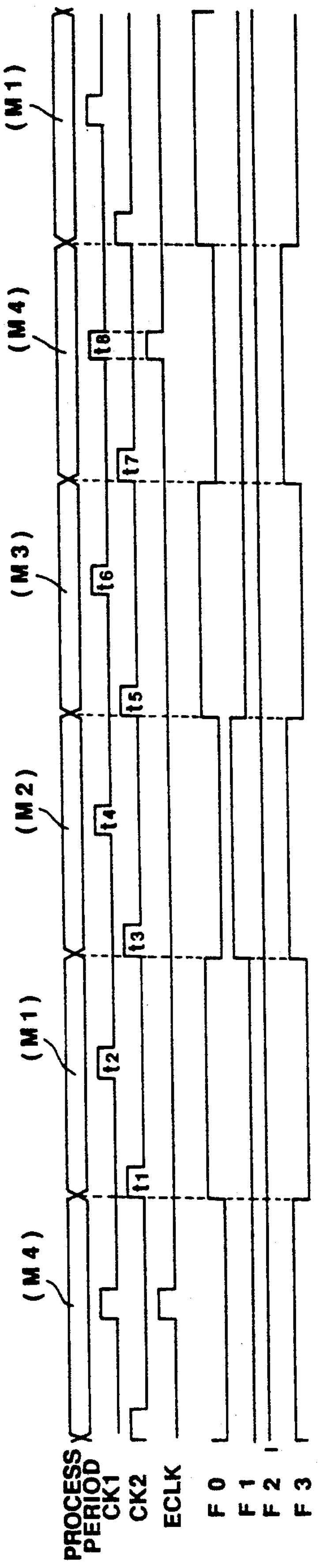
Figure 33C:
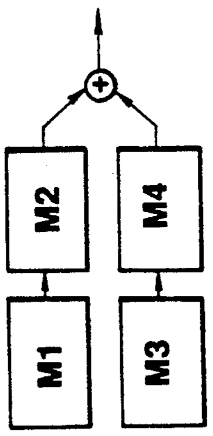

The formation example in FIG. 33C is explained sequentially by referring to the operational timing chart shown in FIG. 32C.

The operation during the M1 process period is the same as that during the M4 process period in the example of the formation shown in FIG. 33A or 33B. Namely, at t1, at which CK2 is logic "1", F3 becomes logic "0" and the basic module 2901 of FIG. 27 produces waveform output e(M1) comprising a nonmodulated single sine wave. Simultaneously, at t1, F0 becomes logic "1" as shown in FIG. 32C and e(M1) is inputted to accumulator 2907. Furthermore, as shown in FIG. 32C, F2 is logic "1" and addend input terminal IB of adder 3001 in FIG. 30 receives all 0 signals. Therefore, addition output terminal A+B of adder 3001 produces e(M1) and at t2, at which CK1 becomes logic "1", it is set to F/F 3002.

The operation during the M2 process period is the same as that during the M2 process period in the example of the formation in FIG. 33A. Namely, at t3, at which CK2 becomes logic "1", output terminal OUT of accumulator 2907 in FIG. 30 outputs e(M1) and F3 simultaneously becomes logic "1", thereby enabling basic module 2901 in FIG. 29 to output waveform output e(M2) and to be modulated based on e(M1) at t3. F0 becomes logic "0" and then, as in the M4 process period in the example of the formation in FIG. 33A, e(M2) is inputted to accumulator 2908. F1 simultaneously becomes logic "1" and addend input terminal IB of adder 3101 in FIG. 31 receives all 0 signals, thereby enabling addition output terminal A+B of adder 3101 to produce e(M2). This e(M2) is set to F/F 3102 at t4, at which CK1 becomes logic "1".

The sequential operation during the M3 process period is the same as that during the M1 process period. Namely, at t5, at which CK2 becomes logic "1", F3 becomes logic "0". Thus, basic module 2901 in FIG. 29 produces a waveform output e(M3) comprising a non-modulated single sine wave. At the same time, at t5, F0 becomes logic "1", as shown in FIG. 32C, and e(M3) is inputted to accumulator 2907 and F2 is logic "1", as shown in FIG. 32C, and addend input terminal IB of adder 3001 of FIG. 30 receives all 0 signals. Therefore, addition output terminal A+B of adder 3001 produces e(M3) and at t6, at which CK1 becomes logic "1", it is set to F/F 3002.

During the M4 process period at t7 at which CK2 becomes logic "1", e(M3) is outputted at output terminal OUT of accumulator 2902 in FIG. 30 and simultaneously, when F3 is logic "1", basic module 2901 in FIG. 29 produces waveform output e(M4) modulated based on e(M3). At t7, F0 becomes logic "0". Thus, as in the M4 process period in the example of formation in FIG. 33A, e(M4) is inputted to accumulator 2908. Accumulator 2908 in FIG. 31 produces e(M2) set at F/F3102 and is outputted at terminal FFOUT at t7 at which CK2 becomes logic 1. At the same time, as shown in FIG. 32C, F2 is logic "0". Thus, AND circuits 3103-1 to 3103-10 are turned on, e(M2) is received by addend input terminal IB, and output terminal OUT from addition output terminal A+B of adder 3101 outputs e(M2)+e(M4). Therefore, e(M2)+e(M4) is latched at F/F 2902 of FIG. 29 at t8 at which ECLK becomes logic "1".

During the M1–M4 process periods, one output sample of a musical sound waveform is obtained by adding waveform output e(M2). This sample is modulated by basic module 2901 in FIG. 29 during the M2 process period and waveform output e(M4) is modulated during the M4 process period. When the above operation is repeated, sound system 2912 produces the corresponding modulated musical sound through D/A converter 2910 and LPF 2911.

In the example of formation of FIG. 33C, a musical sound waveform is obtained by mixing two kinds of modulated components.

Figure 32D:
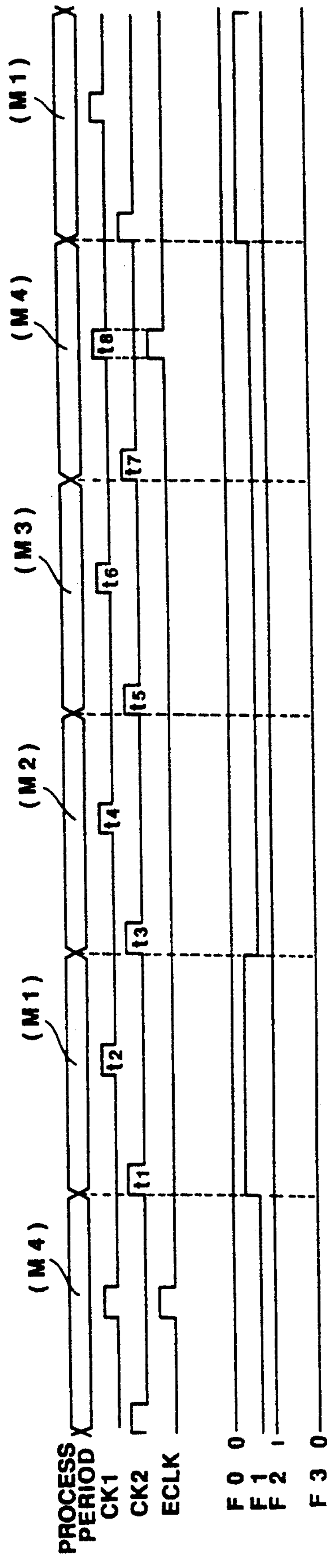

Next, the operation of the example formation of FIG. 33D is explained based on the timing chart of FIG. 32D.

In accordance with the operation of the M1 process period t1, at which CK2 becomes logic "1", F3 becomes logic "0" and the basic module 2901 in FIG. 29 outputs waveform output e(M1) of a single non-modulated sine wave. At t1, F0 is logic "0" as shown in FIG. 32D. Thus, e(M1) is inputted to accumulator 2908 and F1 simultaneously becomes logic "1". Furthermore, addend input terminal IB of adder 3101 in FIG. 31 receives all 0 signals and addition output terminal A+B of adder 3101 output e(M1). Then, at t1, at which CK1 becomes logic 1, it is set to F/F3102.

During the next M2 process period, at t3, at which CK2 becomes logic "1" and F3 becomes logic "0", the basic module 2901 in FIG. 29 outputs e(M2) of the non-modulated single sine wave. At the same time, as shown in FIG. 32B, F0 is logic "0" and e(M2) is inputted to accumulator 2908. In the accumulator 2908 in FIG. 31, at t3, at which CK2 becomes logic "1", e(M1)

set at F/F 3102 is outputted at terminal FFOUT. Furthermore, F1 simultaneously becomes logic "0", as shown in FIG. 32D, circuits 3103-1-3101-10 are turned on, addend input terminal IB receives the above e(M1) and addition output terminal A+B of adder 3101 outputs e(M1)+e(M2) from the output terminal. At t4, at which CK1 becomes logic "1", it is set to F/F 3102.

The operation of the following M3 process period is the same as that of the M2 process period. Namely, at t5, at which CK2 becomes "1", F3 becomes "0" and basic module 2901 in FIG. 29 outputs waveform output e(M3) of a non-modulated single sine wave. As shown in FIG. 32D, F0 simultaneously becomes logic "0" and e(M3) is inputted to accumulator 2908. Accumulator 2908 in FIG. 31 outputs from terminal FFOUT. The signal e(M1)+e(M2), set to F/F3102, is outputted to terminal FFOUT at time t5, at which CK2 becomes logic "1". Simultaneously, as shown in FIG. 32D, F1 is logic "0" and AND circuits 3103-1 to 3103-10 are turned on, thereby enabling e(M1)+e(M2) to be inputted to addend input terminal IB and output terminal OUT from addition output terminal A+B of adder 3101 outputs e(M1)+e(M2)+e(M3). At t6 when CK1 becomes logic "1", it is set to F/F3102.

The operation during the M4 process period is the same as that during the M4 process period in the formation example of FIG. 33B. Namely, at t4, at which CK2 becomes logic "1", F0 becomes logic "0" and basic module 2901 of FIG. 29 produces waveform output e(M4) comprising a non-modulated single sine wave. At t7, F0 is logic "0" and e(M4) is inputted to accumulator 2908. In accumulator 2908 in FIG. 31, at t7, at which CK2 becomes logic "1", e(M1)+e(M2)+e(M3) is set to F/F3102 and outputted to terminal FFOUT. At the same time, as shown in FIG. 32D, F1 is logic "0" and AND circuits 3103-1-3103-10 are turned on. Thus, addend input terminal IB receives e(M1)+e(M2)+e(M3) and addition output terminal A+B of adder 3101 outputs e(M1)+e(M2)+e(M3)+e(M4) at the output terminal OUT. This output is latched at F/F2902 of FIG. 29 at t8 at which ECLK becomes logic "1".

In accordance with the operation of the M1-M4 process periods, four kinds of sine wave formed by basic module 2901 in FIG. 29 are added to output one sample of a musical waveform. By repeating this operation, sound system 2912 produces a corresponding musical sound through D/A converter 2910 and LPF 2911.

In the example of the formation of FIG. 33D, a musical sound waveform by a sine wave composition method is provided in which four kinds of sine wave component are mixed.

Figure 32E:
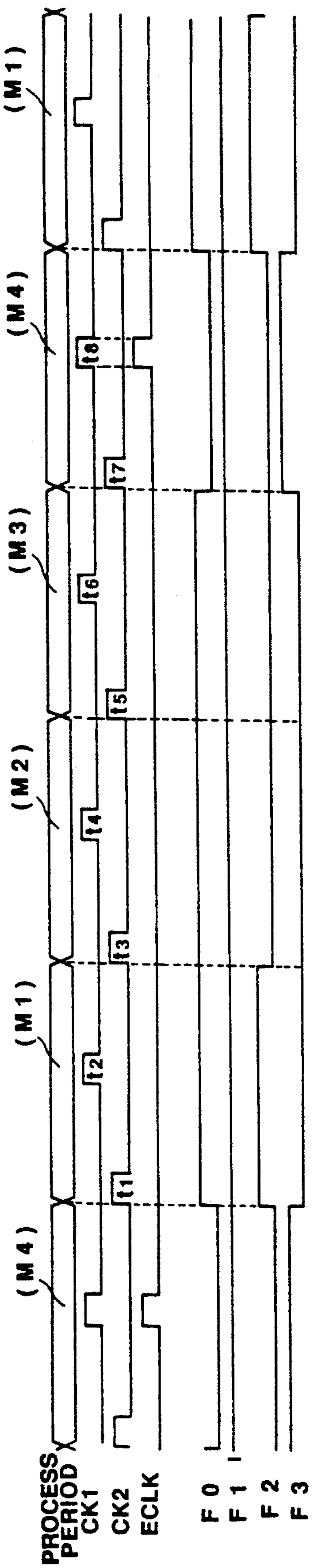

The operation of the formation example of FIG. 33E is explained based on the operational timing chart of FIG. 32E.

During M1 process period, at t1, at which CK2 becomes logic "1", F3 becomes logic "0" and basic module 2901 in FIG. 29 outputs a waveform output e(M1) comprising a non-modulated single sine wave. At t1, as shown in FIG. 32E, F0 simultaneously becomes logic "1", e(M1) is inputted to accumulator 2907 and at t2, as shown in FIG. 32E, F2 becomes logic "1" and addend input terminal IB of adder 3001 of FIG. 30 receives all 0 signals. Therefore, addition output terminal A+B of adder 3001 outputs e(M1) and at t2, at which CK1 becomes logic "1", it is set to F/F3002.

The operation during the next M2 process period is the same as that during the M1 process period. Namely, at t3, at which CK2 becomes logic "1", F3 becomes logic "0" and basic module 2901 of FIG. 29 produces output waveform e(M2) of a non-modulated single sine wave. At t3, as shown in FIG. 32E, F0 simultaneously becomes logic "1". Thus, e(M1) is inputted to accumulator 2907 in FIG. 30, and accumulator 2907 outputs e(M1), which is set in F/F3002 at t3 at which CK2 becomes logic "1", to output terminal OUT. As shown in FIG. 32E, F2 simultaneously becomes logic "0", AND circuits 3003-1 to 3003-10 are turned on, the addend input terminal IB receives the above e(M1), addition output terminal A+B of adder 3001 outputs e(M1)+e(M2) and at t4, at which CK1 becomes logic "1", it is set to F/F3002.

The operational sequence of the M3 process period is the same as that of the M2 process period. Namely, at t5, at which CK2 becomes logic "1", F3 becomes logic "0" and basic module 2901 in FIG. 29 outputs waveform output e(M3) comprising non-modulated single sine wave. Simultaneously, at t5, as shown in FIG. 32E, F0 is logic "0" and e(M1) is inputted to accumulator 2907. Accumulator 2907 in FIG. 30 outputs from output terminal, e(M1).e(M2) set in F/F3002 at t5 at which CK2 becomes logic "1". Simultaneously, as shown in FIG. 32E, F2 is logic "0", AND circuits 3003-1-3003-10 are turned on, addend input terminal IB receives the above e(M1)+e(M2), addition output terminal A+B of adder 3001 outputs e(M1)+e(M2)+e(M3) and at t6, at which CK1 becomes logic 1, it is set to F/F3002.

The operation during the M4 process period is the same as that during M4 process period in the formation example of FIG. 33A. Namely, at t7, at which CK2 becomes logic "1", the output terminal OUT of accumulator 2907 in FIG. 30 outputs e(M1)+e(M2)+e(M3). When F3 becomes logic "1", basic module 2901 in FIG. 29 simultaneously outputs waveform output e(M4) modulated based on e(M1)+e(M2)+e(M3). Therefore, at t7, F0 becomes logic "0" and e(M4) is inputted to accumulator 2908. In accumulator 2908 in FIG. 31, at t7, as shown in FIG. 32E, F1 is logic "1". Thus, AND circuits 3103-1 to 3103-10 are turned off, addend input terminal IB receives all 0 signals and addition output terminal A+B of adder 3101 outputs e(M4) at output terminal OUT. At t8, at which ECLK becomes logic "1", e(M4) is latched by F/F2909 in FIG. 29.

In accordance with the above M1-M4 process, basic module 2901 outputs one sample of musical waveform e(M4) modulated by a waveform comprising a mixture of three kinds of sine waves obtained during the M1 to M3 process period. By repeating the above operation, sound system 2912 produces a corresponding modulated musical sound through D/A converter 2910 and LPF 2911.

Figure 32F:
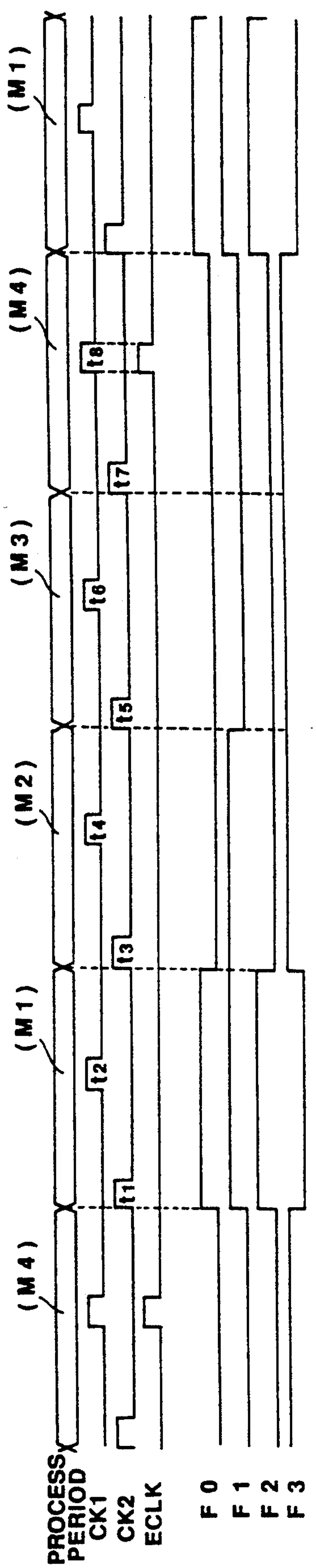

Further, the operation of the formation example of FIG. 33F is explained based on the operational timing chart of FIG. 32F.

The operation during the M1 process period is the same as that during the M1 process period of the formation example in FIG. 33A. Namely, at t1, at which CK2 becomes logic "1", F0 becomes logic "0" and basic module 2901 in FIG. 29 outputs waveform output e(M1). Simultaneously, at t1, shown in FIG. 32F, F0 becomes logic "0" and e(M1) is inputted to accumulator 2907 and at t1, as shown in FIG. 32F, F2 becomes logic "1" and addend input terminal IB of adder 3001 in FIG. 30 receives all 0 signals. The addition output terminal A+B of adder 3001 outputs e(M1) and at t2, at which CK1 becomes logic "1", it is set to F/F3002.

During the next M2 process period, at t3, at which CK2 becomes logic "1", output terminal OUT of accumulator 2907 in FIG. 30 outputs e(M1). Simultanesouly, when F3 becomes logic "1", basic module 2901 in FIG. 29 outputs waveform output e(M2) modulated based on e(M1). At t3, F0 becomes logic "0". Thus, e(M2) is inputted to accumulator 2908 and simultaneously, when F1 is logic "1", addend input terminal IB of adder 3101 in FIG. 31 receives all 0 signals and addition output terminal A+B of adder 3101 outputs e(M2). This is set to F/F3102 at t2, at which CK1 becomes logic "1". On the other hand, at t3, F0 is logic "0" and terminal S1 of switch SW 2913 in FIG. 29 is not connected. Supposing that a non-connection terminal of switch SW 2913 is grounded to logic "0", addition terminal IA of adder 3001 in FIG. 30 receives all 0 signals at accumulator 2907 of FIG. 29. At t3, F2 is logic "0" and then AND circuits 3003-1 to 3003-10 are turned on, and e(M1) outputted at output terminal OUT is inputted to addend terminal IB. Accordingly, the above e(M1) is outputted at addition output terminal A+B of adder 3001. This e(M1) is set to F/F3002 at t4 at which CK1 becomes logic "1".

During the M3 process period at t5, at which CK2 becomes logic "1", e(M1) is sequentially outputted at output terminal OUT of accumulator 2907 of FIG. 30. F3 simultaneously becomes logic "1" and basic module 2901 of FIG. 29 outputs waveform output e(M3) modulated based on e(M1). At t5, F0 is logic "0". Thus, e(M3) is inputted to accumulator 2908. In accumulator 2908, shown in FIG. 31 at t5, CK2 becomes logic "1", and e(M2) is set to F/F3102 and outputted to FFOUT. Simultaneously, as shown in FIG. 32F, F1 becomes logic "0", AND circuits 3103-1 to 3103-10 are turned on and e(M2) is inputted to addend input terminal IB, e(M2)+e(M3) is outputted from output terminal OUT from addition output terminal A+B of adder 3101. At t4, at which CK1 becomes logic "1", it is set to F/F3102. On the other hand, as is similar to the M2 process period, at t5, F0 becomes logic "0". Thus, terminal S1 of switch SW 2913 of FIG. 29 is not connected and in accumulator 2907, addition input terminal IA of adder 3001 in FIG. 30 receives all 0 signals. At t5, at which F2 becomes logic "0", AND circuits 3003-1 to 3003-10 are turned on and e(M1) outputted at output terminal OUT is inputted to addend input terminal IB. Therefore, the above e(M1) is outputted to addition output terminal A+B of adder 3001. e(M1) is set to F/F 3002 at t6, at which CK1 becomes "1".

The operation during the M4 process period is the same as that during the M3 period. Namely, at t7, at which CK2 becomes logic "1", e(M1) is outputted at output terminal OUT of accumulator 2907 of FIG. 30. Simultaneously, F3 becomes logic "1" and basic module 2901 in FIG. 29 outputs waveform output e(M4) modulated based on e(M1). In addition, F0 becomes logic "0" and e(M4) is inputted to accumulator 2908. Accumulator 2908 in FIG. 31 outputs e(M1)+e(M2), which is set in F/F3102 at t7 at which CK2 becomes logic "1", to output terminal FFOUT. Simultaneously, F1 becomes logic "0", as shown in FIG. 32F, AND circuits 3103-1 to 3103-10 are turned on, the above e(M1)+e(M2) is inputted to addend input terminal IB, and e(M2)+3(M3)+e(M4) is outputted to output terminal OUT from addition output terminal A+B of adder 3101. The output is latched to F/F2909 in FIG. 29 at t8, at which ECLK becomes logic "1".

In accordance with the operation of the above M1–M4 process period, three kinds of waveform output e(M2), e(M3) and e(M4), respectively modulated in e(M1), are mixed and outputted as one sample of a musical sound waveform. By repeating the above operation, sound system 2912 produces a corresponding musical sound through D/A converter 2910 and LPF 2911.

Figure 32G:
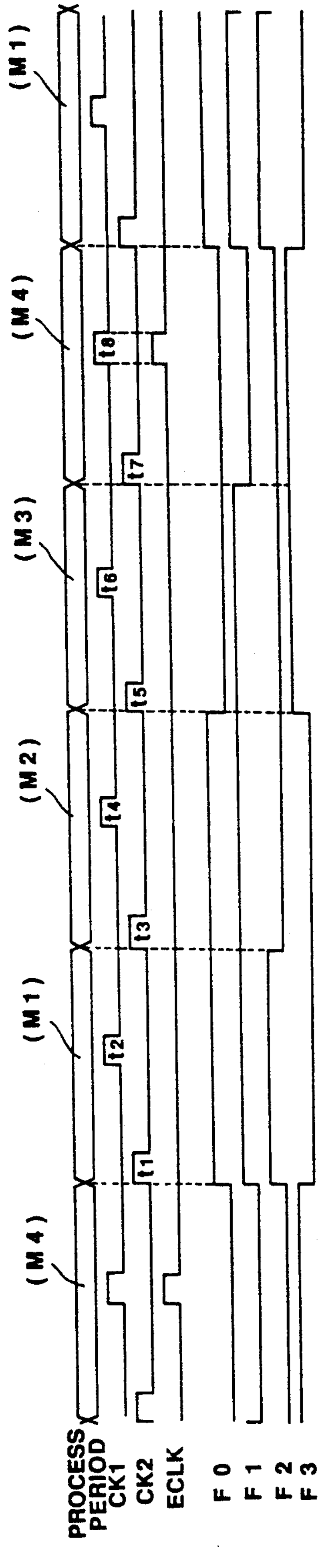

The operation of the formation example of FIG. 33G is explained by referring to the operational timing chart of FIG. 32G.

The operation of the M1 process period is similar to that of the M1 process period of FIG. 33E. Namely, at t1, at which CK2 becomes logic "1", F3 becomes logic "0", basic module 2901 of FIG. 29 outputs waveform output e(M1) as a single sine wave not subjected to a modulation. At the same time, at t1, at which F0 becomes logic "1" as shown in FIG. 32G, e(M1) is inputted to accumulator 2907, and at t1, F2 becomes logic "1", as shown in FIG. 32G, and addend input terminal IB of adder 3001 in FIG. 30 receives all 0 signals. Therefore, addition output terminal A+B of adder 3001 outputs e(M1) and at t2, at which CK2 is logic "1", it is set to F/F3002.

The operation of the M2 process period is the same as that of the M2 process period in FIG. 33E. Namely, at t3, at which CK2 becomes logic "1", F3 is logic "0". Thus, the basic module 2901 of FIG. 22 outputs waveform output e(M2), a non-modulated single sine wave. At the same time, at t3, as shown in FIG. 32G, F0 is logic "1" and e(M1) is inputted to accumulator 2907. In addition, in accumulator 2907, shown in FIG. 30, at t3, at which CK2 becomes logic "1", e(M1) is set to F/F3002 and outputted from output terminal OUT. Simultaneously, as shown in FIG. 32G, F2 becomes logic "0", AND circuits 3003-1 to 3003-10 are turned on, e(M1) is inputted to addend input terminal IB, addition output terminal A+B of adder 3001 outputs e(M1-)+e(M2) and at t4, at which CK1 becomes logic "1", it is set F/F3002.

Sequentially the operation of the M3 process period is the same as that of the M2 process period of FIG. 33F. Namely, at t5, at which CK2 becomes logic "1", e(M1-)+e(M2) is outputted from output terminal OUT of accumulator 2907 of FIG. 30. Simultaneously, F3 becomes logic "1" and basic module 2901 in FIG. 29 outputs waveform e(M3) modulated based on e(M1-)+e(M2). At t5, F0 becomes logic "0" and e(M3) is inputted to accumulator 2908. Simultaneously, F1 becomes logic "1" and addend input terminal IB of adder 3101 of FIG. 31 receives all 0 signals and addition output terminal A+B of adder 3101 outputs e(M3). e(M3) is set to F/F3102 at t6, at which CK1 becomes logic "1". On the other hand, at t5, F0 is logic "0" and terminal S1 of switch SW2913 in FIG. 29 is not connected, as a result, addition terminal IA of adder 3001 in FIG. 30 receives all 0 signals. And, at t5, F0 becomes logic "0". Thus, AND circuits 3003-1 to 3003-10 are turned on, and e(M1)+e(M2) outputted at output terminal OUT is inputted to addend input terminal IB. Therefore, addition output terminal A+B of adder 3001 outputs e(M1-)+e(M2). The output is set to F/F3002 at t6 at which CK1 is logic "1".

The operation of the M4 process period is the same as that of the M4 process period shown in FIG. 33F. Namely, at t7, at which CK2 becomes logic "1", accumulator 2907 of FIG. 30 outputs e(M1)+e(M2) at output terminal OUT. Simultaneously, F3 becomes logic "1" and the waveform e(M4), modulated based on e(M1)+e(M2), is outputted from the basic module 2901 shown in FIG. 29. At t7, F0 becomes logic "0" and e(M4) is inputted to accumulator 2908. Accumulator 2908 in FIG. 31 outputs e(M3), set by F/F3102 at t7, at which CK2 becomes logic "1", to terminal FFOUT. Simultaneously, as shown in FIG. 32G, F1 becomes logic "0", AND circuits 3103-1 to 3103-10 are turned on, the above e(M3) is inputted to addend input terminal IB and addition output terminal A+B of adder 3101 outputs e(M3)+e(M4) to output terminal OUT. The output is latched F/F2909 in FIG. 29 at t8, at which ECLK becomes logic "1".

In accordance with the above operation of the M1–M4 process period, two kinds of waveform ouputs e(M3) and e(M4), modulated by e(M1)+e(M2) respectively are mixed to output one sample of a musical sound waveform. By repeating the above operation, sound system 2912 produces the corresponding musical sound through D/A converter 2910 and LPF 2911.

In the formation examples shown in FIGS. 33A to 33G, as explained above, for example, that shown in FIG. 33C, the waveform output e(M2) modulated in one stage by a sine wave obtained in an M1 process period and in an M2 process period, is obtained and the same waveform e(M4) is outputted in both the M3 process period and the M4 process period. The waveform output obtained as the above e(M2) or e(M4) is that obtained by modulating a triangular wave containing many harmonics originally contained in triangular wave decoder 2914 of the basic module 2901 in FIG. 29, resulting in respective waveform outputs which are rich in harmonic components. Therefore, according to the present invention, compared with the case where a method of modulating a sine wave explained in "The Background of the Invention" section is applied to the basic module, a musical sound waveform is richer in harmonic components even if the modulation is conducted in only a single stage.

In the M1 process period or the M3 process period shown in FIG. 33C, the value of amplitude coefficients AMP0–AMP9 given to the basic module 2901 of FIG. 29 is reduced from 1 to 0 as time passes, after starting the sound production. The characteristics of waveform outputs e(M2) or e(M4) obtained in the M2 process period or in the M4 process period can be gradually changed from a state in which harmonic components are included to a state in which a single sine wave is included. This operation cannot be realized by the method explained in the section on "Background of the Invention", in which a method of simply modulating a triangular wave is applied to the basic module.

In the above embodiment, a musical sound waveform such as a hammond sound can be obtained by mixing in parallel four kinds of waveform outputs e(M1)–e(M4) of respective single sine wave components as in the formation example shown in FIG. 33D. However, above mentioned prior art cannot realize such a musical sound waveform.

As stated above, the present invention can obtain a sufficient number of harmonic components even in a simple formation. For example, the present invention can easily obtain a sine wave composition sound such as a hammond sound obtained by mixing a waveform output comprising only a single sine wave component or a waveform output comprising a single sine wave component having a different frequency in parallel with each other.

Further, time variation characteristics of the amplitude coefficients AMP0–AMP9 in respective process periods may be varied. This makes it possible to provide a musical sound waveform which includes a rich harmonics component immediately after a start of a sound production and varies such that the harmonics component diminishes with time, finally leaving only a single sine wave. This is achieved through a simple connection and combination. Thus, in the present embodiment, it becomes possible to selectively produce a musical sound waveform from a production of a musical sound waveform including a rich harmonics component which cannot be easily realized by the prior art to a generation of a musical sound waveform comprising a single sine wave.

4. An explanation of the fourth embodiment

Next, the fourth embodiment of the present invention will be explained.

Figure 34:
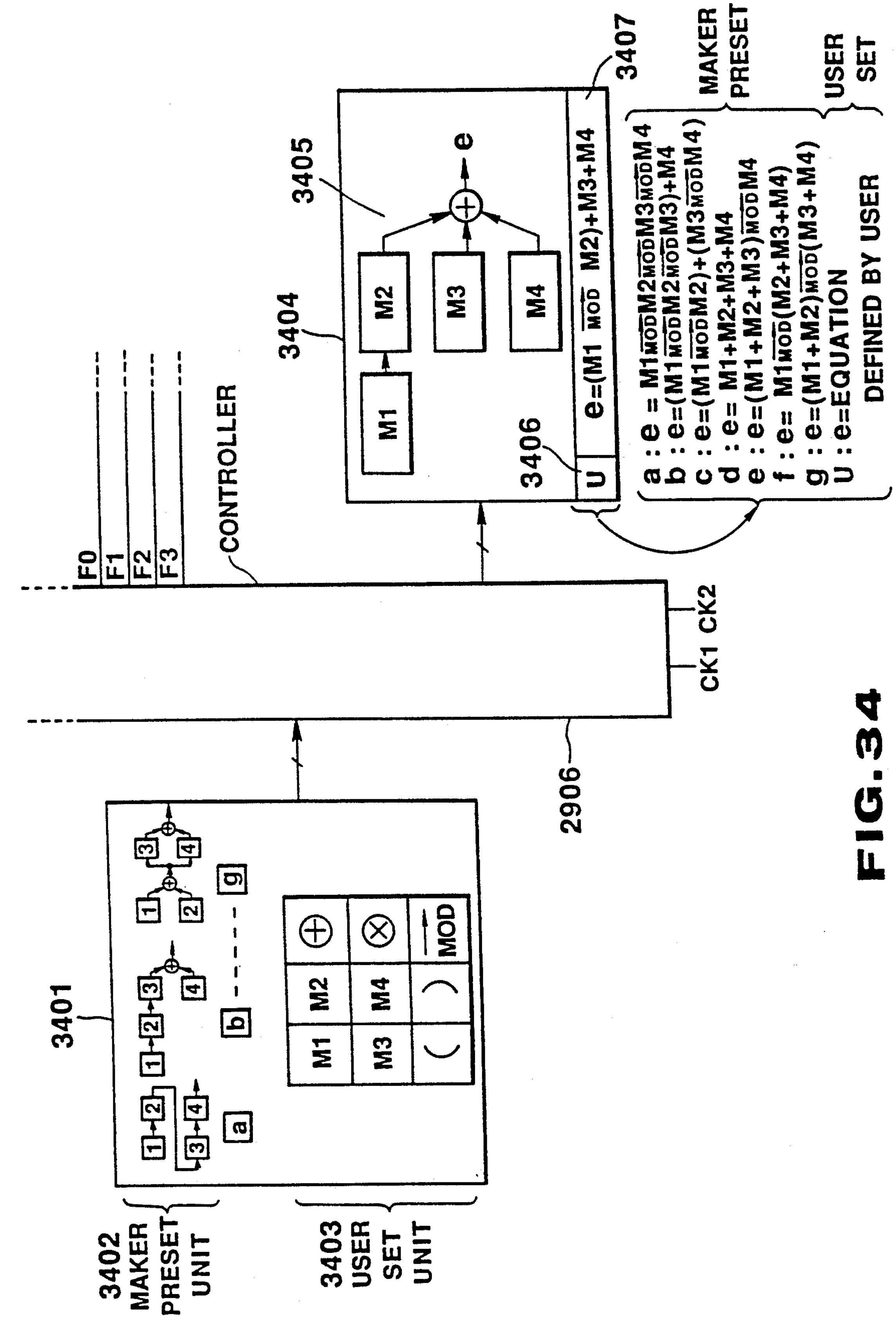
FIG. 34 is a view showing the detailed structure of the fourth embodiment.

In addition to the structure of the third embodiment, the fourth embodiment includes formation setting unit 3401 for enabling a user to set formation and formation displaying unit 3404 for performing a display of a set formation. FIG. 34 shows a structure of the fourth embodiment. Except for controller 2906 it is the same as that in FIG. 29.

In FIG. 34, formation setting unit 3401 and formation display unit 3404 are connected to a controller 2906. Formation setting unit 3401 comprises maker preset unit 3402 and user set unit 3403.

Maker preset unit 3402 is a portion for allowing a user to designate a formation preset by a maker. A maker presets a formation as shown in FIGS. 33A to 33G and, by depressing any one of the keys "a"–"g", a user can discretionally select one of the formations designated by FIGS. 33A to 33G. In accordance with this selection, controller 2906 outputs formation information data F0 to F3 shown by an operational timing chart of FIGS. 32A to 32G and executes a process corresponding to respective formations.

User set unit 3403 is a unit for allowing a user to discretionally set a formation other than that predetermined by the maker. A user can set a discretional formation by using a setting key shown in user set unit 3403. Respective key operations will be explained later. Controller 2906 produces formation information data F0 to F3 in accordance with a content set by user set unit 3403 and a predetermined logic and executes the corresponding process.

Next, formation display unit 3404 displays the content of a formation set by formation setting unit 3401. Formation display unit 3404 comprises image display unit 3405, symbol display unit 3406 and arithmetic operation equation display unit 3407.

Image display unit 3405 comprises, for example, a liquid display panel and the display unit displays a connection relation of the same formation as FIG. 33A to 33G.

Symbol display unit 3406 displays symbols of respective formations. In case of the formation preset by a maker, a symbol of "a" to "g" corresponding to the respective formations shown in FIGS. 33A to 33G are displayed. In contrast, in case of the formation set by the user, symbol "U", for example, is displayed.

Arithmetic operation equation display unit 3407 displays what kind of the operation is executed in the predermined formation. M1–M4 are respective process periods recited above in the third embodiment. Operand "MOD" designates that the output obtained during the M1 process period is converted to a modulation input for the M2 process period, in case of "M1 MOD M2". Operand "+" designates that the output obtained during the M1 process period is mixed with the output obtained during the M2 process period, in case of "M1+M2". Accordingly, "e=(M1 MOD M2)+M3+M4" designates that the output of the M2 process period obtained by an operation of "M1 MOD M2", output of M3 process period and the output of the M4 process period are mixed, to provide waveform output e.

In accordance with the above relation, a setting key corresponding to respective "MOD" and "+" is provided at user set unit 3403 within formation setting unit 3401. The "×" key of user set unit 3403 of FIG. 34 is used when the output during the M1 process period is multiplied by the output during the M2 process period, which is not shown in the third embodiment, and in this case "M1×M2" is displayed.

As described above, formation setting unit 3401 and formation displaying unit 3404 as designated in FIG. 34 are provided, enabling the user to set an effective formation.

5. An explanation of the fifth embodiment

The principle structure and detailed structure of the present invention are as shown in FIGS. 28, 29 to 31 with regard to the third embodiment. However, the operation of the controller 2906 (in FIG. 29) in the present embodiment is different from that in the third embodiment.

In the third embodiment, a user discretionally selects one of the formations shown in FIGS. 33A to 33G and controller 2906 in FIG. 29 produces formation information data F0 to F3, two phase clocks CK1 and CK2 and latch clock ECLK, as shown in FIGS. 32A to 32G. Therefore, as described above, a musical sound can be generated by using an algorithm corresponding to the selected formation. In this case, respective formations can be determined by a switching operation by a performer.

In contrast, in the present embodiment, every time a performer depresses a key on a keyboard unit (not shown) and thus produces a musical sound, a formation can be automatically switched at a predetermined timing after the start of production of a musical sound.

Figure 35:
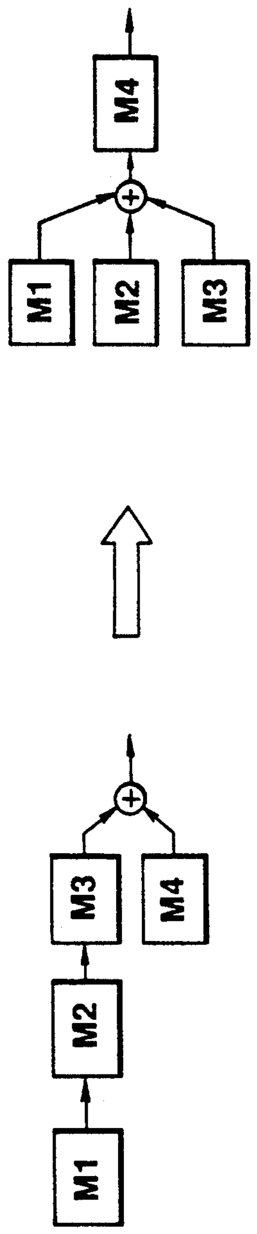
FIG. 35 is a view showing an example of a variation of formation in the fifth embodiment.

That is, a performer can perform a setting through a parameter setting unit so that a formation upon a sound generation operation may be set, for example, to be changed from the formation shown in FIG. 33B to the formation shown in FIG. 33E, as shown in FIG. 35. A player can also preset a time up to a change of formation after a generation of a respective sound, as shown in FIG. 35.

Figure 36:
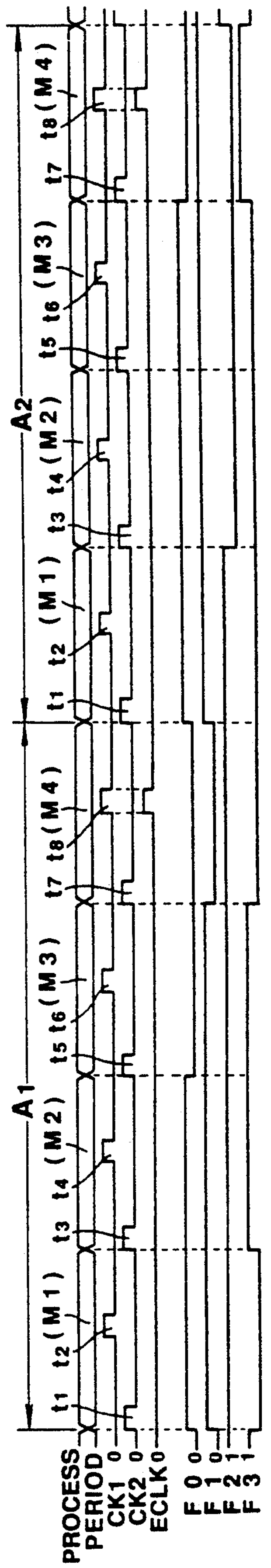
FIG. 36 is an operational timing chart of the fifth embodiment.

Therefore, controller 2906 shown in FIG. 29 generates formation information data F0 to F3, two phase clocks CK1 and Ck2 and latch clock ECLK at a timing shown by A1 in FIG. 36, starting with a generation of respective sounds until a predetermined time passes. The timing of the operation is as previously described and shown in FIG. 32B. Therefore, a sound generation operation can be conducted in accordance with an algorithm corresponding to the formation of FIG. 33B. When a predetermined time passes, controller 2906 produces formation information data F0 to F3, two phase clock CK1 and CK2 and latch clock ECLK at a timing shown by A2 in FIG. 36. This operation timing is as shown in FIG. 32E. Therefore, a sound generation operation can be conducted in accordance with an algorithm corresponding to the formation of FIG. 33E.

In this case, controller 2906 judges the point in time at which generation of respective musical sound started as the point at which a player operates the performance operation unit such as a keyboard, not shown.

Controller 2906 has a timer, not shown, which is activated at the start of a musical sound generation. This determines whether the predetermined time has passed.

As described above, by changing the formation after the start of sound generation, it becomes possible to generate a musical sound with a greater variety of harmonics structures than where a formation is fixed after a start of sound generation. The combination of formations which vary after the start of the sound generation is not limited to two: more than three combinations may be used. In this case, more than two times at which the formation varies are determined.

6. An explanation of the sixth embodiment

Next, the sixth embodiment of the present embodiment will be explained. The principle structure and detailed structure of the present invention are the same as in FIGS. 28 to 31 with regard to the third embodiment. The third embodiment explains the case where only one musical tone can be produced. In this embodiment it is possible to produce a musical sound by using 8 sound polyphonics. Therefore, the operation of the controller 2906 in FIG. 29 is somehow different from that in the third embodiment.

Figure 37A:
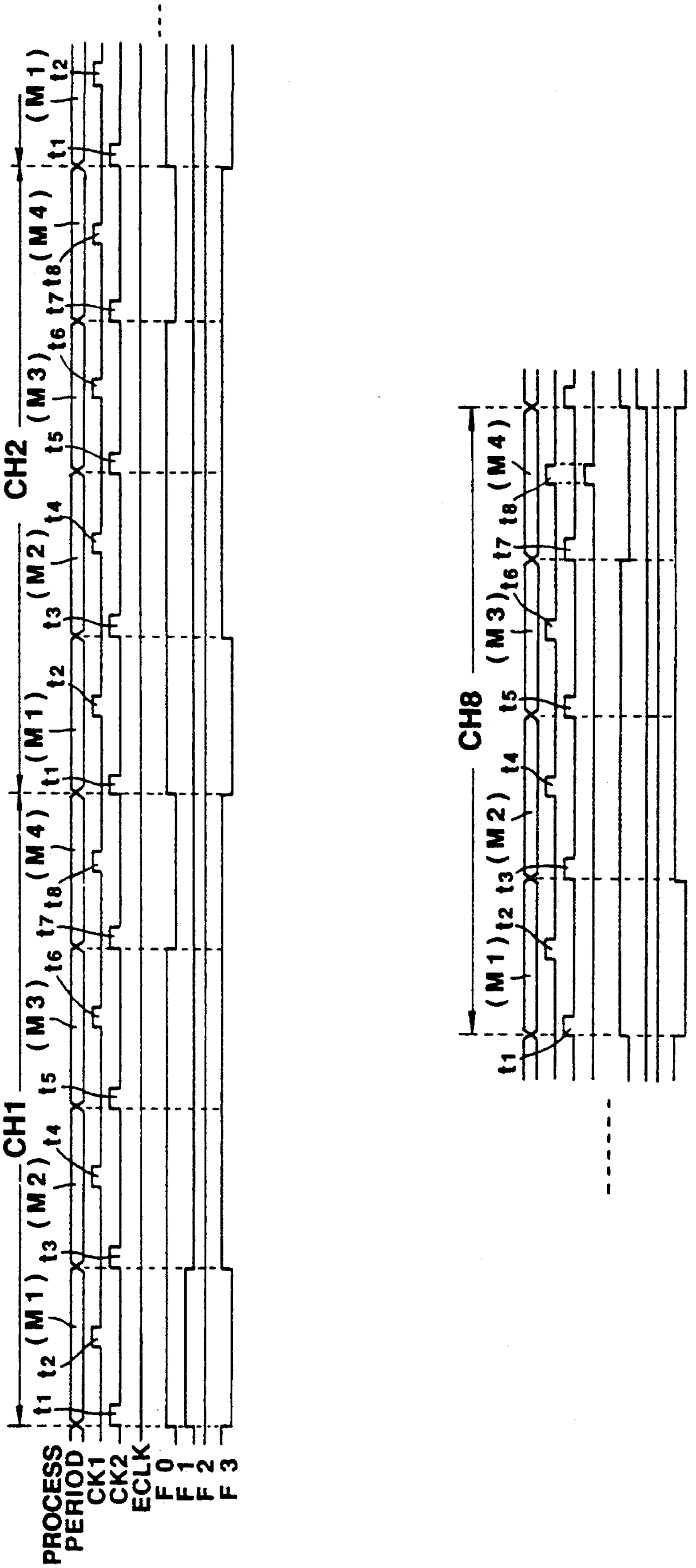
FIGS. 37A and 37B are operational timing charts of the sixth embodiment.

The first mode of the present embodiment will be explained. As shown in FIG. 37A respective sampling periods are time divisionally divided into 8 channel times CH1-CH8 corresponding to the timing of the sound generation of respective 8 polyphonic musical sounds. Further, respective channel times divided into M1 process periods to M4 process periods in the same manner as in the third embodiment.

Respective samples of 8 polyphonic musical sounds in respective channel times are generated. They are accumulated by accumulator 2908 shown in FIG. 27 at the end of respective sampling periods. Accordingly, at every sampling period, a musical sound obtained by adding 8 sounds is generated from F/F2909 and D/A 2910 in FIG. 29 and sound system 2912 produces 8 sounds simultaneously from a linguistic viewpoint.

The process for realizing the above operation will be explained in detail by referring to FIG. 37A.

FIG. 37A shows an operational timing chart in case where a musical sound based on the formation shown in FIG. 33A is produced by 8 sound polyphonics in the structure shown in FIGS. 29 to 31. In FIG. 37A, respective operation timings in respective channel times CH1-CH8 are almost the same as the operation timings shown in FIG. 32 as described above. FIG. 37A is different from FIG. 32A in that the logic is "1" only when formation information data F1 is provided in the M1 process period of channel timing CH1 and the logic is "0" in all other cases. FIG. 32A is also different in that clock ECLK becomes logic "1" only during the M4 process period of channel timing Ch8.

To begin with, during the M1 process period of channel time CH1, which is the head of respective sampling period, F1 becomes logic "1", thereby clearing accumulator 2908. As illustrated in FIG. 32A, the process operation is carried out during the M1-M4 process period of channel time CH1 and the first musical sound data is generated based on the formation of FIG. 33A. The musical sound data is set to F/F3102 through adder 3101 of accumulator 2908 in FIG. 31 when clock CK1 becomes logic "1", which occurs during the M4 process period of CH1. As is different from FIG. 32A, latch clock ECLK is logic "0". Thus, the latch operation is not conducted at F/F2909 (FIG. 29).

Next, the process operation is carried out during the M1-M4 process period of channel time CH2 in FIG. 32A and the second musical sound data is generated based on the formation of FIG. 33A. Musical sound data are inputted to addition input terminal IA of adder 3101 of accumulator 2908 in FIG. 31 when the clock CLK1 becomes logic "1", which occurs during the M4 period of CH2. In accumulator 2908 in FIG. 31, when, during the M4 process period of CH2, CK2 becomes logic "1", the first musical sound data set to F/F3102 is outputted from terminal FFOUT. At the same time, F1 is logic "0" as shown in FIG. 37A, and AND circuits 3103-1-3103-10 are turned on. Thus, the first musical sound is inputted to addend input terminal IB of adder 3101 and addition output terminal A+B of adder 3101 generates data in which first musical sound data is added to the second one. When CK1 becomes logic "1", above data is set to F/F3102.

The same process is carried out from channel times CH3 to CH8 illustrated in FIG. 37A and the musical sound data of 8 sounds is added.

Latch clock ECLK becomes logic "1" at the same time that clock CK1 becomes logic "1". This occurs during the M4 process period of channel time CH8 shown in FIG. 37A. Thus, one sample of the musical sound data in which 8 sounds are added is latched at F/F2909 in FIG. 29.

In accordance with the processing in channel times CH1-CH8 in FIG. 37A, one sample of data, in which 8 sounds are added based on the formation of FIG. 33A, is outputted. By repeating this process, sound system 2912 generates musical sound data comprising 8 sound polyphonics through D/A converter 2910 and LPF 2911 in FIG. 29.

As discribed above, a musical sound is produced in a manner of 8 sound polyphonic based on the operation timing chart of FIG. 37A. This musical sound is based on the formation shown in FIG. 33A. The generation of polyphonic sounds corresponding to FIGS. 33B to 33G can be realized in the same manner.

Figure 37B:
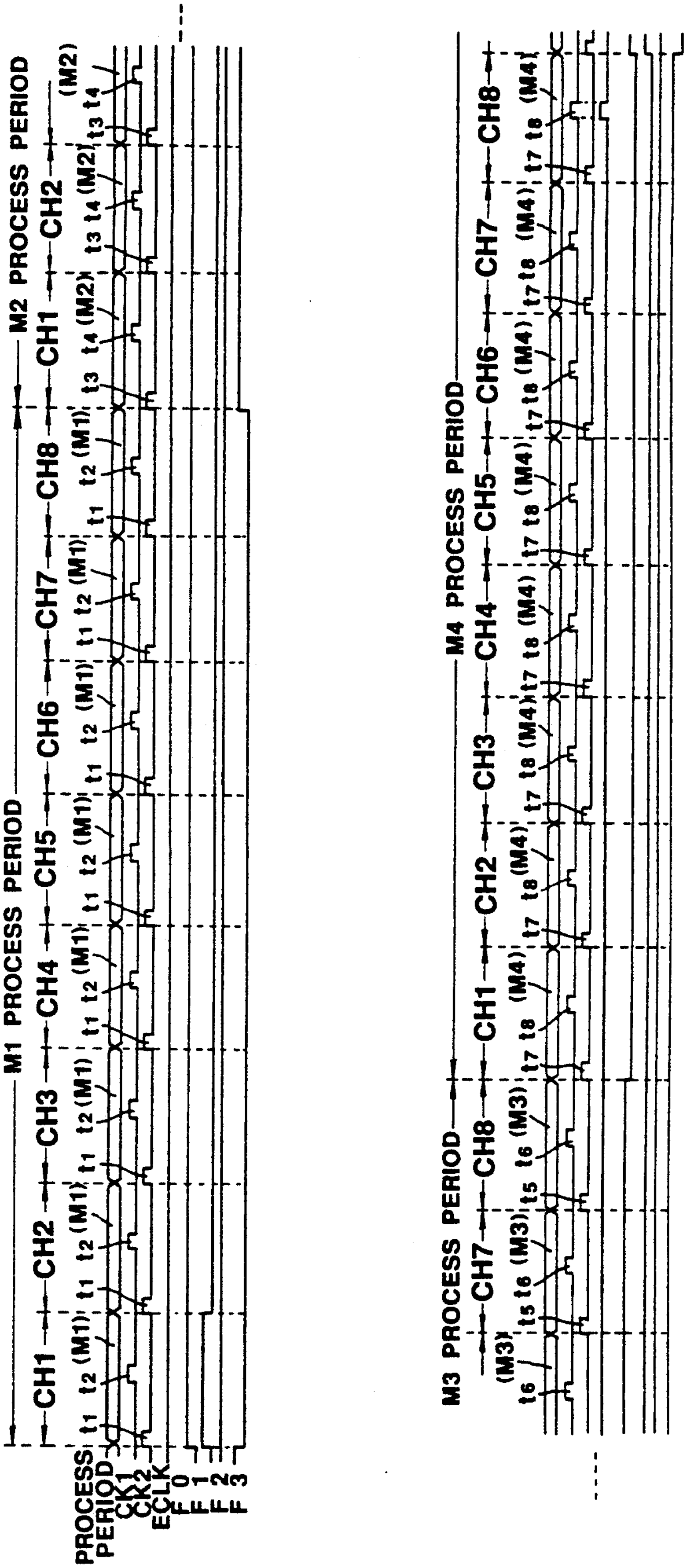

Next, the second mode of the sixth embodiment is explained. In this mode, a musical sound comprising 8 sound polyphonics is similarly generated as in the first mode. In the second mode, F/F3002 of accumulator 2907 of FIG. 31 is formed by a shift register which can process 8 sounds. Thus, the time divisional process for 8 sounds is conducted for respective process periods M1 to M4. This is different from the first mode. As shown in FIG. 37B, respective sampling periods are divided into four regions comprising M1 process period to M4 process period, and respective process periods are divided into channel times CH1-CH8 in a time divisional manner.

As described above, F/F3002 of accumulator 2907 of FIG. 31 is constituted by an 8 stage shift register. Process operations during process periods M1-M4 can be conducted in parallel for every channel time. That is, for a particular channel time, for example, CH1, respective process operations in process periods M1-M4 are carried out as for the case shown in FIG. 32A. Formation information data F1 becomes logic "1" only at the channel time CH1 of the M1 process period and becomes logic "0" in all other cases. Latch clock ECLK becomes logic "1" only at channel time CH8 of the M4 process period. During the channel times CH1-CH8 of the M4 process period, formation information data F0 becomes logic "0" and the first to the eighth musical sound data outputted from the basic module 2901 in FIG. 29 are sequentially inputted to accumulator 2908 in FIG. 31. In addition, formation information data F1 becomes logic "0". Thus, in accumulator 2908 of FIG. 31, adder 3101 sequentially accumulates the musical sound data of the above 8 sounds through F/F3102 and AND circuits 3103-1-3103-10. When clock CK1 of channel time CH8 of process period M4 in FIG. 37D is logic "1", latch clock ECLK becomes "1" simultaneously. Thus, one sample of musical sound data in which 8 sounds are added is latched at F/F2909 of FIG. 29.

As in the first mode, it is possible to produce a musical sound comprising 8 sound polyphonics.

In the second mode, only generation of the polyphonic sound corresponding to FIG. 33A is shown. However, generation of the polyphonic sounds corresponding to FIG. 33B to 33G can be similarly realized.

The sixth embodiment explains the case of 8 sound polyphonics but other numbers of polyphonics can naturally be realized by changing the number of time divisions.

7. An explanation of the seventh embodiment

Next, the seventh embodiment of the present invention is explained.

In this embodiment, the concept of the basic module is similar to that of the third embodiment. In the third embodiment, basic module 2801 of FIG. 28 can be operated based on the formation shown in FIGS. 33A to 33G. Thus, a musical sound comprising various harmonics structures can be produced. The present embodiment has the function of feeding back the output of the basic module to its own input and further can produce a musical sound having a more complex harmonics structure.

Figure 38:
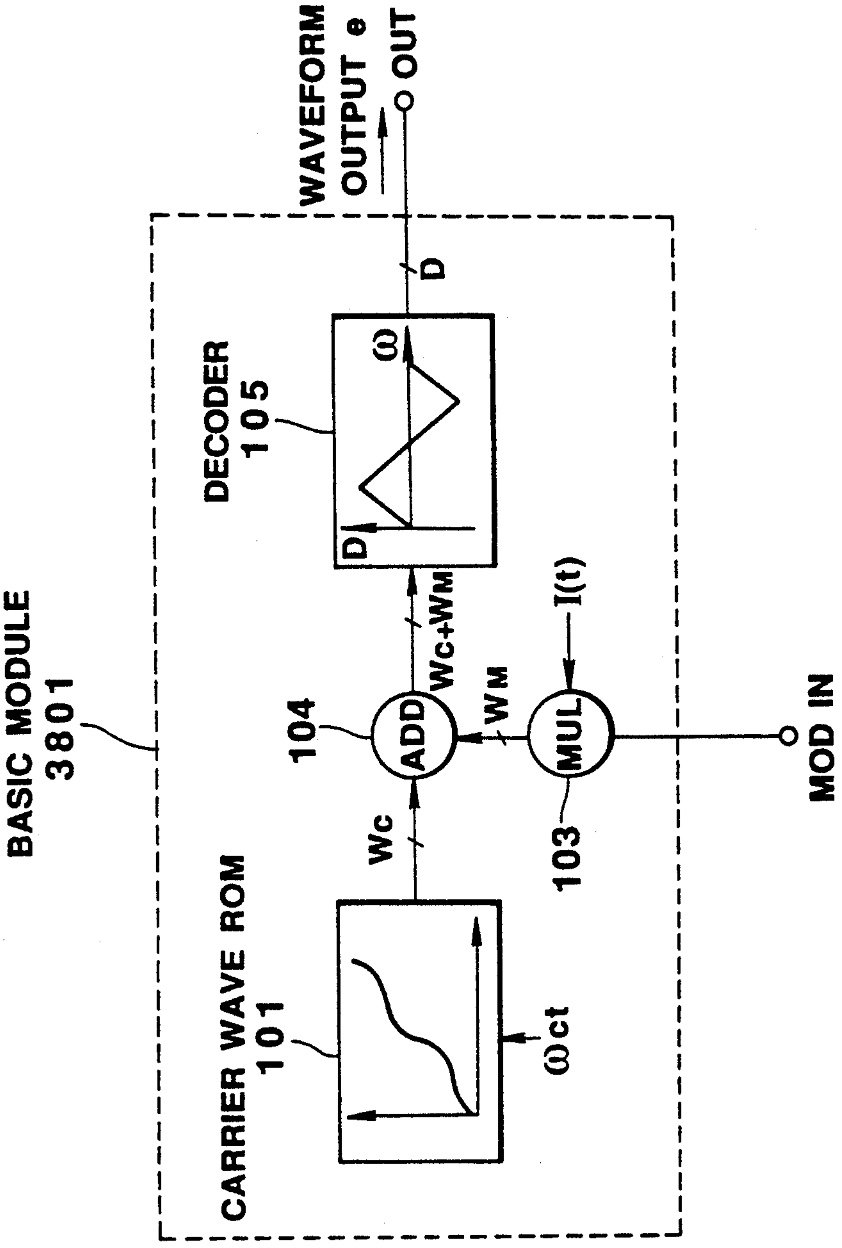
FIG. 38 is a view of the detailed structure of the seventh embodiment.

The structure of basic module 3801 in the present embodiment is shown in FIG. 38. In the basic module 2801 in FIG. 28, the output side, namely, the amplitude of the decoded output D from decoder 105, is controlled by MUL 106. In constrast, in basic module 3801 of FIG. 38, the decoded output D from decoder 105 is selectively outputted from output terminal OUT and the amplitude of modulation signal $W_M$ inputted from MOD IN terminal is controlled by MUL 103. In both embodiments, the output of a basic module forms modulation input to another basic module. Thus, the operation of the basic module 3801 in FIG. 38 is almost the same as in the case of basic module 2801 in FIG. 28. An example of a formation comprising a plurality of basic module 3801 in FIG. 28 is shown in FIGS. 39A to 39D. Although not shown in the drawing, the present embodiment can provide a structure in which a basic module is operated in a time divisional processing as shown in FIG. 29, as in the third embodiment.

Figure 39C:
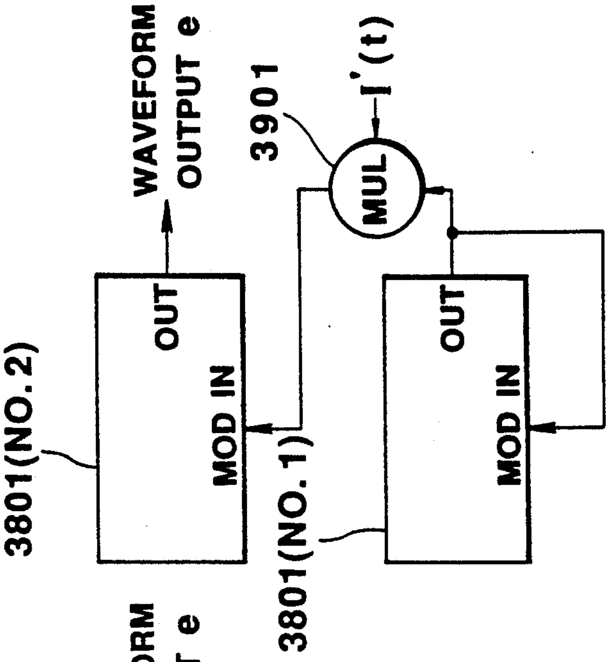
FIGS. 39A to 39D are views representing examples of formation in the detailed structure of the seventh embodiment.
Figure 39B:
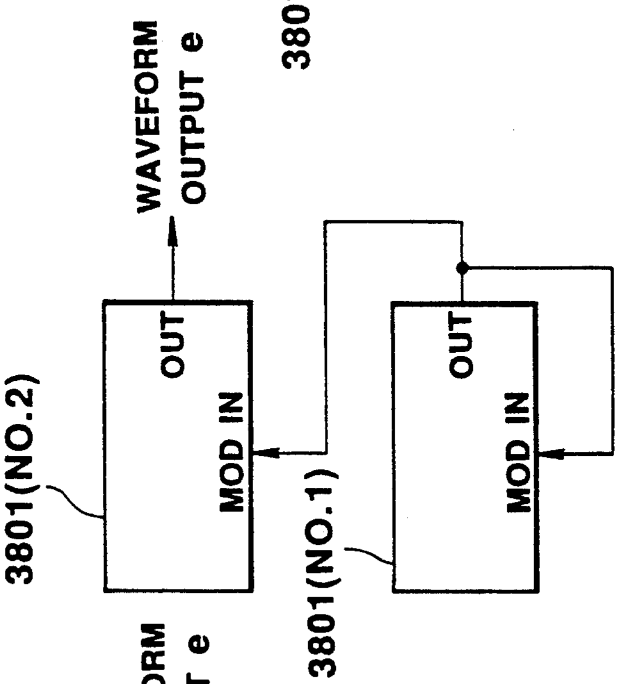
Figure 39A:
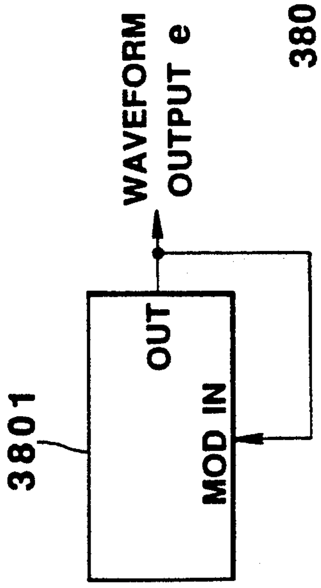

FIG. 39A shows an example of the first formation. In this example, in basic module 3801, waveform output e from output terminal OUT is outputted as the musical sound signal and is directly inputted to basic module 3801.

In accordance with the above structure, waveform output e of basic module 3801 can be used as the modulation input of basic module 3801.

In this case, the value of modulation depth function I(t) inputted MUL 103 (FIG. 38) may for example, be made 0. Then, waveform output e becomes equal to the case where modulation signal $W_M$ is 0 in equation (25) and a single sine wave is outputted as explained in the third embodiment. This example of the operation cannot be realized by the method of simply modulating a triangular wave, explained in the section "Background of the Invention". Therefore, this embodiment provides a specific effect.

On the other hand, when the value of modulation depth function I(t) is increased, a plurality of harmonics components are included as in the third embodiment. In the present embodiment, waveform output e is fed back to MOD IN terminal, thereby realizing a further complex structure. A more complex harmonics structure can be realized only by using a one-stage feedback, as compared with the case of the method of modulating the sine wave explained in the section on "Background of the Invention" applied to the basic module.

Therefore, by progressively increasing modulation depth function I(t) from 0 or by progressively decreasing it from a large value, a waveform from a single sine wave to an extremely complex modulated waveform can be continuously obtained.

FIG. 39B is an example of the second formation in the seventh embodiment. In this example, the output of the basic module 3801 (No. 1) having the same feedback loop as in FIG. 39A is further inputted to the MOD IN terminal of the second basic module 3801 (No. 2) and waveform output e of basic module 3801 (No. 2) is outputted as the musical sound signal.

In this case, the value of the modulation depth function I(t) inputted to MUL 103 (FIG. 38) of basic module 3801 (No. 2) is made, for example, 0 and a single sine wave can be outputted as waveform output e as in FIG. 39A.

On the other hand, when the value of the above modulation depth function I(t) is large, harmonics components can be emphasized. Thus, a harmonics structure different from that of FIG. 39A can be obtained.

In FIG. 39B, the value of modulation depth function I(t) can be controlled at every basic module 3801 comprising No.1 and No.2. Therefore, it is possible to perform a wider control than in FIG. 39A. By changing the frequency ratio of carrier wave phase angle $\omega_{ct}$ of basic module 3801, a musical signal having a widely varying harmonics structure is produced.

As shown in FIG. 39C, in addition to the structure of FIG. 39B, a third formation may be constructed to a signal obtained by multiplying the ouput of basic module 3801 (No. 1) by modulation depth function I'(t) in accumulator MUL 3901 and is inputted to the MOD IN terminal of basic module 3801 (No. 2). Thereby, modulation depth function I'(t) is applied as a parameter capable of controlling the harmonics. Thus, the third formation can perform a wider harmonic control than that of FIG. 38B.

Figure 39D:
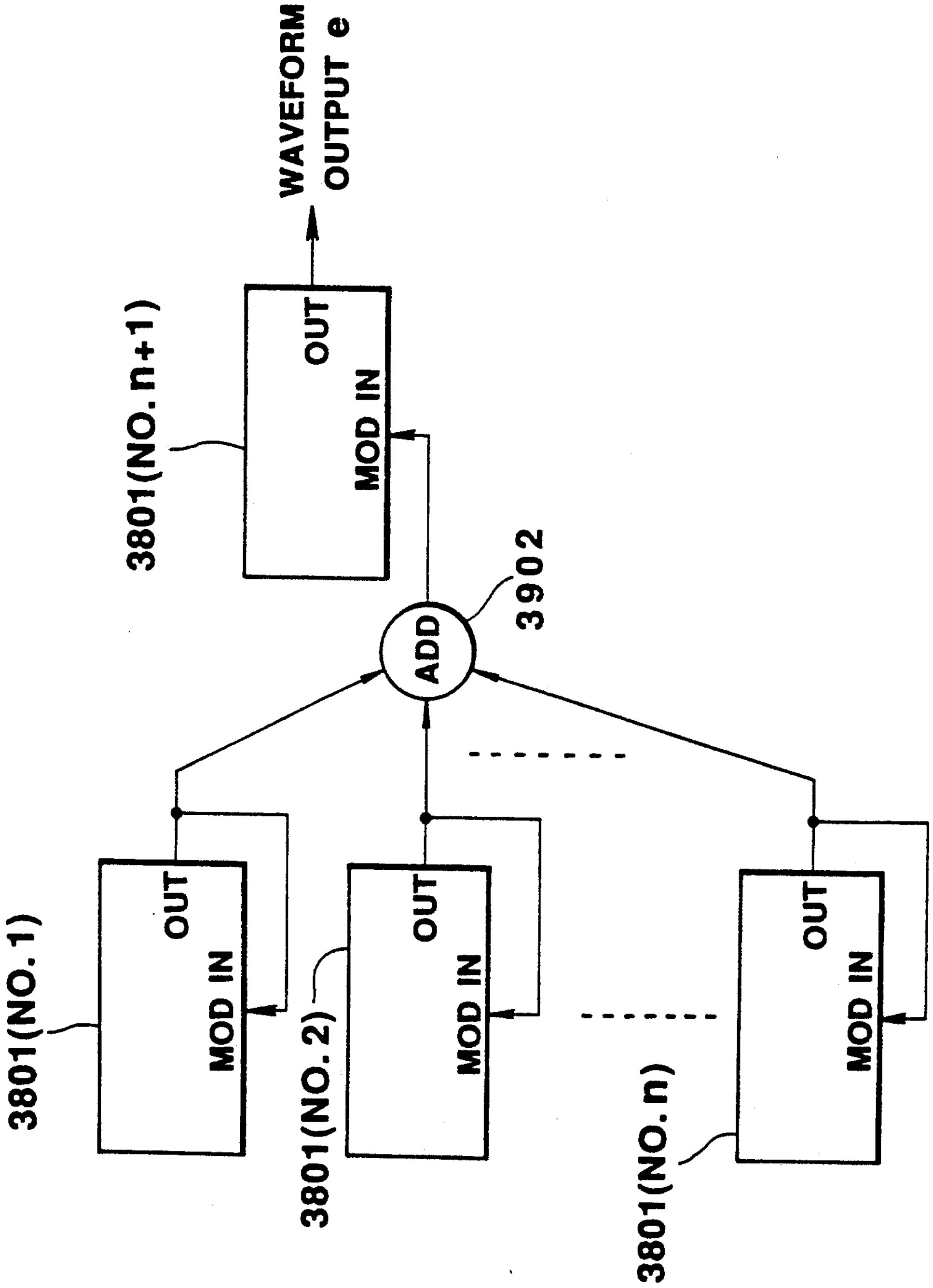

FIG. 39D is the fourth formation example. In this example, n basic modules 3801 having the same feedback as in FIG. 39A are arranged in parallel. The output of basic module 3801 (No. 1) to 3801 (No. n) are added at adder ADD 3902 and the addition signal is further inputted to the MOD IN terminal of basic module 3801 (No. n+1) and waveform output e of basic module 3801 (No. n+1) is outputted as a musical sound. This structure can realize a harmonic control different from that of FIGS. 39A-39C.

8. An explanation of the eighth embodiment

Next, the eighth embodiment of the present invention will be explained.

The present embodiment uses the same basic module as the seventh embodiment, shown in FIG. 38. The seventh embodiment is constructed to feed back waveform output e from basic module 3801 to its MOD IN terminal. In constrast, the present embodiment is constructed to feed back waveform output e to the MOD IN terminal of basic module 3801 which is provided previously by several steps.

Figure 40:
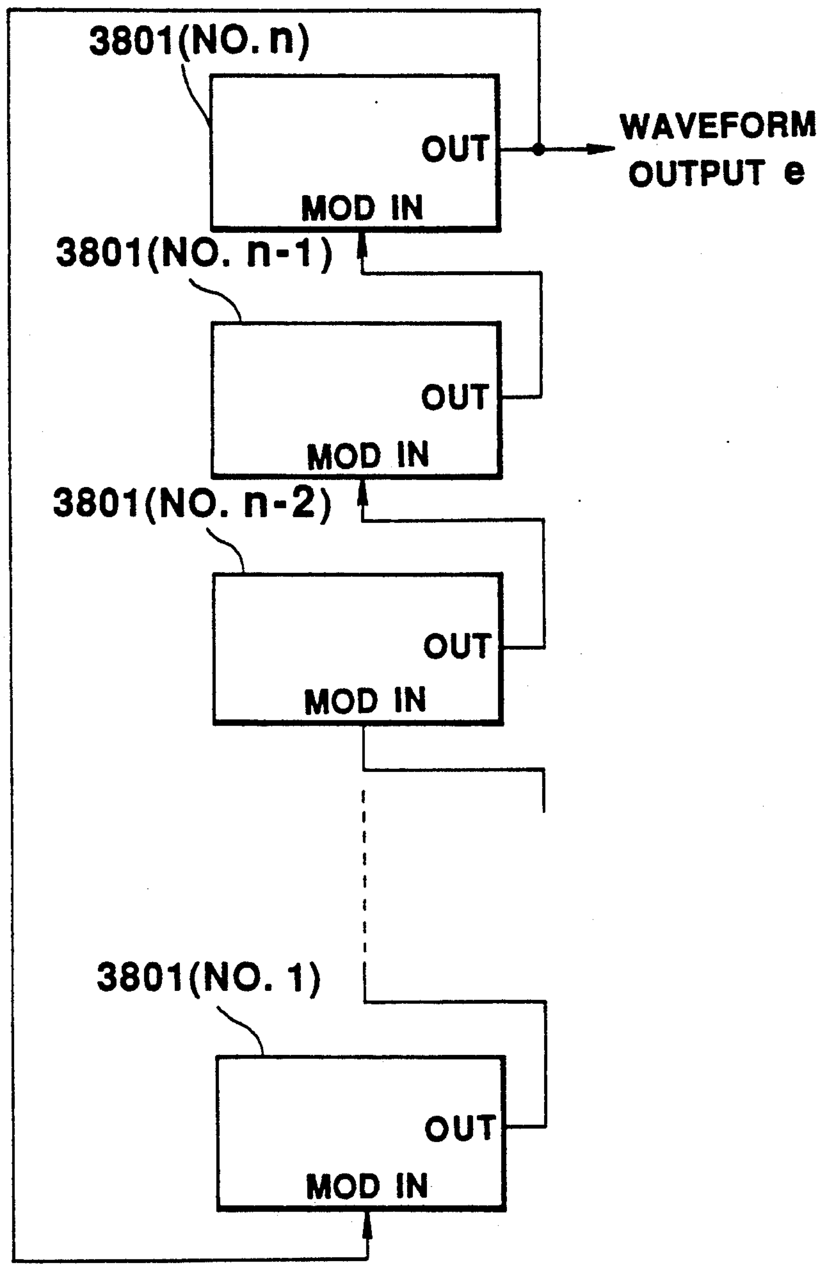
FIG. 40 is a view representing an example of formation in the eighth embodiment.

The formation of the present invention is shown in FIG. 40. The output of the first basic module 3801 (No.1) is inputted to the MOD IN terminal of basic module 3801 (No.2), thus several basic modules form cascade connections. Waveform output e of basic module 3801 (No.n) of the n th stage, which is the last stage, is outputted as a musical signal and is also inputted to the MOD IN terminal of basic module 3801 (No.1) in the first stage. This structure can realize a harmonic control different from that of the seventh embodiment, thus achieving a specific effect.

9. An explanation of the ninth embodiment

Next, the ninth embodiment of the present invention will be explained.

Figure 41:
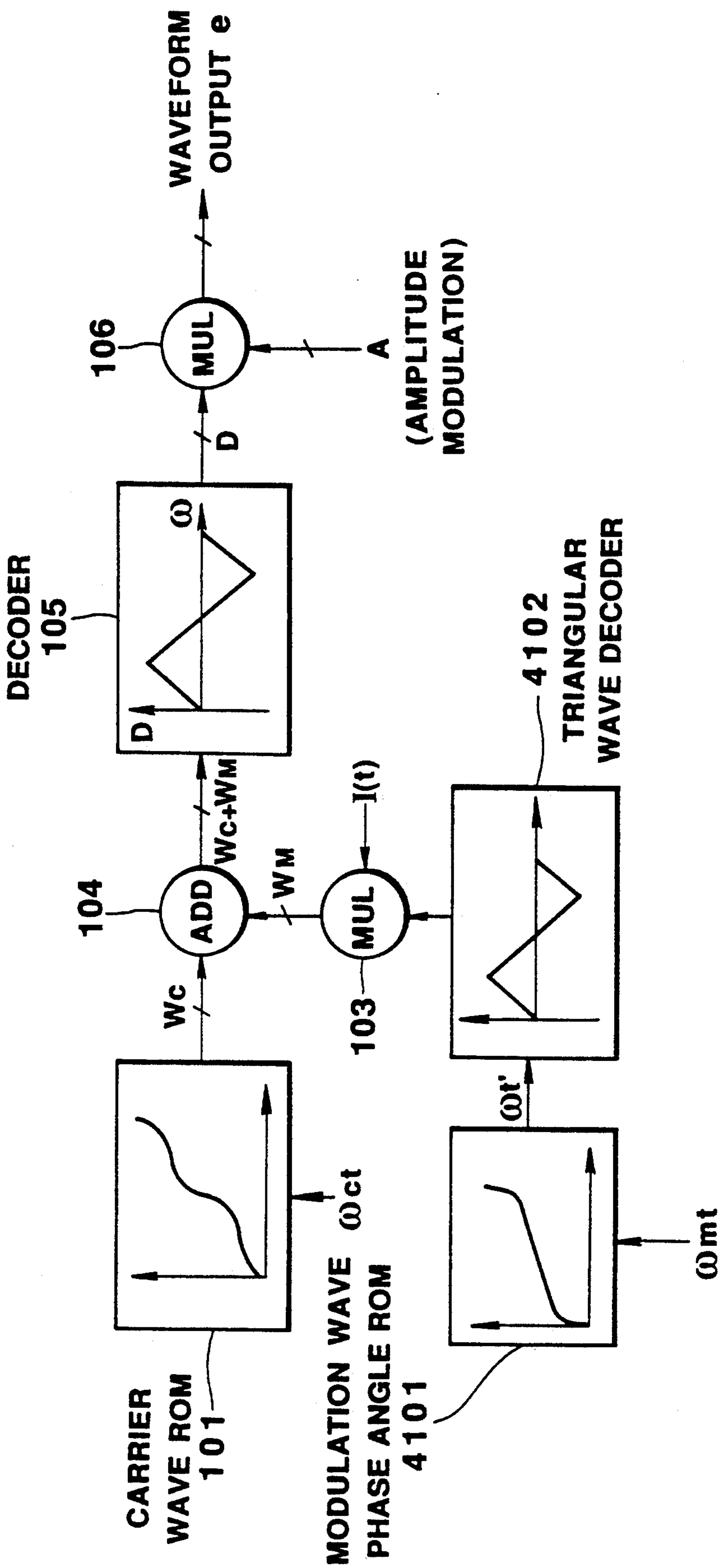
FIG. 41 is a view of a principle structure of the ninth embodiment.

At first, the principle of the ninth embodiment is explained. FIG. 41 shows the structure of the ninth embodiment.

The principle of this structure resides in the fact that modulation signal $W_M$ is not a simple sine wave produced by modulation ROM 102 as shown in FIG. 1, but is a signal having various characteristics produced through modulation wave phase angle ROM 4101 and triangular wave decoder 4102.

The function waveform shown in FIG. 2 is stored in carrier wave ROM 101. Therefore, the relations between carrier wave phase angle $\omega_{ct}$ [rad] and carrier signal $W_C$[rad] in regions I, II and III are as represented by equation (3).

On the other hand, the relation between modulation wave phase angle $\omega_{mt}$ [rad] in modulation wave phase angle ROM 4101 and modulation wave corrected phase angel $\omega_{t'}$[rad] is expressed by the equation $$\omega_{t'} = f(\omega_{mt}) \tag{26}$$

where f is defined as a modulation function.

The relation between modulation wave corrected phase angle $\omega_{t'}$ and modulation signal $W_M$ [rad] after passing MUL 103 is given by $$W_M = I(t)\ \mathrm{TRI}\ (\omega_{t'}) \tag{27}$$

where TRI(x) is defined as a triangular wave function.

Accordingly, the relation between modulation wave phase angle $\omega_{mt}$ and modulation signal $W_M$[rad] is expressed by substituting the above equation (27) in said equation (26), i.e.

$$W_M = I(t)\ \mathrm{TRI}\ \{f(\omega_{mt})\} \tag{28}$$

Carrier signal $W_C$ and modulation signal $W_M$, which are arithmetically operated by the equations (3) and (28), respectively are inputted to decoder 105, thereby enabling decoded output D to be outputted from decoder 105. Waveform output e obtained by multiplying this output by amplitude coefficient A in MUL 106 is expressed as follows.

$$e = A \cdot TRI\{(\pi/2)\sin\omega_{ct} + I(t)TRI\{f(\omega_{mt})\}\} \;..\; (0 \leqq \omega_{ct} \leqq \pi/2) \quad (29)$$

$$e = A \cdot TRI\{\pi - (\pi/2)\sin\omega_{ct} + I(t)TRI\{f(\omega_{mt})\}\} \;..\; (\pi/2 \leqq \omega_{ct} \leqq 3\pi/2)$$

$$e = A \cdot TRI\{2\pi + (\pi/2)\sin\omega_{ct} + I(t)TRI\{f(\omega_{mt})\}\} \;..\; (3\pi/2 \leqq \omega_{ct} \leqq 2\pi)$$

Where the value of modulation depth function I(t) is 0, namely, in case of non-modulation, the input waveform to decoder 105 is just carrier signal $W_C$ defined by the equation (3). This corresponds to the case in FIG. 1 where the value of modulation function I(t) is 0 and waveform output e is therefore as defined by equation (6). Carrier signal $W_C$ and carrier wave phase angle $\omega_{ct}$ are shown by relation A in FIG. 3, as in FIG. 1. Furthermore, the triangular function D=TRI(x) (where x is input) arithmetically operated by decoder 105 is defined by equation (7) in the same manner as in FIG. 1 and the function shown by relation B in FIG. 3. Therefore, waveform output e in FIG. 1, is changed as expressed by equation (8) and becomes a single sine wave A . sin $\omega_{ct}$. Namely, where amplitude coefficient A=1, the relation between carrier wave phase angle $\omega_{ct}$ and waveform output e during non-modulation is expressed by the relationship C shown in FIG. 3.

In accordance with the above relation, in order to realize a process in which a musical sound is attenuated to comprise only a single sine wave component, or is generated to comprise only a single sine wave component, the value of modulation depth function I(t) can be reduced with time, as in the equation (27).

Next, a change in waveform output e where the value of modulation depth function I(t) is increased is explained. The effect is the same as that in FIG. 1, where the modulation depth function I(t) value is increased. Namely, when the value of modulation depth function I(t) increases, the modulation signal $W_M$ component (excluding carrier signal $W_C$) is overlapped on addition waveform $W_C+W_M$ outputted from ADD 104 of FIG. 41. Therefore, waveform output e becomes distorted along the time axis instead of being a single sine wave and waveform output e provides a frequency characteristic including a lot of harmonics components.

Figure 42A:
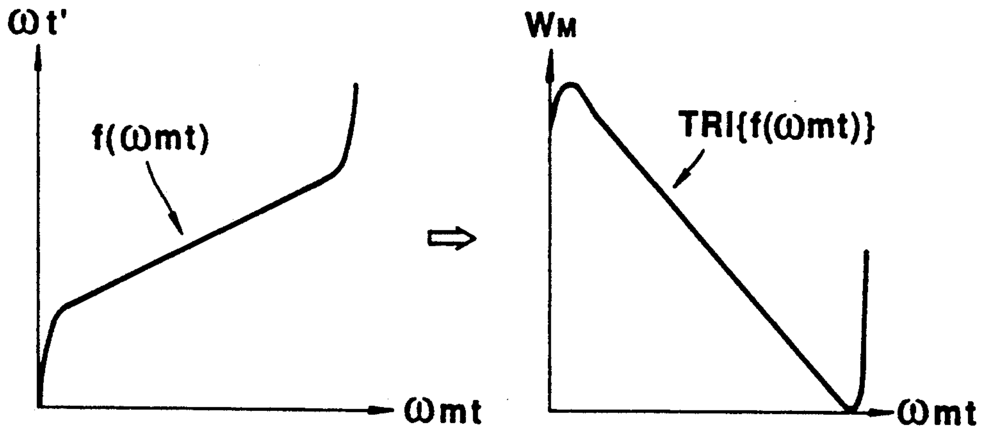
FIGS. 42A to 42C are views for explaining an operation of a modulation wave phase angle ROM and a triangular wave decoder in the principle structure of the ninth embodiment.
Figure 42B:
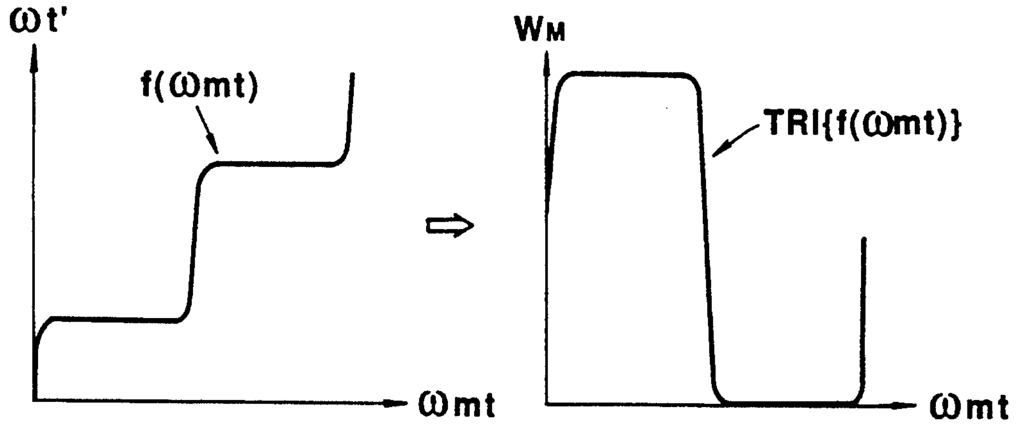
Figure 42C:
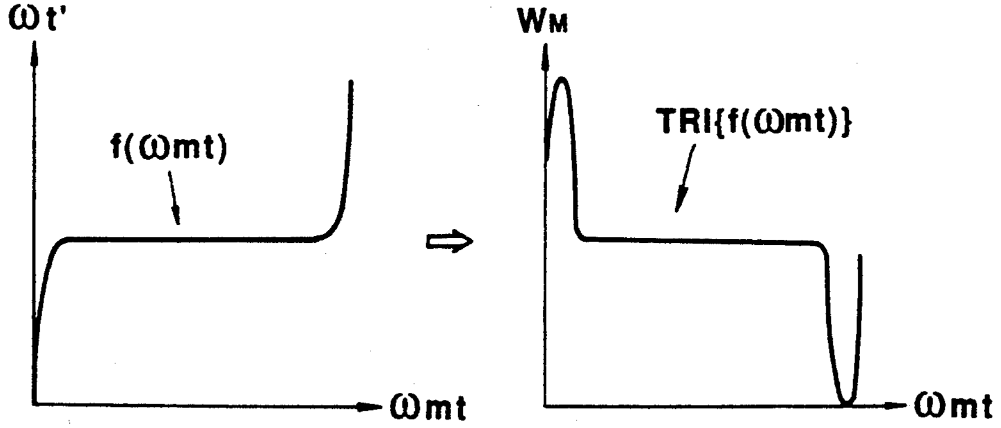

In this case, a plurality of modulation functions f are stored in modulation wave phase angle ROM 4101 of FIG. 41 as modulation function f shown in equation (26), as shown in FIGS. 42A–42C. Characteristics between modulation signal $W_C$ finally outputted from MUL 103 in accordance with respective modulation function f and modulation wave phase angle $\omega_{mt}$ can be expressed, for example, as I(t)=1 in equation (28), and is determined as shown in FIGS. 42A–42C.

The present embodiment can generate an output discretionally selected from a saw-tooth wave, a rectangular wave or a pulse wave, as shown in FIGS. 42A–42C, as the modulation signal $W_M$, by selecting the above modulation frequency f in modulation wave phase angle ROM 4101 in FIG. 41. This waveform includes a number of harmonics components and these components are added to carrier signal $W_C$ to form waveform output e. A waveform including more harmonics components can thus be outputted and further, by selecting the waveform of modulation signal $W_M$, the manner in which the harmonics components are included in waveform output e can be changed.

Although not shown in FIGS. 42A–42C, when the waveform stored in modulation wave phase angle ROM 4101 in FIG. 41 is the same signal as one stored in carrier wave ROM 101 represented by equation (3) or shown in FIG. 2, and when the stored content drives triangular wave decoder 4102 in FIG. 41, a single sine wave can be outputted as modulation signal $W_M$. Namely, equation (28) becomes the same as equation (4) in the case shown in FIG. 1. Modulation signal $W_M$ of a single sine wave is added to carrier signal $W_C$ by ADD 104 in FIG. 41 and the output of ADD 104 is inputted to decoder 105, thereby providing waveform output e which is expressed by equation (5) and shown in FIG. 1.

As is described above, a histogram of the frequency characteristic of waveform output e obtained by making modulation signal $W_M$ a single sine wave and increasing the value of modulation depth function I(t) with time is shown as recited in FIG. 6A. As is clear from the drawing, when modulation depth function I(t) is changed, the structure of the harmonics changes in a complex manner and the harmonics structure tends to concentrate in only one predetermined frequency. Namely, an amplitude of a lower harmonics component is reduced with increase in I(t), that of higher harmonics component is, in reverse, increased. In accordance with increase in I(t), the harmonics structure tends to shift from lower harmonics to higher harmonics.

Figure 43:
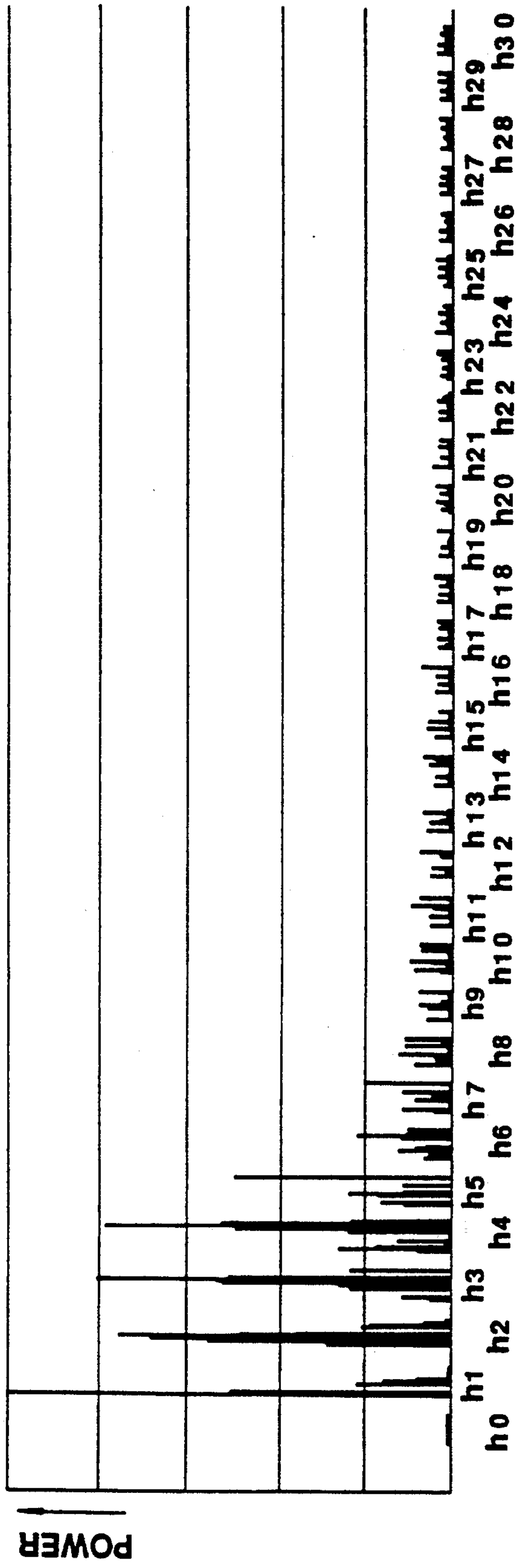
FIG. 43 is a drawing showing the relation between $W_M$ and a frequency characteristic of waveform output e in the principle structure of the ninth embodiment when $W_M$ is a sawtooth wave.

On the other hand, the waveform, for example, that shown in FIG. 42A, is stored in modulation wave phase angle ROM 4101 of FIG. 41 and, triangular wave decoder 4102 of FIG. 41 is driven, thus the modulation signal $W_M$ of the saw-tooth wave shown in FIG. 42A is generated. The signal is added to carrier signal $W_C$ by ADD 104 shown in FIG. 41 and is inputted to decoder 105 to provide waveform output e based on equation (29). In this case, a histogram of the frequency characteristics of waveform output e obtained by increasing the value of modulation depth function I(t) with time is as shown in FIG. 43. This case provides a characteristics in which, without greatly increasing the value of modulation depth function I(t), harmonics components including a fairly high harmonics can be included. Even if changing I(t), concave and convex portions of power of harmonics components are relatively small.

As shown in FIG. 6A and FIG. 43, the present embodiment selects a waveform of modulation signal $W_M$ and can produce a waveform output e having various harmonics characteristics. In this case, the characteristics shown in FIG. 6A are effective in generating the musical sound waveform of a percussed string instrument such as piano which is inclined in a distribution of a harmonic structure. In contrast, the characteristics shown in FIG. 43 are effective in generating a musical waveform of a string or brass instrument having a constant harmonics structure plus harmonics components up to higher harmonics.

In addition to the above feature, the principle structure shown in FIG. 41 can easily generate a process in which a musical sound is reduced to a single sine wave component or in which a musical sound comprising only a single sine wave component is generated and can easily generate a musical sound which includes harmonics components up to higher harmonics as frequency components by changing the value of modulation depth function I(t) between about 0–2π[rad], in the same manner as in FIG. 1.

In the above principle structure, decoder 105, having a characteristics represented by equation (7) or relation B shown in FIG. 3, can generate a single sine wave, by storing a carrier signal $W_C$, which is represented by equation (3) and the relation A of FIGS. 2 or 3, in carrier wave ROM 101. However, the present invention is not limited to the above case and combinations shown in FIGS. 8A–8D can provide the same effect as is shown in FIG. 1. This relation is represented by the above recited equations (9)–(16).

Amplitude coefficient A multiplied by MUL 106 in FIG. 41 is explained as having a constant value but actually it can change with time. An envelope characteristic subjected to amplitude modulation can thereby be applied to a musical sound.

Next, the structure of the ninth embodiment is explained in detail based on the principle structure of the ninth embodiment.

The entire structure of the ninth embodiment is the same as that of the first embodiment shown in FIG. 10. Detailed circuit examples such as carrier signal generating circuit 1003 and triangular wave decoder 1009 in FIG. 10, are shown in FIGS. 11, 13 and 15 as in the first embodiment above recited.

The principle of the ninth embodiment is different from that of the above recited first embodiment in respect of the structure of modulation signal generating circuit 1005, which comprises modulation wave phase angle ROM 4101 and triangular wave decoder 4102, as shown in FIG. 41.

Figure 44:
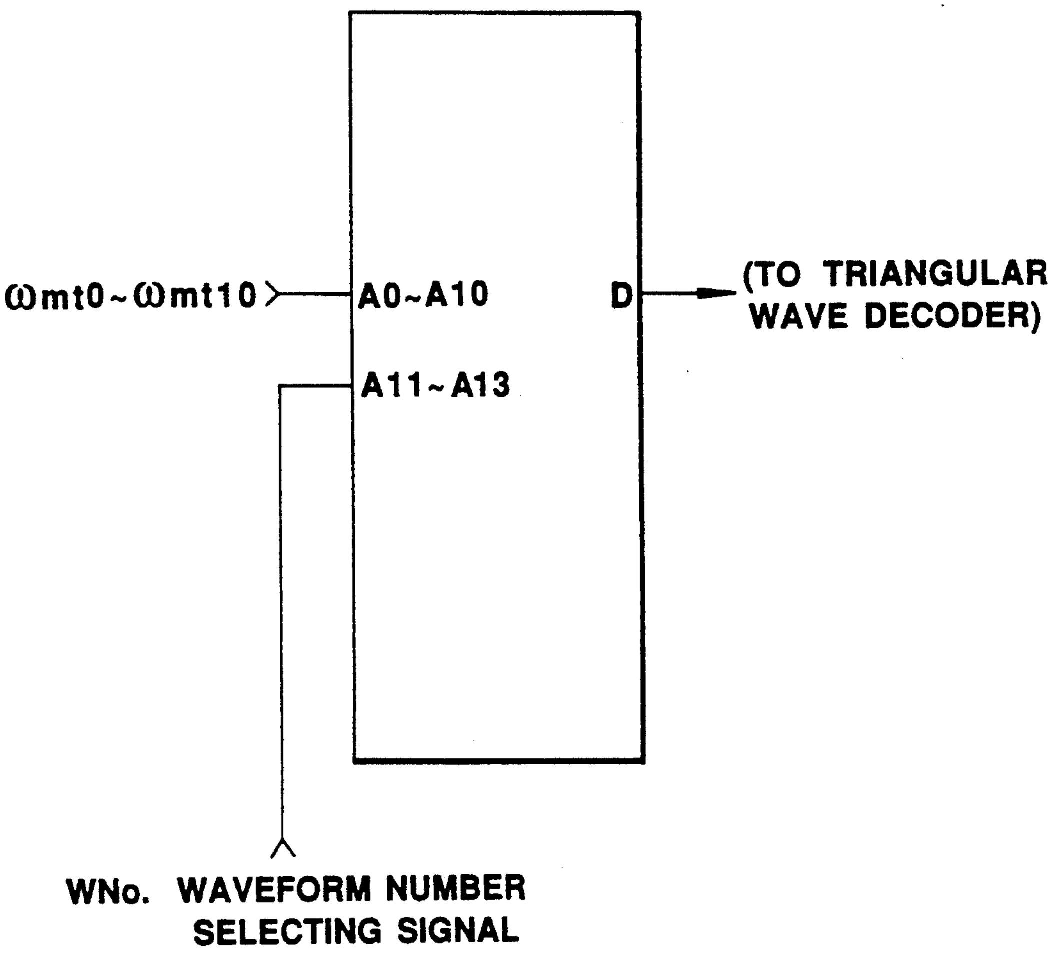
FIG. 44 is a view representing an example of a circuit of a modulation wave phase angle ROM in the detailed structure of the ninth embodiment.

The structure of modulation wave phase angle ROM 4101 is shown in FIG. 44. This ROM has an address input of 14 bits comprising A0–A13 and 0–7 values (decimal number) are inputted to addresses A11–A13 of the upper 3 bits as waveform number selecting signal WNo. Therefore, any one of the address areas from a maximum of 8 kinds of modulation functions f, shown in FIGS. 42A–42C or FIG. 2, can be designated. This designation can be discretionally conducted by a player by using a selection switch not shown in the drawing, the switching state is selected by a controller 101 shown in FIG. 10, and the waveform number selecting signal WNo. having the corresponding value may be applied to modulation signal generating circuit 1005.

In this way, after selecting the above modulation function f, modulation wave phase angle $\omega_{mt}0$–$\omega_{mt}10$ from adder 1004 in FIG. 10 are inputted to the lower 11 bits comprising A0–A10. Thus, modulation wave corrected phase angle $\omega_{t'}$ (which should be referred to FIG. 41) is provided corresponding to respective modulation wave phase angle $\omega_{mt}0$–$\omega_{mt}10$, not shown in the drawing, from output terminal B.

The modulation wave corrected phase angel $\omega_{t'}$ is inputted to a circuit corresponding to rectangular wave decoder 4102 in FIG. 41 within modulation signal generating circuit 1005 of FIG. 10. The rectangular wave decoder can be of the same structure as triangular wave decoder 1009 shown in FIG. 15, explained above. Therefore, modulation signal $W_M0$–$W_M10$ corresponding to modulation function f selected by waveform number selecting signal WNo is outputted from modulation signal generating circuit 1005 and multiplier 1007, shown in FIG. 10.

According to the present embodiment, a plurality of modulation functions f can be selected in modulation wave phase angle ROM (FIG. 44) within modulation signal generating circuit 1005 in FIG. 10. This enables many kinds of modulation signals $W_M0$–$W_M10$ to be selected. Therefore, a musical sound waveform with various harmonics characteristic can be generated as decoded outputs MA0–MA9 from triangular wave decoder 1009 shown in FIG. 10.

10. An explanaton of the tenth embodiment

Next, the tenth embodiment of the present invention is explained.

To begin with, the principle of the tenth embodiment is the same as the principle of the first embodiment, which is explained by referring to FIG. 1–9.

Figure 45:
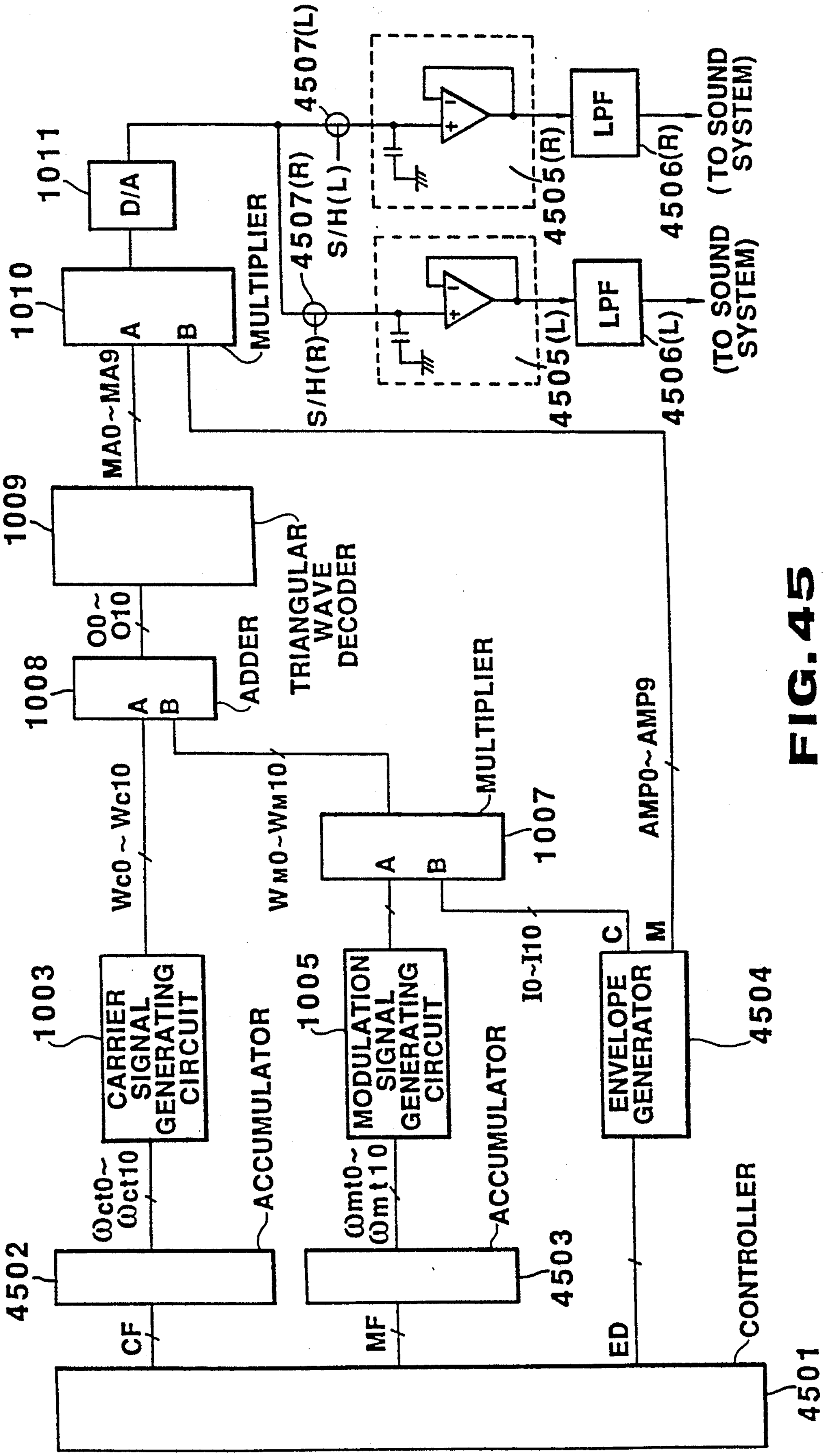
FIG. 45 is a view representing the detailed structure of the tenth embodiment.

The structure of the tenth embodiment is shown in detail in FIG. 45. A time divisional processing is conducted in accordance with the left and right channels, generating a stereo musical sound. In this case, modulation wave phase angle $\omega_{mt}0$–$\omega_{mt}10$ and modulation depth functions I0–I10 are determined for every channel, enabling a stereo output to be obtained. This output is subjected to a modulation differing slightly between right and left channels.

FIG. 45 shows a circuit or signal for which the same number or dot symbol as in the first embodiment shown in FIG. 10 has the same function as in the case shown in FIG. 10.

Controller 4501 generates an output carrier frequency CF, modulator frequency MF and envelope data ED (comprising respective rate values and level values, for example, as the envelope) in the same manner as controller 1001 shown in FIG. 10. In this case, the controller sets the above parameters in accordance with the left or right channel independently, as described in detail later. This point is different from controller 1001 shown in FIG. 10.

Accumulators 4502 or 4503 produce carrier wave phase angle $\omega_{ct}0$–$\omega_{ct}10$, modulation wave phase angle $\omega_{mt}0$–$\omega_{mt}10$, in the same manner as adders 1002 or 1004 shown in FIG. 10. In this case, accumulators 4502 or 4503 are different from adders 1002 or 1004 shown in FIG. 10 in that respective phase angles are generated independently from left and right channels. The basic function of carrier signal generating circuit 1003 and modulation signal generating circuit 1005 is as shown in FIG. 10. Further, it has a function of performing a time divisional process in accordance with respective left and right channels.

Envelope generator 4504 produces modulation depth functions I0–I10 and amplitude coefficients AMP-0–AMP10 based on envelope data ED from controller 4501 in the same manner as envelope generator 1006 shown in FIG. 10. In this case, this embodiment is different from envelope generator 1006 shown in FIG. 10 in that modulation depth functions I0–I10 produce left and right channels independently.

Next, an example of carrier signal generating circuit 1003 in FIG. 45 is shown in detail in FIG. 11 or 13, as in the previously recited first embodiment. These operations have already been explained by referring to FIG. 12 or 14.

An example of triangular wave decoder 1009 circuit is shown in FIG. 45. This circuit performs the same operation as that shown in FIG. 15, in the same manner as in the first embodiment.

Further, an example of modulation signal generating circuit 1005, shown in detail in FIG. 45, can be used to form a one-period waveform by storing $\frac{1}{2}$ or $\frac{1}{4}$ periods of sine waves in the ROM, as shown in FIGS. 11 or 13.

The basic functions of multiplier 1007, adder 1008 and multiplier 1010 are the same as for those in FIG. 10, with the additional function of time divisional processing corresponding to left and right channels.

A digital musical sound signal outputted through multiplier 1010 is converted to an analog signal by D/A converter 1011 and then transmitted separately through gates 4507(R) and 4507(L) according to respective left and right time divisional channels. Thereafter, the digital musical sound signal is inputted to sample and hold circuits 4505(R) and 4505(L) and subjected to a sample holding operation. Thus, respective signals of respective cha::nels are converted into analog musical sound signals by low pass filters (hereinafter caller LPF) 4506(R) and 4506(L) and are generated from a sound system, not shown, through separate left and right channel. Gates 4507(R) and 4507(L) are subjected to an opening or closing operation by respective sampling and hold signals S/H(R) and S/H(L). Sampling and hold circuits 4505(R) and 4505(L) respectively comprise a capacitor for holding respective channel signals and a buffer amp, for example, as is shown in FIG. 45.

Next, in order to realize stereo operation of the present embodiment, a structure comprising accumulators 4502 and 4503 and envelope generator 4504 is shown.

Figure 46:
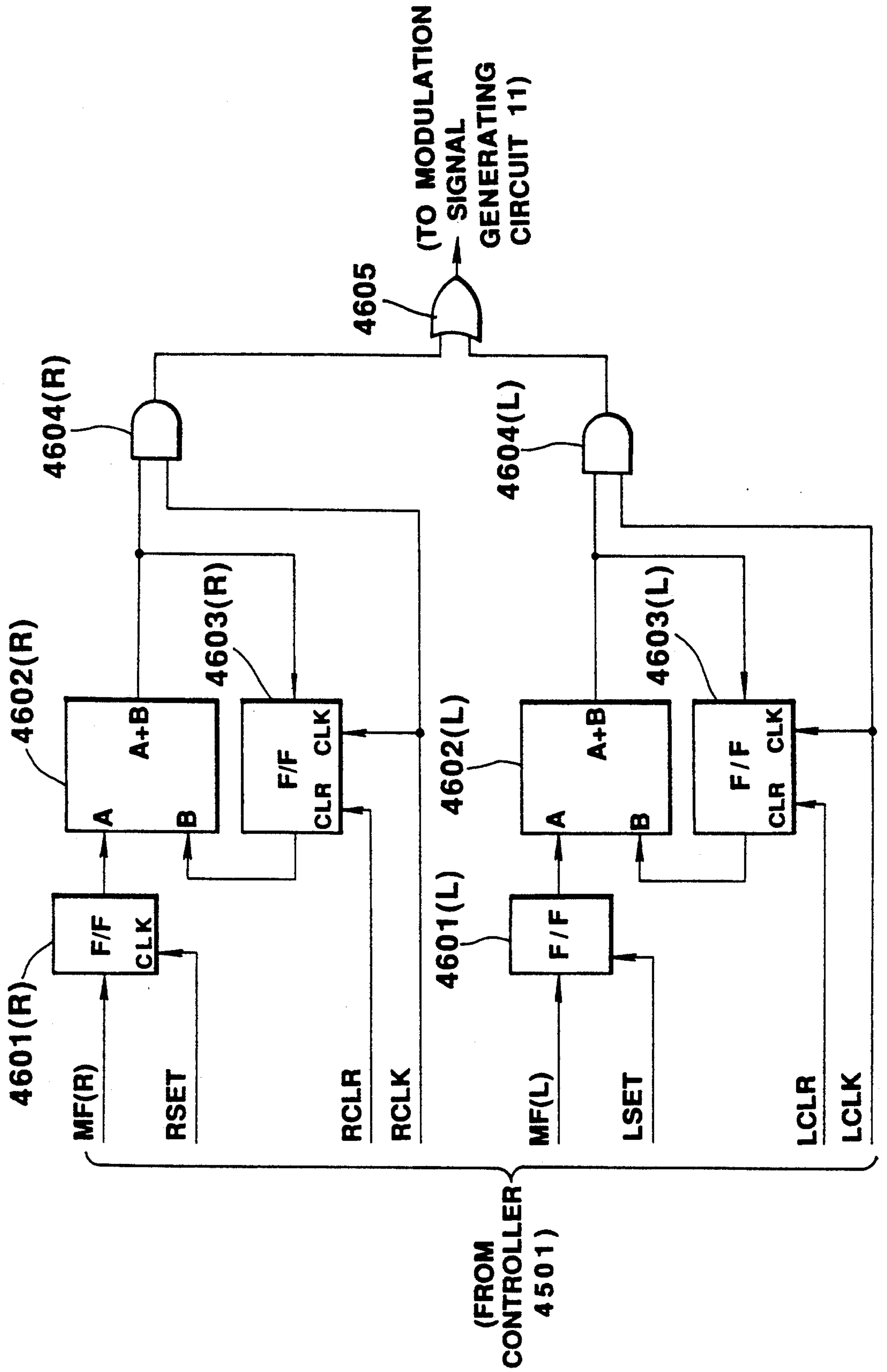
FIG. 46 is a view representing an example of a circuit of an accumulator for a modulation signal in the detailed structure of the tenth embodiment.

FIG. 46 shows the structure of accumulator 4503 of FIG. 45. Respective signals MF(R), MF(L) shown in FIG. 46 correspond to modulator frequency MF shown in FIG. 45, and RCLK, LCLK, RSET, LSET, RCLR, and LCLR which are abbreviated in FIG. 45, are control signals respectively applied from controller 4501. "(R)" is attached to a number of circuits for the right channel and "(L)" is given to the circuit for the left channel.

First, the circuit structure of the right channel is explained. Right channel modulator frequency MF(R) from controller 4501 is inputted to flip flop (hereinafter called F/F) 4601(R) and is set in accordance with right channel set signal RSET inputted to clock terminal CLK from controller 450.

The output from F/F 4601 (R) is inputted to adder 4602(R) as input A. The output A+B from adder 4602(R) is fed back as input B through F/F4603(R). In accordance with this structure, right channel modulator frequency MF(R) inputted through F/F4601(R) is sequentially accumulated.

The operation of clearing the accumulation result is carried out by clearing F/F 4603(R) by using right channel clear signal RCLR from controller 4501. In synchronization with a fall of right channel clock RCLK inputted to clock terminal CLK of F/F 4603(R), the output A+B of adder 4602(R) is set to F/F 4603(R) and the content set in F/F 4603(R) is outputted in synchronization with a rise of the same right channel clock RCLK. An accumulation operation can be sequentially executed through this flip flop.

In the above construction, an accumulation result for the right channel obtained as output A+B of adder 4602(R) is outputted to modulation signal generating circuit 1005 as modulation wave phase angle $\omega_{mt}0$-$\omega_{mt}10$ in FIG. 45 through AND circuit 4604(R) and OR circuit 4505 at a time divisional timing of the right channel at which the right channel clock RCLK becomes high level and AND circuit 4604(R) is turned on.

Next, left channel F/F 4601(L), adder 4602(L), F/F 4603(L) and AND circuit 4604(L) operate in the same manner as right channel F/F 4601(R), adder 4602(R), F/F4603(R) and AND circuit 4604(R). These circuits operate based on left channel modulator frequency MF(L), left channel clock LCLK, left channel set signal LSET and left channel clear signal LSLR which are transmitted from controller 4501. A left channel accumulation result of output A+B of adder 4602(L) is outputted to modulation signal generating circuit 1005 as modulation wave phase angle $\omega_{mt}0$-$\omega_{mt}10$ shown in FIG. 45 through OR circuit 4605 from AND circuit 4604(L) at a time divisional timing of left channel at which left channel clock LCLK becomes a high level and AND circuit 4604(L) is turned on.

Figure 47:
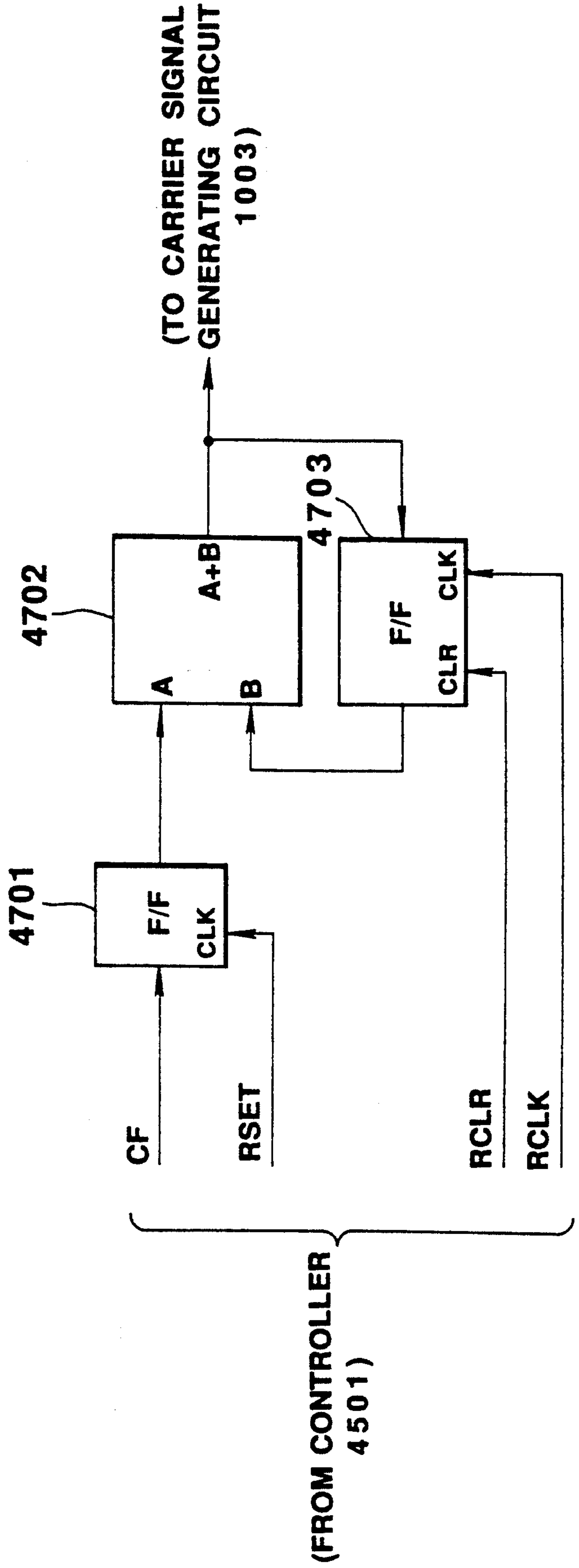
FIG. 47 is a view showing an example of a circuit of an accumulator for a carrier wave signal in the detailed structure of the tenth embodiment.

Next, the structure of accumulator 4502 of FIG. 45 is shown in FIG. 47.

F/F 4701, adder 4702 and F/F 4703 perform the same operation as right channel F/F 4601(R), adder 4602(R) and F/F4603(R). Respective circuits operate based on carrier frequency CF, right channel clock RCLK, right channel set signal RSET and right channel clear signal RCLR from controller 4501. The accumlation result of output A+B of adder 4702 is outputted to carrier signal generating circuit 1003 in FIG. 45 as carrier wave phase angle $\omega_{ct}0$-$\omega_{ct}10$ which are commonly used for left and right channels.

Figure 48:
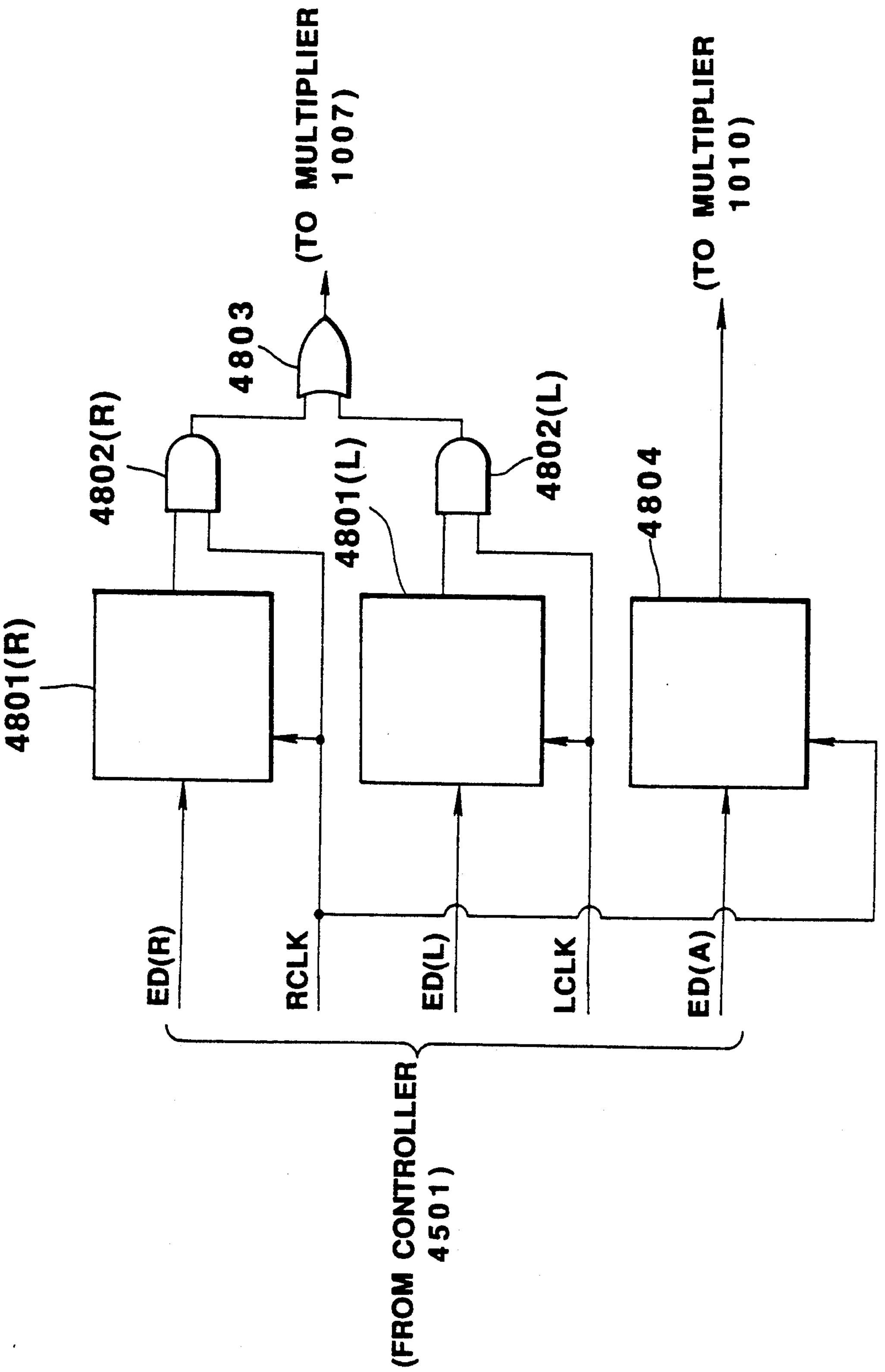
FIG. 48 shows an example of a circuit of an envelope generator in the detailed structure of the tenth embodiment, FIGS. 49(*a*) to 49(*h*) are timing chart of a stereo operation in the detailed structure of the tenth embodiment.

Further, the structure of envelope generator 4504 in FIG. 45 is shown in FIG. 48.

In FIG. 48, respective signals ED(R), ED(L) and ED(A) correspond to set data ED in FIG. 45, and RCLK and LCLK, which are omitted in FIG. 45, are control signals suplied from respective controllers 4501.

Right channel modulation depth function envelope data generating circuit 4801(R) generates envelope data for right channel modulation depth function based on right channel modulation depth function setting data ED(R) preset by controller 4501 in synchronization with a rise of right channel clock RCLK. An envelope generator used for an ordinary electronic musical instrument is applied to the above circuit without being modified and thus a detailed description of the circuit is omitted.

The output of right channel modulation depth function envelope data generating circuit 4801(R) is outputted to multiplier 1007 in FIG. 45 as modulation depth functions I0 to I10 through AND circuit 4802 and OR circuit 4803 at a time divisional timing of right channel at which the right channel clock RCLK becomes high level and AND circuit 4802 (R) is turned on.

Left channel modulation depth function envelope data generating circuit 4801(L) generates envelope data for left channel modulation depth function, based on left channel modulation depth function setting data ED(L) preset in synchronization with a rise of left channel clock LCLK in the same manner as right channel modulation depth function envelope data generating circuit 4801(R).

And the output of left channel modulation depth function envelope data generating circuit 4801 (L) is outputted to multiplier 1007 in FIG. 45 as modulation depth functions I0 to I10 through AND circuit 4802(L) and OR circuit 4803 at a time divisional timing of left channel at which left channel clock LCLK becomes high level and AND circuit 4802(L) is turned on.

Amplitude coefficient envelope data generating circuit 4804 generates envelope data for amplitude coefficient in synchronization with right channel clock RCLK, based on amplitude coefficient setting data ED(A) preset by controller 4501 in the same manner as right channel modulation depth function envelope data generating circuit 4801(R), for example.

The output of the above amplitude coefficient envelope data generating circuit 4804 is applied to multiplier 1010 shown in FIG. 45 as amplitude coefficients AMP0–AMP9.

The operation of the entire circuit shown in FIG. 45 with emphasis on the accumualtors 4502, 4503, and envelope generator 4504 will be explained by referring to the operational timing chart shown in FIG. 49.

The player sets an envelope of a musical sound to be outputted from the right channel, at a setting unit not shown in the drawing. Therefore, controller 4501 shown in FIG. 45 sets a parameter in right channel modulation depth function envelope data generator circuit 4801(R) as right channel modulation depth function setting data ED(R) shown in FIG. 48. Next, the player sets an envelope of a musical sound to be outputted from the left channel in the same manner as in the case of the right channel. The parameter is set in left channel modulation depth function envelope data generating circuit 4801(L) as left channel modulation depth function setting data ED(L). The player similarly sets an envelope data of an output amplitude which is common to the left and right channels. Therefore, a parameter is set in amplitude coefficient envelope data generating circuit 4804 as amplitude coefficient setting data ED(L).

After the setting operation, a performance operation is started, and when a player designates a pitch by performing a depression operation at a keyboard, for example, which is not shown, controller 4501 sets a carrier frequency CF corresponding to the pitch information. Simultaneously, a right channel modulator frequency MF(R) having a predetermined relation with above carrier frequency CF is set in F/F4601(R) in FIG. 46 and left channel modulator frequency MF(L) having a relation with a little different from the right channel is set in F/F 4601(L).

Sequentially, F/F 4603(R), 4603(L) in FIG. 46 and F/F 4703 in FIG. 47 are cleared by clear signal RCLR and LCLR respectively. After an accumulation operation is sequentially carried out in accordance with right channel clock RCLK and left channel clock LCLK.

In this case, AND circuit 4604(R) in FIG. 46 is turned on at a time divisional timing of right channel at which right channel clock RCLK becomes high level as shown in FIG. 49(*g*), thereby outputting right channel data as modulation wave phase angle $\omega_{mt}$0–$\omega_{mt}$10 as shown in FIG. 49(*a*). Reversely, at a time divisional timing of left channel at which left channel clock LCLK becomes high level, AND circuit 4604(L) in FIG. 46 is turned on and left channel data is outputted as shown in FIG. 49(*a*).

Figures 49A, 49B, 49C, 49D, 49E, 49F, 49G, 49H:
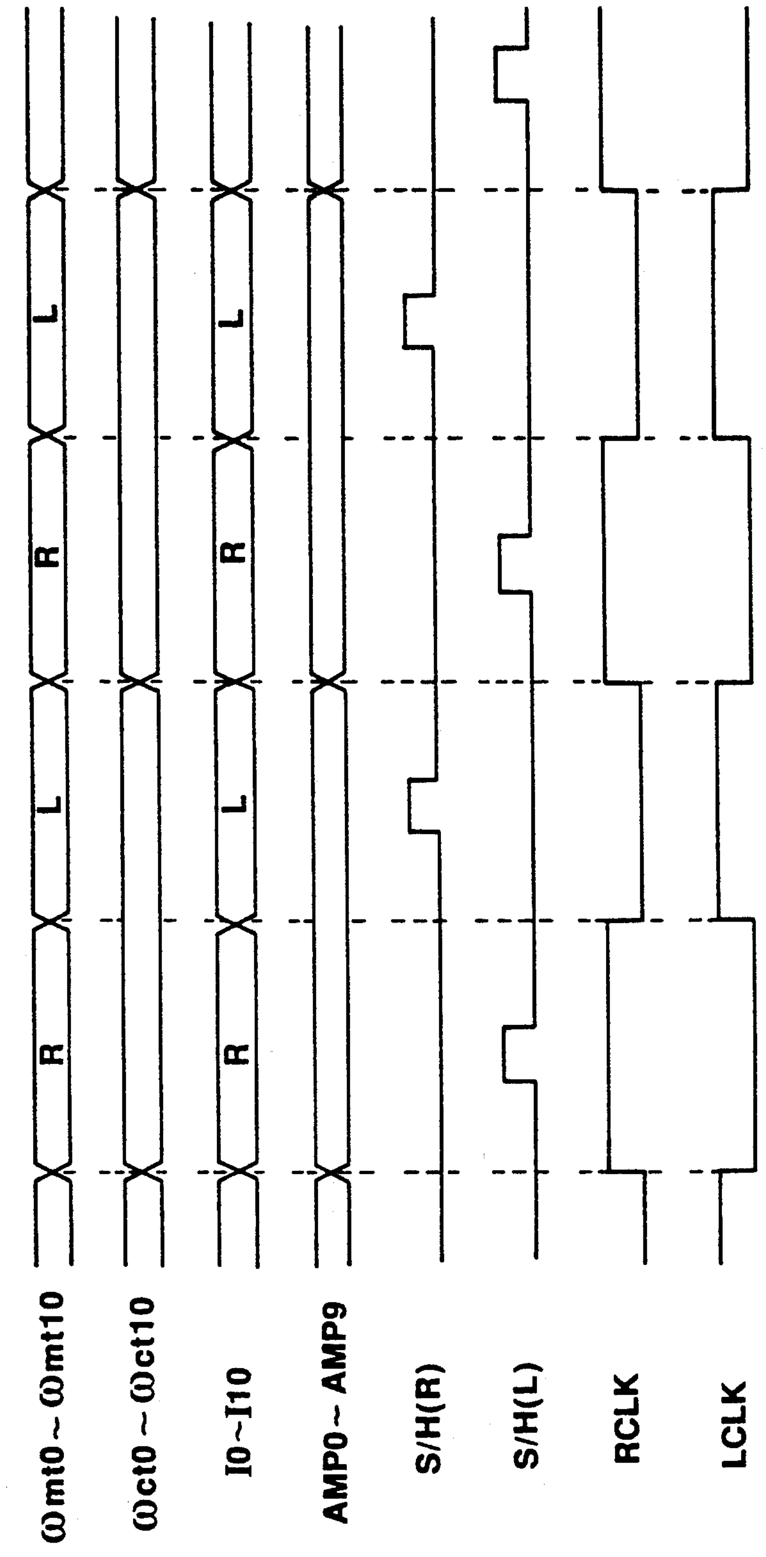

In the same manner as is described above, a portion of envelope generator 4504 in FIG. 45 in which a modulation depth function is outputted alternatively generates modulation depth functions I0–I10 of right channel and left channel as shown in FIG. 49C, by alternatively turning on AND circuit 4802(R) and 4802(L) in FIG. 48 at respective time divisional timings of right channel and left channel.

On the other hand, accumulator 4502 in FIG. 45 executes an accumulation operation at every division of a time divisional timing of the right channel and therefore, a data which is common to left and right channels are outputted as carrier wave phase angle $\omega_{ct}$0–$\omega_{ct}$10, as shown in FIG. 49(*b*).

Similarly, a portion of envelope generator 4504 in which an amplitude coefficient is outputted, a new envelope data is outputted at every time divisional timing of right channel. Therefore, data which is common to left and right channels as shown in FIG. 49(*d*) are outputted as amplitude coefficients AMP0–AMP9.

Based on respective data outputted as described above, the carrier signal generating circuit 1003, modulation signal generating circuit 1005, multiplier 1007, adder 1008, triangular wave decoder 1009 and multiplier 1010 shown in FIG. 45 execute the respective processes which have been explained above. Decoded outputs MA0–MA9 corresponding to left channel and right channel can thus be obtained in respective time divisional timings. As shown in FIG. 49(*e*) and (*f*), at respective time divisional timings of right channel and left channel, respective sampling and hold signals S/H(R) and S/H(L) alternatively become high level, and gates 4507(R) and 4507(L) are alternatively turned on. Thereby decoded outputs MA0–MA9 corresponding to right channel and left channel respectively are converted into an analog signal by D/A converter 1011 and then alternatively divided into sampling and hold circuits 4505(R) and 4505(L) corresponding to respective channels. Then, through LPF4505(R) and 4505(L), musical sound outputs corresponding to respective right channel and left channel can be obtained, and is generated from a sound system which is not shown.

As is described above, the entire circuit shown in FIG. 45 operates in a time divisional manner corresponding to left and right channels and stereo outputs are obtained. In this case, the stereo outputs are subjected to modulations, which are slightly different between two channels, by using modulation wave phase angle $\omega_{mt}$O–$\omega_{mt}$10 and modulation depth functions I0–I10, which are generated corresponding to respective channels.

In this case, if a player wants to obtain a chorus feeling using a stereo, for example, modulation wave phase angle $\omega_{mt}$0–$\omega_{mt}$10 can be set to be several hertz or several tens of hertz so that the frequencies of modulation wave phase angles $\omega_{mt}$0–$\omega_{mt}$10 are slightly different between right and left channels, or so that the values of modulation depth functions I0–I10 are made slightly different between the two channels.

In the above tenth embodiment, modulation wave phase angle $\omega_{mt}$O–$\omega_{mt}$10 and modulation depth function I0–I10 can be separately set of respective left and right channels. In contrast, carrier wave phase angle $\omega_{ct}$0–$\omega_{ct}$10 may be detuned slightly between left and right channels, based on a pitch designation value responsive to a playing operation and the values of amplitude coefficients AMP0–AMP10 may be different between left channel and right channel, thereby achieving a stereo effect.

The present embodiment explains a circuit for outputting a musical sound waveform for a left and right stereo channels respectively. In contrast, respective circuit shown in FIG. 45 may be constructed to perform a time divisional operation in a polyphonic manner, and a musical sound of time divisional channels can thus be accumulated every sampling period at the input stage of sampling and hold circuits 4505(R) and 4505(L), thereby enabling a plurality of musical sound waveforms to be generated in parallel with each other in a stereo manner.

Further, the present embodiment is realized as an electronic musical instrument which performs only one stage of a modulation, but a modulation circuit of one stage may be constructed as one module to which a plurality of modules can be discretionally combined to be applied to a connected circuit. Thereby, a musical sound including richer harmonics components can be produced.

In addition to 2 channel stereo, it is possible to construct a circuit for generating a musical sound in 4-channels, 5-channels and/or many-channels in a stereo manner.

11. An explanation of the eleventh embodiment

The eleventh embodiment of the present invention will be explained.

Figure 50:
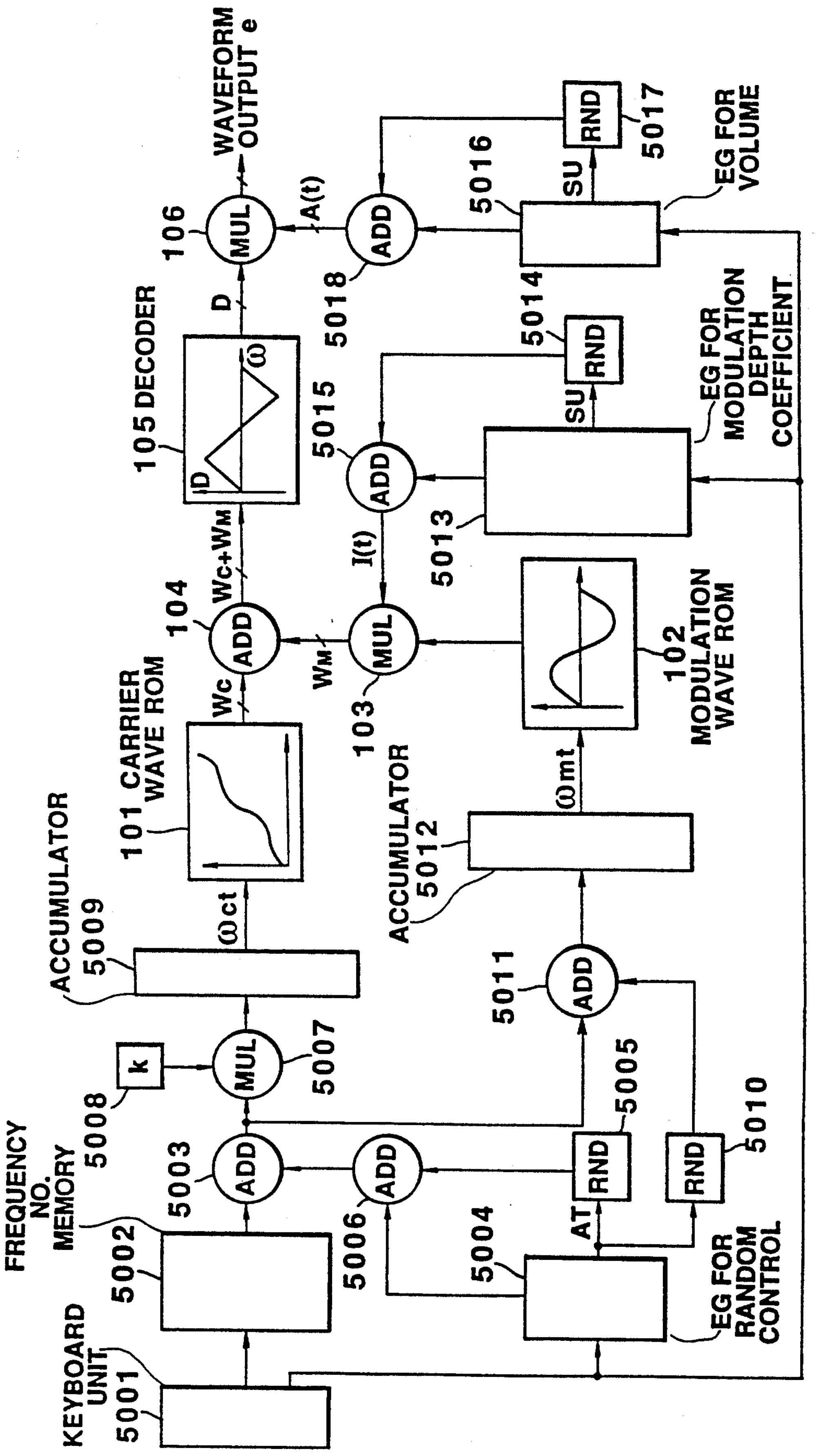
FIG. 50 is a view of the structure of the eleventh embodiment.

FIG. 50 shows a view representing a structure of the eleventh embodiment of the present invention. In FIG. 50, a basic structure comprising carrier wave ROM101, modulation wave ROM102, MUL103, ADD104, decoder 105 and MUL106 are the same as in the first embodiment shown in FIG. 1 and therefore its basic operation has already been explained.

In this case, the present embodiment is characterized by generating carrier wave phase angle $\omega_{ct}$, modulation wave phase angle $\omega_{mt}$, modulation depth function I(t) and modulation coefficient A(t). When a musical sound is generated in accordance with a player's operation in a natural musical instrument, the pitch, and volume of the musical sound varies in a constant ratio with time and in addition, generally sways at random to some extent. In the present embodiment, where the above respective signals are generated, control is conducted so that random variation is added to the signals. Therefore, the present embodiment can continuously generate a musical sound from a musical sound comprising only a single sine wave to one comprising many harmonics components, and simultaneously it becomes possible to add a natural swing to the pitch, timbre and volume of the musical sound to be generated.

In FIG. 50, a player operates keyboard unit 5001 and then the frequency number data correspoding to the operation of the key is read out from the frequency number memory 5002.

The frequency number data represents a reading width when carrier signal $W_C$ is read out from carrier wave ROM101. Frequency number data is inputted to accumulator 5009 through ADD5003 and MUL5007 and is sequentially accumulated, thereby generating carrier wave phase angle $\omega_{ct}$.

In this case, carrier wave phase angle $\omega_{ct}$ determines the basic pitch of waveform output e generated from MUL1006 and thus the pitch of waveform output e becomes high if the frequency number data is of a large value and the pitch of waveform output e becomes small if it is of a small value. In MUL5007, coefficient k which is more than 1 is multiplied with frequency number data and the amplitude of carrier wave phase angle $\omega_{ct}$ outputted from accumulator 5009 becomes relatively large as compared with the amplitude of modulation wave phase angle $\omega_{mt}$ outputted from accumulator 5012. This process is performed so that the frequency of carrier signal $W_C$ outputted from carrier wave ROM101 is relatively larger than the frequency of modulation signal $W_M$ outputted through later described modulation wave ROM102, thereby enabling the pitch of a musical sound to be controlled based on the frequency of carrier signal $W_C$.

Random envelope generator 5004 (which is referred to as random EG5004 hereinafter), in accordance with a speed of depression of keys by keyboard unit 5001, generates an envelope signal having the characteristics shown in FIG. 51. AT is an attack period, DK is a decay period, SU is a sustain period, and RE is a release period. The envelope signal is added to frequency number data at ADD5003 through ADD5006. Therefore, the pitch of waveform output e varies in accordance with the envelope characteristic of FIG. 51. Namely, during the attack period AT immediately after a key-on, for example, the pitch increases abruptly and is reduced during decay period DK. Sequentially, a constant pitch is maintained during sustain period SU and the pitch is further attenuated during release period RE after the key-off.

In the above operation, where random EG5004 outputs an envelope signal during the attack period AT, an instruction is given to random generator 5005 (which is referred to as RND5005 hereinafter). RND5005 produces a random value to be outputted at a random signal. Only during the attack period AT, RND5005 outputs the random signal and the random signal is added to an envelope signal from random EG5005 in ADD5006. The addition result is added to the frequency number data in ADD5003. Accordingly, only during the attack period AT, a component which changes at random is added to a varying component of the frequency number data so that a natural sway can be added to the pitch of a musical sound immediately after the start of the generation of the sound.

Next, the frequency number data outputted from ADD5003 is inputted to accumulator 5012 through ADD5011 and then is sequentially accumulated therein. Then, modulation wave phase angle $\omega_{mt}$ is produced as an output of accumulator 5012.

In this case, modulation wave phase angle $\omega_{mt}$ determines the timbre of waveform output e generated from MUL106 and particularly determines the harmonics component of the frequency of waveform output e.

Where random EG5004 outputs an envelope signal during the attack period AT as recited in the above operation, the designation is provided to RND5010. RND5010 generates a random value in synchronization with RND5005 to be outputted as a random signal. Threfore, the random signal is outputted from RND5010 only during the period of the attack period AT and is added to frequency number data at ADD5011. Accordingly, merely during the attack period AT, a component, varying at random different from the generation of the carrier wave phase angle $\omega_{ct}$, is added to the varying component of the frequency number data and thus, natural sway can be added to the timbre color and particularly the frequency of the harmonics component of a musical sound immediately after start of the generation of the sound.

The amplitude of modulation signal $W_M$ is controlled by the modulation depth function I(t) multiplied in MUL103 and thus, as is explained by referring to the first embodiment, the depth of the modulation is determined (which should be referred to FIGS. 4A to 4C) and respective amplitude characteristics of the harmonics components of waveform output e are determined. The basic characteristics of modulation depth function I(t) are determined by modulation depth function envelope generator 5013 (which is referred to as modulation depth function EG5013 hereinafter).

Modulation depth function EG5013 produces an envelope signal in accordance with the speed of depression of a key of keyboard unit 5001 in the same manner as the random EG5004. The characteristic is the same as shown in FIG. 51. Namely, respective characteristics during attack period AT, decay period DK, sustain period SU and release period RE may be different from those in FIG. 51. The envelope signal is supplied to MUL103 as modulation depth function I(t) through ADD5015. Accordingly, based on the characteristics of the envelope signal, the modulation characteristic by carrier signal $W_C$ changes and the timbre of waveform output e and particularly respective amplitude characteristic of the harmonics components varies. In accordance with the above operation, where modulation depth function EG5013 outputs an envelope signal during sustain period SU (which should be referred in FIG. 51), a designation is provided to RND5015. RND5014 generates a random signal by generating the random value in unsynchronization with RND5005 and RND5010. Thereby, the random signal is outputted from RND5010 only during the sustain period SU and is added to the envelope signal from the modulation depth function EG5013 in ADD5015. The addition result is, as the modulation depth function I(t) as described above, multiplied with the modulation signal $W_M$ in MUL103. Accordingly, only during the sustain period SU, a component varying at random is added to a varying component modulation signal $W_M$ and thus, a natural sway can be added to the timbre and particularly the variation of the amplitude characteristics of the harmonics component of the musical sound during sustain period SU.

The final amplitude (volume) of waveform output e is controlled by amplitude coefficient A(t) multiplied at MUL106 and thereby the volume characteristics of waveform output e is determined. The basic characteristics of amplitude coefficient A(t) is determined by the volume envelope generator 5018 (which is referred to as volue EG5016 hereinafter).

Volue EG5016 produces an envelope signal in accordance with the speed of depression of a key in keyboard unit 5001 in the same manner as in random EG5004 and in modulation depth function EG5013. The characteristic is the same as shown in FIG. 51. The envelope signal is supplied to MUL106 as amplitude coefficient A(T) through ADD5018. Accordingly, based on the characteristics of the above envelope signal, the amplitude characteristics, namely, the volume characteristics of waveform output e varies.

Figure 51:
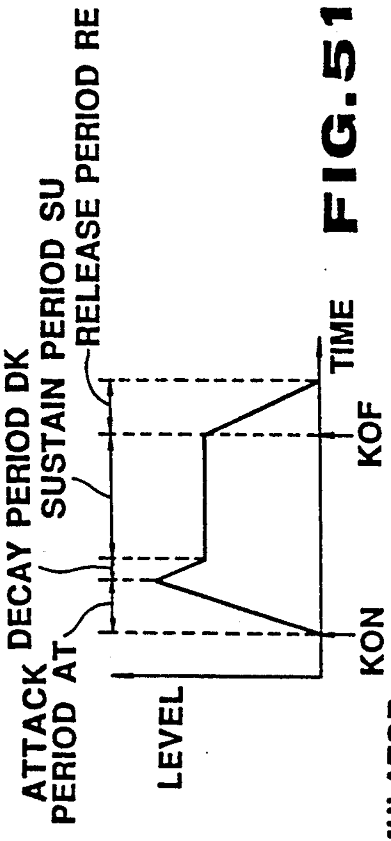
FIG. 51 shows characteristics of an envelope signal.

In the above operation, where volume EG5016 outputs the envelope signal during the sustain period SU which should be referred to by FIG. 51), designation is provided to RND5017. RND5017 generates the random value in unsynchronization with RND5005, RND5010, and RND5014, thereby to be outputted as the random signal. Therefore, RND5017 outputs the random signal only during the sustain period SU and is added to the envelope signal from the volume EG5016 in ADD5018. Therefore, the addition result is multiplied with decoded output D in MUL106, as amplitude coefficient A(T) as is explained above. Accordingly, only during the sustain period SU, a component which varies at random is added to a varying component of waveform output e and thus, a natural sway is applied to a volume of the musical sound during the sustain period.

In the above embodiment, components varying at random are added to the pitch characteristics and the frequency characteristics of the harmonics components for the musical sound characteristics during the attack period AT, and components varying at random are added to the amplitude characteristics of the harmonics components and the volume characteristics during the sustain period SU, but the embodiment is not limited to these cases and the above operation can be carried out at a discretional period of the attack period AT, decay period DK, sustain period SU and release period RE. In the above embodiment, control is conducted based on performance operation at keyboard unit 5001 in the electronic keyboard unit, but the present invention is not limited to this case and control may be conducted based on the playing operation by an electronic brass instrument or electronic string instrument.

12. An explanation of the twelfth embodiment

Finally, the twelfth embodiment of the present invention is explained.

Figure 52:
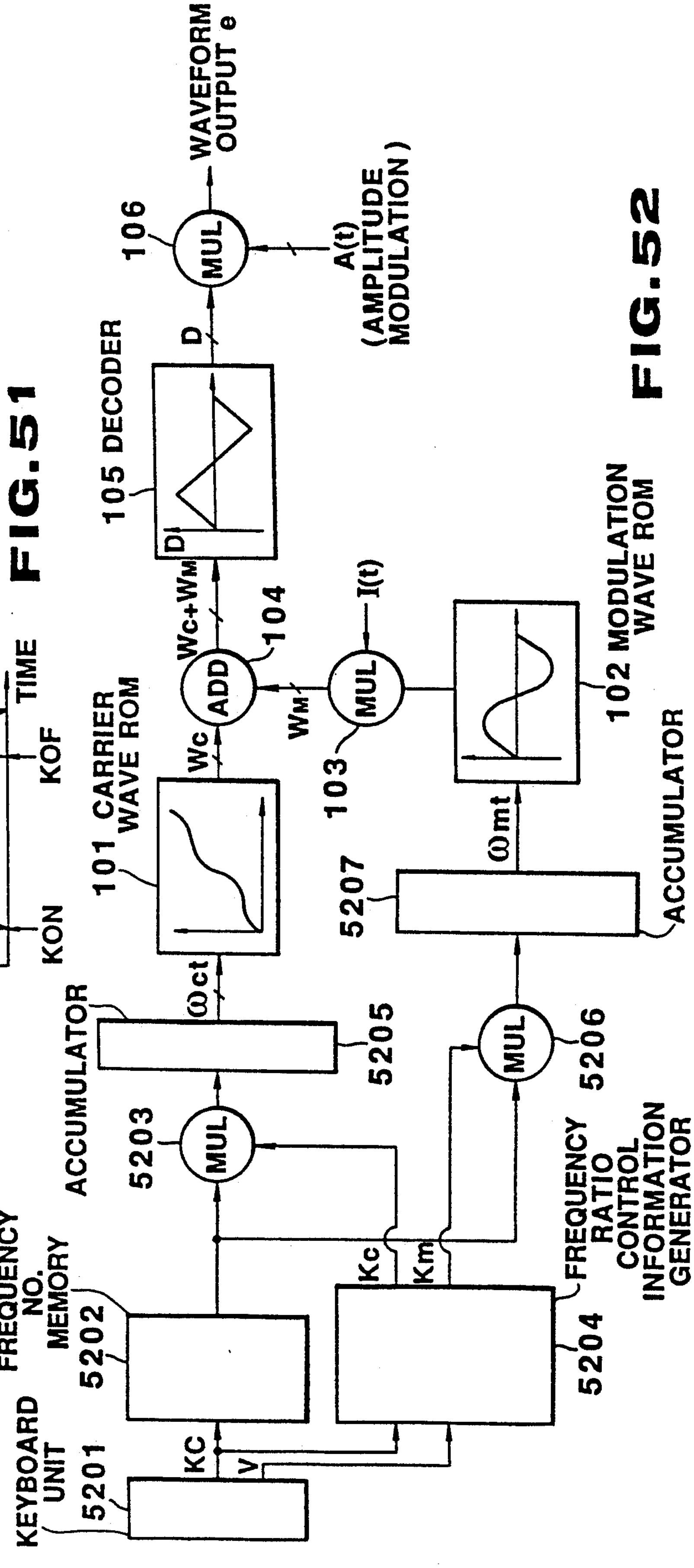
FIG. 52 is a view of the structure of the twelveth embodiment.

FIG. 52 shows the structure of the twelfth embodiment according to the present invention. In FIG. 52, the basic structure comprising carrier wave ROM101, modulation wave ROM107, MUL103, ADD104, decoder 105 and MUL106 are the same as that of the first embodiment shown in FIG. 1. Therefore, the basic operation of the present embodiment is as explained above.

The present embodiment is characterized by the manners of setting carrier wave phase angle $\omega_{ct}$ and modulation wave phase angle $\omega_{mt}$. In a natural musical instrument, the frequency structure of the harmonic components of the musical sound generated is not only different depending on a timbre (kind of a musical instrument) of the musical sound but also varies depending on whether the sound is in a low sound region or a high sound region or depending on the style speed (strength or weakness) of the performance. Where the above various signals are generated in the present embodiment, the harmonic characteristics of the musical sound generated vary depending on the setting of the timbre and the performance operation. Therefore, the present embodiment can continuously generate a musical sound varying from one comprising a sine wave only to one comprising a sine wave together with many harmonics components. Furthermore, the frequency structure of the harmonics components can be varied depending on the setting of the timbre and style of performance.

In FIG. 52, a player operates keyboard unit 5201, causing frequency number data corresponding to the depressed key to be read out from frequency number memory 5202.

Frequency number data designates a reading width when carrier signal $W_C$ is read out from carrier wave ROM101. Frequency number data is inputted to accumulator 5205 through MUL5203 and the frequency number data is sequentially accumulated, thereby generating carrier wave phase angle $\omega_{ct}$.

In this case, as in the eleventh embodiment, the carrier wave phase angle $\omega_{ct}$ determines the basic pitch of waveform output e to be generated from MUL106, then the pitch of waveform output e becomes high if the frequency number data is large and it becomes low if the frequency number data is small.

On the other hand, the frequency number read out from frequency number memory 5202 is inputted to accumulator 5207 through MUL5206 and is sequentially accumulated. Then, modulation wave phase angle $\omega_{mt}$ is generated as an output from accumulator 5207.

In this case, as in the eleventh embodiment, modulation wave phase angle $\omega_{mt}$ determines the timbre of waveform output e to be generated from MUL106.

The ratio of carrier wave phase angle $\omega_{ct}$ to modulation wave phase angle $\omega_{mt}$, both phase angles being generated as recited above, determines the frequency structure of the harmonics components of waveform output e.

In this embodiment, the ratio of carrier wave phase angle $\omega_{ct}$ to modulation wave phase angle $\omega_{mt}$ is controlled as recited below.

Frequency ratio controlling information generator 5204 stores a different pair of frequency ratio controlling information Kc and Km depending on the timbre set by a player, the sound range of the key depressed in keyboard unit 5201 with regard to respective timbre and the key depression speed. A timbre setting switch, not shown, determines the timbre and thereafter a pair of corresponding frequency ratio controlling information Kc and Km is generated by frequency ratio controlling information generator 5204, based on key code KC and velocity VL produced by keyboard unit 5201 when a player depresses a key.

Frequency ratio controlling information Kc is multiplied by the frequency number data used to generate carrier wave phase angle $\omega_{ct}$ in MUL5203. Frequency ratio controlling information Km is multiplied by the frequency number data to generate modulation wave phase angle $\omega_{ct}$ in MUL5206. Depending on the determined timbre, the depressed key's sound range and the key depression speed, the ratio of carrier wave phase angle $\omega_{ct}$ to modulation wave phase angle $\omega_{mt}$ is changed. This changes the frequency structure of the harmonics components of waveform output e outputted from MUL106.

The above operation causes the frequency structure of the harmonics components of the musical instrument to be changed, depending on the sound range of the depressed key and the key depression speed in addition to the determined timbre Thus, it becomes possible to generate a musical sound which changes in the same manner as the musical sound of an acoustic musical instrument. The amplitude of modulation signal $W_M$ outputted from modulation wave ROM based on modulation wave phase angle $\omega_{mt}$ is controlled by modulation depth function I(t) which is multiplied in MUL103, thereby a depth of the modulation being determined as explained in the first embodiment (which should be referred to FIGS. 4A to 4C), and respective amplitude characteristics of harmonics components of waveform output e being determined. In this case, modulation depth function I(t) is not shown in the drawing and may be structured so that it can change depending on the key depression speed in keyboard unit 5201 and the elapsed time after key depression. Therefore, respective amplitude characteristics corresponding to harmonic components of waveform output are controlled.

In the above embodiment, a combination of frequency ratio controlling information Kc and Km outputted from frequency ratio controlling information generator 5204 is as described above, for example, "1 and 2", "1 and 3" or "1 and 4". Therefore, the pitch frequency of waveform output e based on carrier wave phase angle $\omega_{ct}$ is the frequency directly corresponding to frequency number data outputted from frequency number memory 5202. The combination of Kc and Km may be made "2 and 5" or "3 and 6". In this case, the pitch frequency of waveform output e corresponds to the value obtained by multiplying frequency number data by the value of Kc.

In the above embodiment, control is performed based on a key operation of keyboard unit 5201 of an electronic keyboard musical instrument. However, the present invention is not limited to the above embodiment and may be controlled by a play operation of an electronic brass instrument or an electronic string musical instrument.

What is claimed is:

1. A musical sound waveform generator, comprising:

a plurality of basic process modules each comprising:

a carrier signal generating means for generating a carrier signal, a mixed signal outputting means for outputting a mixed signal by mixing a modulation signal with said carrier signal, and a waveform outputting means, having a predetermined function relationship between an input and an output thereof, for outputting a waveform signal according to said mixed signal received as an input signal from said mixed signal outputting means, a waveform input and output controlling means for outputting a waveform signal outputted from at least one of said plurality of basic process modules as a musical waveform, by selecting at least one of (a) a first connection means for inputting a signal, which has a value of 0 or near 0, to at least one of said plurality of basic process modules as said modulation signal, (b) a second connection means for inputting said waveform signal from one of said basic process modules as said modulation signal for at least another one of said plurality of basic process modules, and a third connection means for obtaining said modulation signal for at least one of said basic process modules ;by mixing respective said waveform signals from at least two others of said plurality of basic process modules, thereby connecting said basic process modules, wherein said predetermined function relationship in said waveform outputting means is neither a sine function nor a cosine function and said carrier signal generated by said carrier signal generating means is determined so that said waveform signal generated by said waveform outputting means is a sine wave or a cosine wave with a single frequency when said modulation signal is 0 as said mixed signal outputting means performs a mixing.

2. The musical sound waveform generator according to claim 1, further comprising:

an amplitude envelope characteristics controlling means for controlling the amplitude envelope time characteristics of said waveform signal outputting from said waveform outputting means.

3. A musical sound waveform generating method comprising the steps of:

a basic process step comprising:

generating a carrier signal, outputting a mixed signal by mixing a modulation signal with said carrier signal, outputting a waveform signal based on said mixed signal according to a predetermined function relationship between an input and an output, controlling the amplitude envelope time characteristics of said waveform signal, and a waveform input and output controlling step for (a) executing a first arithmetic operation for obtaining the waveform signal by carrying out said basic process step by making said modulation signal input 0 or near 0 at respective process timings within respective arithmetic operation periods each comprising a plurality of process timings, (b) executing a second arithmetic operation for obtaining said waveform signal by carrying out said basic process step using said waveform signal obtained by a process timing prior to a present process timing as said modulation signal, or (c) executing a third arithmetic operation for mixing respective waveform signals obtained in at least one process timing preceding the present process timing with a waveform signal obtained by carrying out the same arithmetic operations as said first or second arithmetic operations, and generating the waveform signal obtained at a last process timing within said arithmetic operation period as the musical sound waveform of the arithmetic operation period, wherein said predetermined function relationship in said waveform outputting step is neither a sine function nor a cosine function and said carrier signal generated in said carrier signal generating step is such that said waveform signal generated in said waveform outputting step is a sine wave or a cosine wave with a single frequency, when said modulation signal is set to 0 as said mixed signal outputting step performs said mixing.

4. The musical sound waveform generating method according to claim 3, wherein said waveform input and output controlling step generates a musical sound waveform by enabling said first, second or third arithmetic operation to be carried out based on a predetermined connection combination in which the combination varies with time after starting generation of respective musical sound waveform.

5. The musical sound waveform generating method according to claim 3, wherein said waveform input and output controlling step performs a process on a plurality of sound generating channels in a time divisional manner and polyphonically outputs a plurality of musical sound waveforms assigned corresponding to respective sound generating channels.

6. The musical sound waveform generating method of claim 3, further comprising the step of:

controlling the amplitude envelope time characteristics of said waveform signal.

7. A musical sound waveform generator comprising:

a basic process means comprising:

a carrier signal generating means for generating a carrier signal, a mixed signal outputting means for outputting a mixed signal by mixing a modulation signal with said carrier signal, a waveform outputting means for outputting a waveform signal based on said mixed signal according to a predetermined function relationship between an input and an output thereof, and a waveform input and output controlling means for (a) executing a first arithmetic operation for obtaining the waveform signal by operating said basic process means by making said modulation signal input 0 or near 0 at respective process timings within respective arithmetic operation periods each comprising a plurality of process timings, (b) executing a second arithmetic operation for obtaining said waveform signal by operating said basic process means using said waveform signal obtained by a process timing prior to a present process timing as said modulation signal, or (c) executing a third arithmetic operation for mixing respective waveform signals obtained in at least one process timing preceding the present process timing with a waveform signal obtained by carrying out the same arithmetic operation as said first or second arithmetic operations, and generating the waveform signal obtained at a last process timing within said arithmetic operation period as the musical sound waveform of the arithmetic operation period, wherein said predetermined function relationship in said waveform outputting means is neither a sine function nor a cosine function and said carrier signal generated in said carrier signal generating means is such that said waveform signal generated in said waveform outputting means is a sine wave or a cosine wave with a single frequency, when said modulation signal is set to 0 as said mixed signal outputting means performs said mixing.

8. The musical sound waveform generator according to claim 7, wherein the waveform input and output controlling means comprises:

a first and a second accumulating means;

a first switching means for inputting a waveform signal selectively outputted from said basic process means to said first or second accumulating means;

a second switching means for inputting a value 0 or near 0 or an output from the second accumulating means as a modulation signal to said basic process modules selectively; and a multi-stage operation controlling means for controlling an accumulation operation by said first and second accumulating means and a selection operation by said first and second switching means at respective process timings within respective arithmetic operation periods each comprising a plurality of process timings, based on a predetermined connection combination, thereby operating said basic process means at units of respective process timings at multi-stages; and a musical waveform outputting means for outputting the output of the first accumulating means as the musical sound waveform of the operation period at every completion of respective arithmetic operation periods.

9. The musical sound waveform generator according to claim 8 further comprising:

a setting means for enabling a user to set said connection combination; and a displaying means for displaying said connection combination determined by said setting means.

10. The musical sound waveform generator according to claim 9, wherein said setting means enables a user to set an input and output relation in said basic process means between respective process timings as a symbolized arithmetic operation equation, thereby setting said connection combination, and said displaying means displays the connection combination predetermined by said setting means by displaying an input and output relation in said basic process means between said respective process timings by using a symbolized arithmetic operation equation.

11. The musical sound waveform generator according to claim 9, wherein said displaying means treats said basic process means as one unit at every process timing and displays a connection combination determined by said setting means by displaying a connection relationship between units as a diagram.

12. The musical sound waveform generator according to claim 7, wherein said waveform input and output controlling means generates a musical sound waveform by carrying out said first, second or third arithmetic operation based on a predetermined connection combination in which the combination varies with time after starting generation of respective musical sound waveforms.

13. The musical sound waveform generator according to claim 7, wherein said waveform input and output controlling means performs a process on a plurality of sound generating channels in a time divisional manner and polyphonically outputs a plurality of musical sound waveforms assigned corresponding to respective sound generating channels.

14. The musical sound waveform generator according to claim 7, further comprising:

an amplitude envelope characteristics controlling means for controlling the amplitude envelope time characteristics of said waveform signal outputted from said waveform outputting means.

15. A musical sound waveform generator comprising:

a plurality of basic process modules each comprising:

a carrier signal generating means for generating a carrier signal, a mixing controlling means for outputting a mixed signal obtained by mixing a modulation signal with said carrier signal and for controlling the mixing ratio of said modulation signal to said carrier signal from 0 to a discretional mixing ratio, and a waveform outputting means, having a predetermined function relationship between an input and an output thereof, for outputting a waveform signal according to said mixed signal received as an input signal from said mixing controlling means, a waveform input and output controlling means for outputting a waveform signal outputted from at least one of said plurality of basic process modules as a musical waveform, by selecting at least one of (a) a first connection means for inputting a signal, which has a value of 0 or near 0, to at least one of said plurality of basic process modules as said modulation signal, (b) a second connection means for inputting said waveform signal from one of said basic process modules as said modulation signal for at least another one of said plurality of basic process modules, and (c) a third connection means for obtaining said modulation signal for at least one of said basic process modules by mixing respective waveform signals from at least two others of said plurality of basic process modules, or (d) a fourth connection means for forming a modulation signal input to a basic process module by a signal which is the waveform signal fed back from the same basic process module, based on a previously determined connection combination, thereby connecting said basic process module, wherein said predetermined function relationship in said waveform outputting means is neither a sine function nor a cosine function and said carrier signal generated by said carrier signal generating means is such that said waveform signal generated by said waveform outputting means is a sine wave or a cosine wave with a single frequency, when said modulation signal is set to 0 as said mixing controlling means performs said mixing.

16. A musical sound waveform generator comprising:

a plurality of basic process modules each comprising:

a carrier signal generating means for generating carrier signal, a mixing controlling means for outputting a mixed signal obtained by mixing a modulation signal with said carrier signal and for controlling the mixing ratio of said modulation signal to said carrier signal from 0 to a discretional mixing ratio, and a waveform outputting means, having a predetermined function relationship between an input and an output thereof, for outputting a waveform signal according to said mixed signal received as an input signal from said mixing controlling means, a waveform input and output controlling means for continuously combining a connection for inputting a waveform signal obtained by a preceding basic process module to a present basic process module as a new modulation signal input at a plurality of stages, for outputting the waveform signal obtained by one of said basic process modules at a last stage as a musical sound waveform and feeding back said waveform signal to one of said basic process modules at a first stage as a modulation signal input, wherein said predetermined function relationship in said waveform outputting means is neither a sine function nor a cosine function and said carrier signal generated by said carrier signal generating means is such that said waveform signal generated by said waveform outputting means is a sine wave or a cosine wave with a single frequency, when said modulation signal is set to 0 as said mixing controlling means performs said mixing.

17. A musical sound waveform generator for generating a modulated musical sound waveform signal, comprising:

a plurality of basic process means each for generating a carrier signal, outputting a mixed signal by mixing a modulation signal with said carrier signal, and outputting a waveform signal generated by converting said mixed signal according to a predetermined function relationship, first connection means for applying as said modulation signal a signal having a value of 0 or near 0 to one of said basic process means, second connection means for applying as said modulation signal to one of said basic process means said waveform signal outputted by another one of said basic process means, third connection means for adding said waveform signals outputted by a plurality of said basic process means and applying a resultant added signal as said modulation signal to another one of said basic process means, fourth connection means for applying as said modulation signal to other ones of said basic process means said waveform signal outputted by one of said basic process means, fifth connection means for adding said waveform signals outputted by a plurality of said basic process means and applying a resultant added signal as said modulation signal to other ones of said basic process means, sixth connection means for outputting as said musical sound waveform signal said waveform signal outputted by one of said basic process means, seventh connection means for adding said waveform signals outputted by a plurality of said basic process means and outputting a resultant added signal as said musical sound waveform signal, and waveform input/output control means for selecting from among said first through seventh connection means a plurality of said connection means for use in a predetermined connection combination, and connecting a plurality of said basic process means based on said connection combination according to said selected connection means, wherein said predetermined function relationship is neither a sine function nor a cosine function, and said carrier signal is determined such that said waveform signal can be a sine wave or a cosine wave with a single frequency when a mixing ratio of said modulation signal to said carrier signal is 0.

18. A musical sound waveform generating method for generating a modulated musical sound waveform signal, comprising the steps of:

defining a basic process for generating a carrier signal, outputting a mixed signal by mixing a modulation signal with said carrier signal, outputting a waveform signal generated by converting said mixed signal according to a predetermined function relationship, and controlling the amplitude envelope time characteristics of said waveform signal, defining a first arithmetic operation by setting an arithmetic operation cycle as comprising a plurality of process timings, and for obtaining said waveform signals by operating said basic process applying as said modulation signal a signal having a value of 0 or near 0 as one of said process timings in one of said arithmetic operation cycles, defining a second arithmetic operation for obtaining new said waveform signal by operating, at one of said process timings in one of said arithmetic operation cycles, said basic process applying as new said modulation signal said waveform signal obtained at any process timing before the current process timing, defining a third arithmetic operation for obtaining a new waveform signal by obtaining, at one of said process timings in one of said arithmetic operation cycles, new said waveform signal according to an arithmetic operation similar to said first arithmetic operation and by adding it with said waveform signal obtained at any process timing before the current process timing, defining a fourth arithmetic operation for obtaining a new waveform signal by obtaining, at one of said process timings in one of said arithmetic operation cycles, new said waveform signal according to an arithmetic operation similar to said second arithmetic operation and by adding it with said waveform signal obtained at any process timing before the current process timing, and generating said waveform signal obtained at the last process timing of a plurality of said process timings in each operation cycle as said musical sound waveform signal in each operation cycle by selecting one arithmetic operation from among said defined first through fourth arithmetic operations and by operating it according to a predetermined arithmetic operation sequence at each of a series of said process timings in each of a series of said operation cycles, wherein said predetermined function relationship is neither a sine function nor a consine function, and said carrier signal is determined such that said waveform signal can be a sine wave or a cosine wave with a single frequency when a mixing ratio of said modulation signal to said carrier signal is 0.

19. The musical sound waveform generating method according to claim 18, wherein said predetermined arithmetic operation sequence refers to a combination which varies with time after starting generation of each of said musical sound waveform signals.

20. The musical sound waveform generating method according to claim 18, wherein said arithmetic operations performed at each process timing are carried out in a time divisional manner as plural kinds of arithmetic operations corresponding to a plurality of predetermined sound generating channels, and said musical sound waveform signal is outputted polyphonically as a plural kinds of musical sound waveform signal corresponding to a plurality of said sound generating channels.

21. A musical sound waveform generator for generating a modulated musical sound waveform signal, comprising:

basic process for generating a carrier signal, outputting a mixed signal by mixing a modulation signal with said carrier signal, outputting a waveform signal generated by converting said mixed signal according to a predetermined function relationship, and controlling the amplitude envelope time characteristics of said waveform signal, first arithmetic operation means for setting an arithmetic operation cycle as comprising a plurality of process timings, and for obtaining said waveform signal by operating said basic process means applying as said modulation signal a signal having a value of 0 or near 0 at one of said process timings in one of said arithmetic operation cycles, second arithmetic operation means for obtaining new said waveform signal by operating, at one of said process timings in one of said arithmetic operation cycles, said basic process means applying as new said modulation signal said waveform signal obtained at any process timing before the current process timing, third arithmetic operation means for obtaining a new waveform signal by obtaining, at one of said process timings in one of said arithmetic operation cycles, new said waveform signal according to an arithmetic operation similar to one performed by said first arithmetic operation means and by adding it with said waveform signal obtained at any process timing before the current process timing, fourth arithmetic operation means for obtaining a new waveform signal by obtaining, at one of said process timings in one of said arithmetic operation cycles, new said waveform signal according to an arithmetic operation similar to one performed by said second arithmetic operation means and by adding it with said waveform signal obtained at any process timing before the current process timing, and waveform input/output control means for generating said waveform signal obtained at the last process timing of a plurality of said process timings in each operation cycle as said musical sound waveform signal in each operation cycle by selecting ne arithmetic operation means from among said first through fourth arithmetic operation means and by operating it according to a predetermined arithmetic operation sequence at each of a series of said process timings in each of a series of said operation cycles, wherein said predetermined function relationship is neither a sine function nor a cosine function, and said carrier signal is determined such that said waveform signal can be a sine wave or a cosine wave with a single frequency when a mixing ratio of said modulation signal to said carrier signal is 0.

22. The musical sound waveform generator according to claim 21 further comprising:

setting means for allowing a user to set said arithmetic operation sequence, and display means for displaying said arithmetic operation sequence determined by said setting means.

23. The musical sound waveform generator according to claim 22, wherein said setting means allows a user to set said arithmetic operation sequence by setting the input/output relationship in said basic process means between said process timings using a symbolized arithmetic operation expression, and said display means displays said arithmetic operation sequence determined by said setting means by displaying said input/output relationship in said basic process means between said process timings using a symbolized arithmetic operation expression.

24. The musical sound waveform generator according to claim 22, wherein said display means displays said arithmetic operation sequence determined by said setting means by setting as one unit said basic process means operated at each process timing and displaying said input/output relationship between said units as a diagram.

25. The musical sound waveform generator according to claim 21, wherein said predetermined arithmetic operation sequence refers to a combination which varies with time after starting generation of each of said musical sound waveform signals.

26. The musical sound waveform generator according to claim 21, wherein said arithmetic operations performed at each process timing are carried out in a time divisional manner as plural kinds of arithmetic operations corresponding to a plurality of predetermined sound generating channels, and said musical sound waveform signal is outputted polyphonically as a plural kinds of musical sound waveform signal corresponding to a plurality of said sound generating channels.

27. A musical sound waveform generator for generating a modulated musical sound waveform signal, comprising:

basic process means for generating a carrier signal, outputting a mixed signal by mixing a modulation signal with said carrier signal, outputting a waveform signal generated by converting said mixed signal according to a predetermined function relationship, and controlling an amplitude envelope time characteristics of said waveform signal, first and second accumulation means, first switch means for selectively applying to said first and second accumulation means said waveform signal outputted from said basic process means, second switch means for selectively applying a value of 0 or near 0 or an output from said second accumulation means to said basic process means as said modulation signal, and waveform accumulating/switching control means for setting an arithmetic operation cycle as comprising a plurality of process timings, and for generating an output signal from said first accumulation means obtained at the last process timing of a plurality of said process timings in each operation cycle as said musical sound waveform signal in each operation cycle by operating said basic process means, controlling accumulating operations in said first and second accumulation means and selecting operations in said first and second switch means according to a predetermined arithmetic operation sequence at each of a series of said process timings in each of a series of said operation cycles, wherein said predetermined function relationship is neither a sine function nor a cosine function, and said carrier signal is determined such that said waveform signal can be a sine wave or a cosine wave with a single frequency when a mixing ratio of said modulation signal to said carrier signal is 0.

28. A musical sound waveform generator for generating a modulated musical sound waveform signal, comprising:

a plurality of basic process means each for generating a carrier signal, outputting a mixed signal by mixing a modulation signal with said carrier signal, controlling the mixing ratio of said modulation signal to said carrier signal within the range between 0 to optional value, and outputting a waveform signal generated by converting said mixed signal according to a predetermined function relationship, first connection means for applying as said modulation signal a signal having a value of 0 or near 0 to one of said basic process means, second connection means for applying as said modulation signal to one of said basic process means said waveform signal outputted by another one of said basic process means, third connection means for adding said waveform signals outputted by a plurality of said basic process means and applying a resultant added signal as said modulation signal to another one of said basic process means, fourth connection means for applying as said modulation signal to other ones of said basic process means said waveform signal outputted by one of said basic process means, fifth connection means for adding said waveform signals outputted by a plurality of said basic process means and applying a resultant added signal as said modulation signal to other ones of said basic process means, sixth connection means for outputting as said musical sound waveform signal said waveform signal outputted by one of said basic process means, seventh connection means for adding said waveform signals outputted by a plurality of said basic process means and outputting a resultant added signal as said musical sound waveform signal, eighth connection means for feeding back as said modulation signal to one of said basic process means said waveform signal outputted by said basic process means itself, and waveform input/output control means for selecting from among said first through eighth connection means 8, a plurality of said connection means for use in a predetermined connection combination, and connecting a plurality of said basic process means based on said connection combination according to said selected connection means, wherein said predetermined function relationship is neither a sine function nor a cosine function, and said carrier signal is determined such that said waveform signal can be a sine wave or a cosine wave with a single frequency when a mixing ratio of said modulation signal to said carrier signal is 0.

29. A musical sound waveform generator for generating a modulated musical sound waveform signal, comprising:

first through n-th serially connected basic process modules each for generating a carrier signal, outputting a mixed signal by mixing a modulation signal with said carrier signal, controlling the mixing ratio of said modulation signal to said carrier signal within the range between 0 to an optional value, and outputting a waveform signal generated by converting said mixed signal according to a predetermined function relationship, means for coupling said waveform signal outputted by each of said serially connected basic process modules to its immediately subsequent basic process module as said modulation signal, and means for outputting as said musical sound waveform signal the waveform signal outputted by the n-th basic process means, and feeding back said musical sound waveform signal to said first basic process module as said modulation signal, wherein said predetermined function relationship is neither a sine function nor a cosine function, and said carrier signal is determined such that said waveform signal can be a sine wave or a cosine wave with a single frequency when a mixing ratio of said modulation signal to said carrier signal is 0.

30. A musical sound waveform generating method for generating a musical sound waveform according to a mixed signal obtained by stereophonically mixing a modulation signal with a carrier signal comprising:

a carrier signal generating step for generating a carrier signal, a modulation signal generating step for generating a modulation signal, a mixing step for outputting a mixed signal obtained by mixing said modulation signal with said carrier signal, a ratio controlling step for controlling a mixing ratio of said modulation signal to said carrier signal, a waveform outputting step, using a predetermined function relationship between input and output thereof, for outputting a musical sound waveform according to said mixed signal received as an input signal, and a controlling step for controlling such that at least one of a characteristic of said carrier signal, a characteristic of said modulation signal, and a characteristic of said mixing ratio becomes different between respective stereo channels.

31. The musical sound waveform generating method according to claim 30, wherein said modulation signal generating step includes a plurality of signal generating steps, each generating said modulation signal of respective stereo channels.

32. The musical sound waveform generating method according to claim 30, wherein said mixing step includes a plurality of mixing steps each outputting said mixed signal obtained by mixing said modulation signal with said carrier signal, for respective stereo channels.

33. The musical sound waveform generating method according to claim 30, wherein said ratio controlling step includes a plurality of controlling steps each controlling said mixing ratio of said modulation signal to said carrier signal, for respective stereo channels.

34. A musical sound waveform generating apparatus for generating a musical sound waveform according to a mixed signal obtained by stereophonically mixing a modulation signal with a carrier signal comprising:

a carrier signal generating means for generating a carrier signal, a modulation signal generating means for generating a modulation signal, a mixing means for outputting a mixed signal obtained by mixing said modulation signal with said carrier signal, a ratio controlling means coupled to said mixing means, for controlling a mixing ratio of said modulation signal to said carrier signal, a waveform outputting means, having a predetermined function relationship between input and output thereof, for outputting a musical sound waveform according to said mixed signal from said mixing means received as an input signal, and a controlling means for controlling at least one of said carrier signal generating means, said modulation signal generating means, and said ratio controlling means, so that at least one of a characteristic of said carrier signal, a characteristic of said modulation signal, and a characteristic of said mixing ratio becomes different between respective stereo channels.

35. The musical sound waveform generating apparatus according to claim 34, wherein said modulation signal generating means includes a plurality of signal generating means each for generating said modulation signal of respective stereo channels.

36. The musical sound waveform generating apparatus according to claim 34, wherein said mixing means includes a plurality of mixing circuits each for outputting said mixed signal obtained by mixing said modulation signal with said carrier signal, for respective stereo channels.

37. The musical sound waveform generating apparatus according to claim 34, wherein said ratio controlling means includes a plurality of controlling circuits each for controlling said mixing ratio of said modulation signal to said carrier signal, for respective stereo channels.

* * * * *

UNITED STATES PATENT AND TRADEMARK OFFICE

CERTIFICATE OF CORRECTION

PATENT NO. : 5,268,528

DATED : December 7, 1993

INVENTOR(S) : IWASE, Hiroshi

It is certified that error appears in the above-indentified patent and that said Letters Patent is hereby corrected as shown below:

Title page, Item [54] Title, and Column 1, in the Title, delete:

"MUSICAL SOUND WAVEFORM GENERATOR AND A METHOD FOR GENERATING A MUSICAL SOUND WAVEFORM"

Item [56] under "FOREIGN PATENT DOCUMENTS", line 1, change "36-12279" to --61-12279--.

Signed and Sealed this

Twenty-fourth Day of June, 1997

Attest:

BRUCE LEHMAN

*Attesting Officer*

*Commissioner of Patents and Trademarks*